US005524077A

United States Patent [19]

Faaland et al.

[11] Patent Number: 5,524,077

[45] Date of Patent: Jun. 4, 1996

[54] SCHEDULING METHOD AND SYSTEM

[76] Inventors: Bruce H. Faaland, 835 W. Etruria, Seattle, Wash. 98119; Thomas G. Schmitt, 1809 75th NE., Seattle, Wash. 98115

[21] Appl. No.: 445,479

[22] Filed: Dec. 4, 1989

Related U.S. Application Data

[63] Continuation of Ser. No. 77,732, Jul. 24, 1987, abandoned.

[51] Int. Cl.[6] .................................................... G06F 15/20

[52] U.S. Cl. ............................................................ 364/402

[58] Field of Search .................................... 364/401, 402, 364/152, 153, 156, 468, 478

[56] References Cited

U.S. PATENT DOCUMENTS 3,703,725 11/1972 Gomersall et al. ..................... 364/490

OTHER PUBLICATIONS

Operations Research, V. 35, No. 3, May–Jun., 1987, Scheduling Tasks in a Fabrication/Assembly Process, Bruce Faaland et al, pp. 378–388.

Working Paper 83–01, Univ. of Wash, DJ–10, Seattle Wa. 98195, Smithfield D: Case and Computer Instructions, W. L. Berry & T. G. Schmitt.

Naval Res. Logist. Quart., 15, Multiple Factor Rules for Sequencing with Assembly Constraints, Maxwell, W.L. & Mehra, M., pp. 251–254.

Operations Research, An Introduction, Handy A. Taha, 3rd Edition, 1982.

Adam, N., and J. Surkis, "A Comparison of Capacity Planning Techniques in a Job Shop Control System," *Management Science* 23:1011–1015, 1977.

Aho, A. H., J. E. Hopcroft and J. D. Ullman, *The Design and Analysis of Computer Algorithms,* Addison–Wesley, Reading, Massachusetts, 1974.

Anderson, J. C., R. G. Schroeder, S. E. Tupy and White, "A Survey of MRP Implementation and Practice," *Production and Inventory Management* 23:51–66, 1982.

Baker, K. R., *Introduction to Sequencing and Scheduling,* 178–231, 1974.

Baker, K. R., "Sequencing Rules and Due Date Assignments in a Job Shop," *Management Science* 30:1093–1104, 1984.

Balinski, M. L., "On a Selection Problem," *Management Science* 17:230–231, 1970.

Browne, J., K. Rathmill and K. E. Stecke, "Classification of Flexible Manufacturing Systems," *The FMS Magazine,* 114–117, Apr. 1984.

Chvatal, V., *Linear Programming* 367–387, W. H. Freeman, New York, 1980.

Dinic, E. A., "Algorithm for Solution of a Problem of Maximum Flow in a Network with Power Estimation," *Soviet Mathematics Doklady* 11:1277–1280, 1970.

Edmonds, J., and R. M. Karp, "Theoretical Improvements in Algorithmic Efficiency for Network Flow Problems," *JACM* 19:248–264, Apr. 1972.

Eisner, M. J., and D. G. Severance, "Mathematical Techniques for Efficient Record Segmentation in Large Shared Databases," *JACM* 23:619–635, 1976.

Elvers, D. A., "Job Shop Dispatching Rules Using Various Delivery Date Setting Criteria," *Production and Inventory Management,* 62–70, 4th Qtr. 1973.

(List continued on next page.)

*Primary Examiner*—Gail O. Hayes
*Assistant Examiner*—Charles R. Kyle
*Attorney, Agent, or Firm*—Seed and Berry

[57] ABSTRACT

This invention provides a method and system for cost-based resource scheduling. This invention develops an initial resource schedule. This schedule is then represented as a Schedule Precedence Graph, which is an acyclic directed graph consisting of nodes and arcs. Each node corresponds to a task to be performed, and each arc corresponds to a technological or assigned task precedence. Each node is assigned a cost, which corresponds to cost or savings due to delaying the task one time unit. In this invention, the Maximum Flow Procedure is iteratively invoked to determine which tasks can be profitably delayed.

19 Claims, 12 Drawing Sheets

OTHER PUBLICATIONS

Florian, M., P. Trepant and G. McMahon, "An Implicit Enumeration Algorithm for the Machine Sequencing Problem," *Management Science* 17:B782–B792, 1971.

Fong, C. O., and M. R. Rao, "Accelerated Labelling Algorithms for the Maximum Flow Problem with Applications to Transportation and Assignment Problems," Working Paper 7222, Graduate School of Management, University of Rochester, 1974.

Ford, L. R., and D. R. Fulkerson, "Maximal Flow Through a Network," *Canadian Journal of Mathematics* 8:399–404, 1956.

Ford, L. R., and D. R. Fulkerson, *Flows in Networks,* Princeton University Press, Princeton, New Jersey, 1962.

Fulkerson, L. R., and G. B. Dantzig, "Computation of Maximal Flows in Networks," *Naval Research Logistics Quarterly* 2:277–283, 1955.

Galil, Z., "An OV(V5/3E2/3) Algorithm for the Maximal Flow Problem," *Acta Informatica* 14:221–242, 1980.

Galil, Z., and A. Naamad, "An O(EV Log 2V) Algorithm for the Maximal Flow Problem," *Journal of Computer and System Sciences* 21:203–217, 1980.

Glover, F., and D. Klingman, J. Mote, and D. Whitman, "Comprehensive Computer Evaluation and Enhancement of Maximum Flow Algorithms," *Applications of Management Science* 3:109–175, 1983.

Glover F., D. Klingman, J. Mote, and D. Whitman, "A Primal Simplex Variant for the Maximum Flow Problem," *Naval Research Logistics Quarterly* 31:41–61, 1984.

Goldberg, A. V., and R. E. Tarjan, "A New Approach to the Maximum Flow Problem," *Proceedings of the 18th Annual ACM Symposium on Theory of Computing,* 136–146, 1986.

Greenberg, H. H., "A Branch–Bound Solution to the General Scheduling Problem," *Operations Research* 16:353–316, 1968.

Gusfield, D., C. Martel and D. Fernandez–Baca, "Fast Algorithms for Bipartite Network Flow," Working Paper YALEU/DCS/TR–356, Department of Computer Science, Yale University, 1985 (to appear in SIAM Journal on Computing).

IBM, *Program Product: Capacity Planning —Infinite Loading/Capacity Planning—Finite Loading Application Description,* GH20–0627–2, 1970.

Kanet, J. J., and T. C. Hayya, "Priority Dispatching with Operation Due *Dates in a Job Shop," *Journal of Operations Management* 2:167–176, 1982.

Karzanov, A. V., "Determining the Maximum Flow in a Network by the Method of Preflows," *Soviet Mathematics Doklady* 15:434–437, 1974.

Kim, K., "On the Maximal Closure Problem" Ph.D. Thesis, University of Washington, Seattle, Washington, 1986.

Lerchs, H., and I. F. Grossman, "Optimum Design of Open––Pit Mines," *Canadian Mining and Metallurgical Bulletin* 58:47–54, 1965.

Malhorta, V. M., M. P. Kumar and S. N. Maheshwari, "An O([V]3) Algorithm for Finding Flows in Networks," *Information Processing Letters* 7:277–278, 1978.

Mamer, J. W., and S. A. Smith, "Optimizing Field Repair Kits Based on Job Completion Rate," *Management Science* 28:1328–1333, 1982.

Manne, A. S., "On the Job–Shop Scheduling Problem," *Operations Research* 8:219–233, 1960.

Maxwell, W. L., and M. Mehra, "Multiple Factor Rules for Sequencing with Assembly Constraints," *Naval Research Logistics Quarterly* 15:241–254, 1968.

Nijenhuis, A., and H. S. Wilf, *Combinatorial Algorithms for Computers and Calculators,* 2d ed., Academic Press, New York, 1978.

Orlicky, J., *Material Requirements Planning,* McGraw–Hill, New York, 1972.

Phillips, S., Jr., and M. I. Dessouky, "Solving the Project Time/Cost Tradeoff Problem Using the Minimal Cut Concept," *Management Science* 24:393–400, 1977.

Picard, J. C., "Maximal Closure of a Graph and Applications to Combinatorial Problems," *Management Science* 22:1268–1272, 1976.

Plossl, G. W., and O. W. Wight, "Capacity Planning and Control," *Production and Inventory Management* 14:31–67, 3d Qtr. 1973.

Reiter, S., "A System for Managing Job–Shop Production," *Journal of Business* 39:371–393, 1966.

Rhys, J. M. W., "A Selection Problem of Shared Fixed Costs and Network Flows," *Management Science* 17:200–207, 1970.

Russel, R. A., "A Comparison of Heuristics for Scheduling Projects with Cash Flows and Resource Restrictions," *Management Science* 32:1291–1300, 1986.

Russel, R. S., and B. W. Taylor, "An Evaluation of Sequencing Rules for an Assembly Shop," *Decision Sciences* 16:196–212, 1985.

Stecke, K. E., and J. Browne, "Variations in Flexible Manufacturing Systems According to the Relevant Types of Automated Materials Handling," *Material Flow,* vol. 2, 1985.

Tarjan, R. E., *Data Structures and Network Algorithms,* Society for Industrial and Applied Mathematics, Philadelphia, 1983.

Tarjan, R. E., "A Simple Version of Karzanov's Blocking Flow Algorithm," *Operations Research Letters* 2:265–268, 1984.

Sculli, D., "Priority Dispatching Rules in Job Shops with Assembly Operations and Random Delays," *Omega* 8:227–234, 1980.

Sidney, J. B., "Optimal Single–Machine Scheduling with Earliness and Tardiness Penalties," *Operations Research* 25:62–69, 1977.

Smith–Daniels, D. E., and N. J. Aquilano, "Constrained Resource Project Scheduling Subject to Material Constraints," *Journal of Operations Management* 4:369–387, 1984.

Thompson, K., "MRP II in the Repetitive Manufacturing Environment," *Production and Inventory Management,* 4th Qtr, 1983.

Trevelen, M. D., and D. A. Elvers, "An Investigation of Labor Assignment Rules in a Dual Constrained Job Shop," *Journal of Operations Management* 6:51–67, 1985.

Tucker, A., "A Note on Convergence of the Ford–Fulkerson Flow Algorithm," *Mathematics of Operations Research* 2:143–144, 1977.

Weingartner, H. M., "Capital Budgeting of Interrelated Projects: Survey and Synthesis," *Management Science* 12:485–516, 1966.

Wiest, J. D., "A Heuristic Model for Scheduling Large Projects with Limited Resources," *Management Science* 13:B359–B377, 1967.

FIG.6

WORKER AND WORK CENTER COMPATIBILITY CHART

| | WC1 | WC2 | WC3 | WC4 |
|---|---|---|---|---|
| W1 | X | | | X |
| W2 | | X | | X |
| W3 | | | X | |

TERMINOLOGY

FIG.8 i,j - an integer
Ti - Task i
Wi - Worker i
WCi - Work Center i
WCTQi - Work Center i's Work Center Task Queue
WOi - Work Order i
WOjiTi - Task i of Work Order j

TECHNOLOGICAL PRECEDENCE GRAPH

SCHEDULE PRECEDENCE GRAPH

GRAPH OF FIRST CANDIDATE LIST BEFORE MFP

GRAPH OF FIRST CANDIDATE LIST AFTER MFP

FINAL SCHEDULE

SCHEDULING METHOD AND SYSTEM

CROSS-REFERENCE TO RELATED APPLICATION

This application is a continuation of U.S. application Ser. No. 07/077,732 filed Jul. 24, 1987, now abandoned.

TECHNICAL FIELD

This invention relates generally to a method and apparatus for sequencing and scheduling fabrication and assembly tasks in a manufactory (e.g., job shop, construction project, or flexible manufacturing facility).

BACKGROUND ART

A manufactory typically comprises many work centers and workers. Each work center is equipped to perform a certain function. For example, at one work center drilling may be performed, and at another work center cutting may be performed. Furthermore, each worker in the manufactory may be qualified to perform only certain types of functions. For example, one worker may be qualified only to paint, and another worker may be qualified both to paint and to drill.

Generally, a manufactory can produce a variety of finished products in response to customer orders. The manufacturing of each finished product typically is divided into many tasks. Tasks, and the order in which they must be performed, may vary from product to product. The tasks of various finished products can be in production simultaneously. This type of manufactory is called a "job shop."

The problems associated with the scheduling of tasks within a job shop have long been recognized in the art. Many managers are unable to develop workable schedules because they have no means of accurately determining the "queue time." The queue time is the time a task waits because resources (e.g., workers and work centers) are occupied with other tasks. Without accurate schedule information, a manager has no means of assessing and making realistic due date commitments for prospective customer orders. Consequently, workers frequently are reassigned or asked to work overtime to compensate for unanticipated bottlenecks. These disruptions are costly.

Existing scheduling techniques attempt to overcome these disruptions by using planned queue times, which are a manager's estimates of queue times, and time buckets, which are fixed periods of time (typically a week) into which the planning horizon is divided. Based on the planned queue times, each task is assigned to a time bucket. If all tasks assigned to a time bucket cannot be completed during that time bucket, certain systems (called "finite loading") reassign tasks to other time buckets; other systems (e.g., MRP and MRP II) do not attempt to make these changes.

These approaches to scheduling result in infeasible and unrealistic schedules for several reasons. First, the planned queue times are typically very inaccurate. Second, the time buckets must be at least as long as the time to do the longest task and in most cases they are much longer. Third, only one of the two important resources, workers and work centers, is considered in the schedule. Fourth, since either workers or work centers are assigned to tasks before the schedule is developed, unanticipated bottlenecks frequently arise on over-committed resources. Fifth, since revenues and costs are not explicitly considered, the schedule objectives are unrealistic. Finally, since the computer time necessary to develop a schedule is typically long, revisions are infrequent and the schedule does not reflect current production conditions.

Accordingly, there is a need for a scheduling system that develops accurate, feasible, minimum cost schedules in a timely manner that allows revisions to reflect current production conditions.

DISCLOSURE OF THE INVENTION

This invention provides a method and apparatus for cost-based resource scheduling. The object of this invention is to provide a scheduling system that (a) schedules tasks, workers, and work centers and preferably minimizes costs, both inventory carrying and late delivery; and (b) whose efficiencies allow for frequent rescheduling where desired.

This, and other objects of the invention, which will become more apparent as the invention is more fully described below, are obtained in preferred embodiments, by a data processing method which first generates an Early Finish Schedule, second generates a Late Finish Schedule from the Early Finish Schedule, and finally generates a Final Schedule by applying a Maximum Flow Procedure (MFP) to a graphic representation of the Late Finish Schedule.

In preferred embodiments, the methods and system of the present invention include the following characteristics and advantages: (a) the Early Finish Schedule is a feasible sequence of tasks such that the tasks finish as early as possible; (b) the start time of some tasks in the Early Finish Schedule may be delayed without incurring additional late delivery costs; (c) the inventory carrying costs and the late delivery costs are analogized to the flow of a network in which a Maximum Flow Procedure identifies tasks that can be profitably delayed; (d) the completion times of delayed tasks are adjusted incrementally; and (e) the ordered data structures are represented by heaps.

Preferred embodiments rely in part on a network model of the Late Finish Schedule to which is applied the Maximum Flow Procedure. The network model is depicted by an acyclic directed graph, representing initially the Late Finish Schedule. Each node of the graph corresponds to a task in the Late Finish Schedule, and each directed arc corresponds to a precedence requirement. The flow MFP sends through this network corresponds to inventory carrying and late delivery costs.

BRIEF DESCRIPTION OF THE DRAWINGS

FIG. 6 is the compatibility chart for the illustrative example.

FIG. 8 is a table of mnemonics for the illustrative example.

BEST MODE FOR CARRYING OUT THE INVENTION

Figure 1:
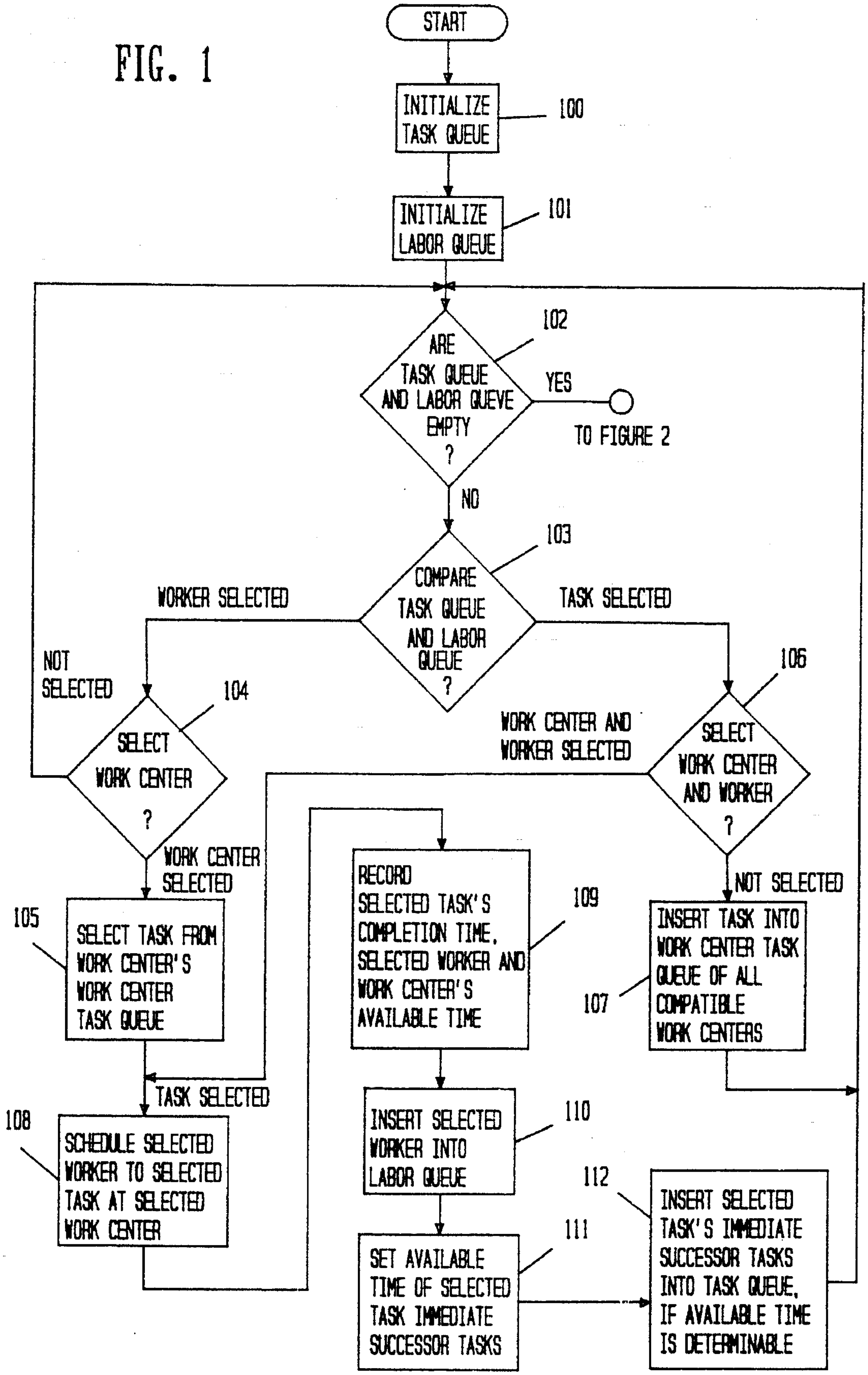
FIG. 1 is a flow chart of Phase I (of three phases) of a preferred embodiment of the present invention.

This system, the Scheduling System (SS), considers the current state of all the tasks. Each task may be completed, in process, or not started. The SS schedules only those tasks that are not started. All subsequent mention of tasks refer only to those not yet started.

The SS represents each queue data structure as a heap. The term "queue" means a sorted list and not a first-in-first-out (FIFO) data structure. A characteristic of a heap is that the first entity in the queue is stored at the top of the heap. The SS generally removes only the first entry in the queue. The heap structure handles revisions (insertions and deletions) efficiently. Each time the SS adds an entry or removes an entry from a queue, the SS adjusts the heap to ensure that the first entry is at the top. Although this embodiment represents the queues as a heap data structure, other data structures may be similarly suitable. These data structures include balanced trees, leftist trees, 2-3 trees, p-trees, and binomial queues.

The SS is divided into three phases. Phase takes a set of tasks, workers, and work centers and develops an Early Finish Schedule. Phase II takes the Early Finish Schedule and develops a Late Finish Schedule. Phase III takes the Late Finish Schedule and develops the Final Schedule.

This preferred embodiment of the present invention can be best understood with reference to the following terms.

DEFINITION SECTION

Task Start Time—means the time that a worker is scheduled to start a task at a work center.

Task Process Time—means the time that it will take a worker to complete the task.

Task Completion Time—means the time when the worker assigned to the task completes the task. The task completion time is equal to the task start time plus the task process time.

Prerequisite Tasks—means those tasks that must be completed before the task can start.

Task Available Time—means the time when all of the task's prerequisite tasks are complete.

Worker Available Time—means the time when the worker completes his current task.

Work Center Available Time—means the time when the worker assigned to the work center completes his current task.

Task Available Time is determinable—means that all the task's prerequisite tasks are either completed or in process.

Available Task—means a task that has all of its prerequisite tasks completed.

Assigned Worker—means a worker who is currently working on a task.

Available Work Center—means a work center that has no worker currently working at it.

Worker and Work Center are compatible—means that the worker is qualified to work at the work center.

Task and Work Center are compatible—means that the task can be performed at the work center.

Task, Worker, and Work Center are compatible—means that the task can be performed by the worker at the work center.

Work Center Task Queue—means a queue that holds a list of all available tasks that are compatible with the work center. Each work center has a work center task queue.

Schedule Time—means a variable that during scheduling keeps track of the time.

End-product Task—means the last task performed in the production of a product.

Intermediate Task—means all tasks that are not end-product tasks.

Task Priority—means a priority assigned to a task based upon the needs of the manufactory implementing the present invention. A commonly used priority rule is called the minimum slack time rule. It represents the difference between the amount of time until the promised delivery date (Due Date) and the shortest time necessary to complete the task and all tasks on the product which cannot be started until that task is completed. Other priority rules could be used.

Phase I

The processing of Phase I is represented by the flow chart in FIG. 1.

In block 100, the SS initializes the Task Queue. The Task Queue is a list of all not started tasks whose task available time is determinable. The Task Queue is sorted from the earliest to latest task available time.

In block 101, the SS initializes the Labor Queue. The Labor Queue is a list of all assigned workers. The Labor Queue is sorted from the earliest to the latest worker available time.

In block 102, the SS determines whether both the Task and Labor Queue are empty. If both the queues are empty, Phase I is finished and the SS proceeds to Phase II in FIG. 2.

In block 103, the SS compares the available time of the first task in the Task Queue to the available time of the first worker in the Labor Queue. If the task's available time is less than or equal to the worker's available time, then the SS removes and selects the first task from the Task Queue, sets the schedule time to the task's available time, and continues at block 106; otherwise, the SS removes and selects the first worker from the Labor Queue, sets the schedule time to the worker's available time, and continues at block 104.

In block 104, the SS determines whether an available work center exists such that (1) the available work center and selected worker are compatible and (2) the available work center's Work Center Task Queue contains a not started task. If such a work center does not exist, then SS records the worker as available and continues at block 102; otherwise, the SS selects the work center and continues at block 105.

In block 105, the SS selects and removes the highest priority, not started task from the selected work center's Work Center Task Queue. With this selected task, the selected worker, and the selected work center, the SS continues at block 108.

In block 106, the SS determines whether an available work center and an available worker exist such that the selected task, the available worker, and the available work center are compatible. If such a worker or work center does not exist, then the SS continues at block 107; otherwise, the SS selects the worker and the work center, and with the selected task, the selected worker, and selected work center, the SS continues at block 108.

In block 107, the SS inserts the selected task into the Work Center Task Queue of all compatible work centers, and the SS continues at block 102.

In block 108, the SS schedules the selected worker to start the selected task at the selected work center at the schedule time, as set in block 103. In block 109, the SS records the selected task's completion time, the selected worker's available time, and the selected work center's available time. In block 110, the SS inserts the selected worker into the Labor Queue. In block 111, the SS determines whether the task available time of each immediate successor task of the selected task became determinable when the selected task was scheduled in block 108. For each such immediate successor task, the SS sets the task's available time to the completion time of the task's latest completing immediate predecessor task. In block 112, the SS inserts each immediate successor task of the selected task whose available time is determinable into the Task Queue and continues at block 102.

Phase II

Figure 2:
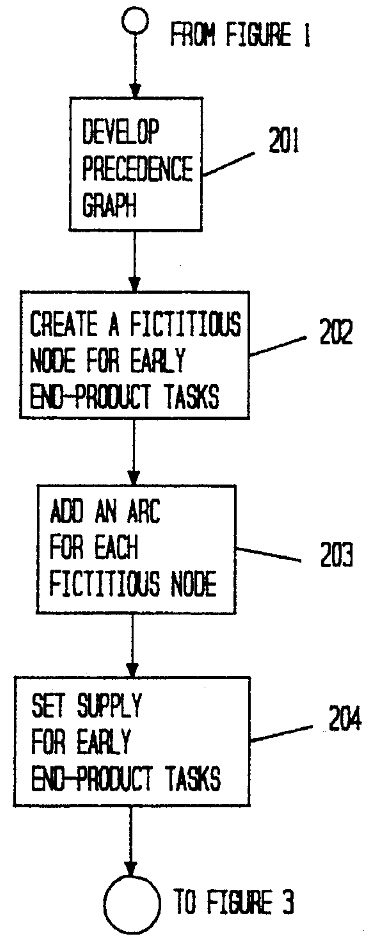
FIG. 2 is the first of two flow charts, which comprise Phase II of a preferred embodiment of the present invention.
Figure 3:
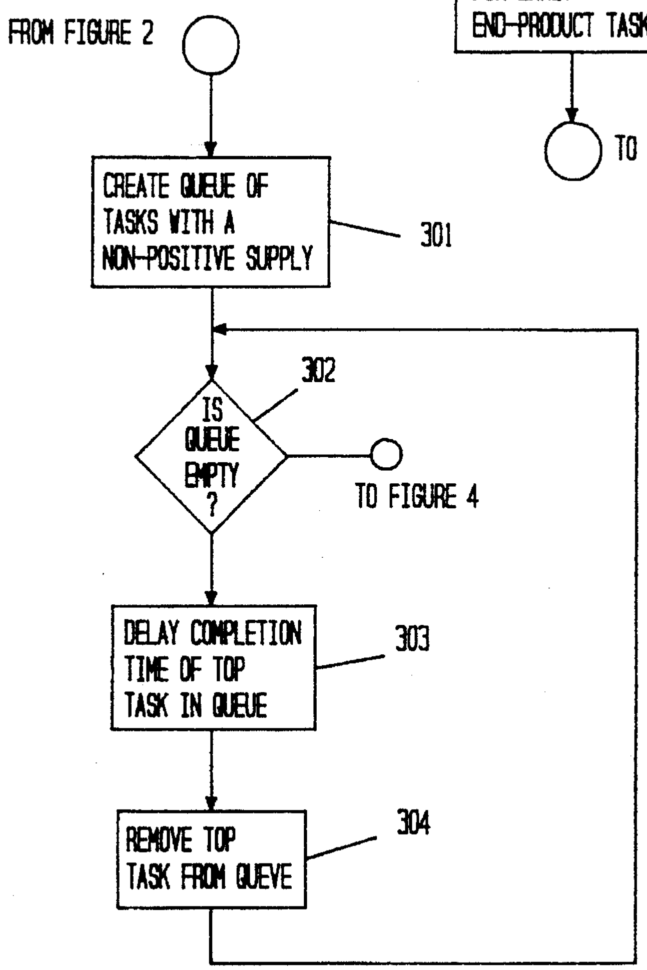
FIG. 3 is the second of two flow charts, which comprise Phase II of a preferred embodiment of the present invention.

The processing of Phase II is represented by the flow charts in FIGS. 2 and 3. In Phase II, the SS develops the Late Finish Schedule from the Early Finish Schedule.

In block 201, the SS develops the Schedule Precedence Graph for the Early Finish Schedule. The Schedule Precedence Graph comprises nodes, which correspond to tasks, and directed arcs, which reflect the order in which tasks must be worked. This ordering of the tasks represents the precedence requirements, which are either technological or assigned. A technological precedence requirement arises from engineering considerations, usually described in a detailed bill of material for the product, whereas an assigned precedence requirement arises from the I sequence of task assignments each worker or work center receives in the Early Finish Schedule. For example, if the Early Finish Schedule assigns a worker to do task A first and task B second, the decision to have the worker do the tasks in that order would appear in the Schedule Precedence Graph as a directed arc from node A to node B. Each node in the Schedule Precedence Graph carries the following information: the worker and work center assigned to the task, the Early Finish Schedule's task completion time, pointers to immediate predecessor and successor nodes, and the task's unit delay cost.

When an end-product task is completed, the product is finished. A finished product can be delivered on or after its due date. Since delivery prompts payment from a customer (and possibly loss of goodwill if the product is delivered late), end-products have a positive unit delay cost. The positive sign reflects an increase in cost due to revenue from interest on a customer's payment that is foregone if an end-product task is delayed beyond its due date, less any savings from delaying expenditures for labor and material for that end-product task.

Conversely, intermediate tasks do not immediately generate revenue. Since the intermediate tasks require labor and material, but have no offsetting revenues, they have a negative unit delay cost to reflect the savings that their postponement would produce in work-in-process inventory costs.

A task's supply is set equal to its unit delay cost. A task with a supply greater than zero is called a facility; all other (intermediate) tasks are activities.

In block 202, the SS creates a fictitious node for each end-product task that Phase I scheduled for completion before its due date. Each fictitious node is initialized with a zero process time, a completion time equal to the end-product task's due date, and a supply equal to the opportunity costs of a customer's delayed payment.

In block 203, the SS adds a directed arc from the end-product node to the fictitious node. The fictitious nodes represent the delivery of those end-product tasks initially scheduled before their due dates. The former end-product tasks are now considered intermediate tasks (activities). In block 204, the supplies of the former end-product tasks are set to reflect any savings from delaying expenditures for labor and material.

In FIG. 3, the SS reduces the work-in-process costs by rescheduling intermediate tasks without further delaying any delivery dates. Recall that the task completion times in the Early Finish Schedule are the earliest possible for the selected sequence. These completion times may result in expenses for labor and material that could be deferred to a later date without delaying the delivery of the finished product. The SS reschedules the tasks, whenever possible, to the latest time that still allows the corresponding finished product to be delivered as scheduled in the Early Finish Schedule. Therefore, the SS examines each intermediate task to determine whether it can be rescheduled.

In block 301, the SS generates a queue of all activities (intermediate tasks) ordered from their latest to earliest completion times.

In block 302, the SS determines whether the queue is empty. If the queue is empty, the SS proceeds to Phase III at FIG. 4; otherwise, the SS continues at block 303.

In block 303, the SS reschedules the completion time of the top task in the queue to equal the earliest start time of its immediate successor tasks.

In block 304, the SS removes the top task from the queue and continues at block 302.

Phase III

In Phase III, the SS takes the Late Finish Schedule and develops the Final Schedule. The Final Schedule is a schedule for which no facility tasks can be profitably delayed. A facility task can be profitably delayed when the cost of delaying the task, its supply, can be offset by cost savings by delaying activity tasks.

Figure 4:
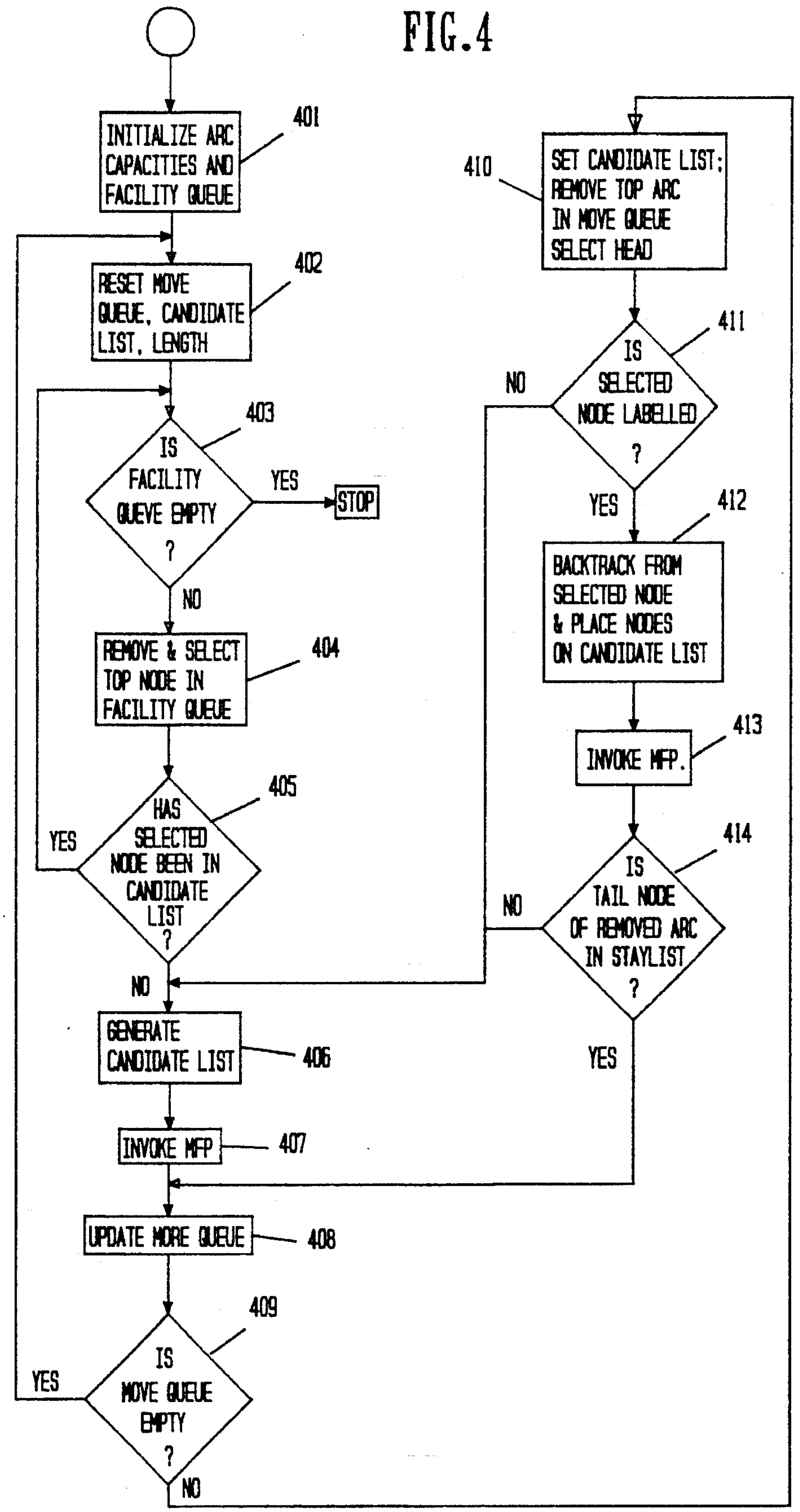
FIG. 4 is the first of two flow charts, which comprise Phase III of a preferred embodiment of the present invention.

In FIG. 4, the SS starts with the Schedule Precedence Graph and the Late Finish Schedule. Since each task is represented as a node on the Schedule Precedence Graph, the terms "task" and "node" are used interchangeably.

In FIG. 4, the SS iteratively generates a Candidate List, which is a list of nodes. The SS then invokes the Maximum Flow Procedure (MFP), which divides the Candidate List into two lists: Stay List and Move List. The Move List contains those nodes that the MFP determines can be profitably postponed. The Stay List contains all the nodes from the Candidate List that are not in the Move List. The SS then delays the start time of the nodes on the Move List through the use of the Move Queue. The Move Queue is a queue of arcs whose tails touch nodes (tail nodes) in the Move List and whose heads touch nodes (head nodes) not in the Move List. The Move Queue is sorted by shortest to longest arc length. The arc length is the time between the completion time of the tail node and the start of the head node. The Move Queue seldom changes substantially from one invocation of the MFP to the next. Therefore, the SS revises the Move Queue rather than generating a new one.

Also, the length of an arc on the Move Queue may be shortened with each invocation of the MFP. However, the SS does not update the length of each arc in the Move Queue with each MFP invocation. Nor does it update the start time of each node on the Move List. Rather, the SS only updates the start time of a node when it is returned on the Stay List by the MFP. The SS keeps track of the cumulative delay of the Move List. When a node is removed from the Move List, its start time is delayed by the net change in cumulative delay of the Move List since the node was added to the Move List. When an arc is added to the Move Queue its length is increased by the cumulative delay of the Move List.

In block 401, the SS initializes the capacities of each arc in the graph. Each arc has two capacities. The capacity of the arc in the direction of its head is set to zero and of its tail is set to infinity. In the MFP, the SS adjusts the capacities of the arcs to reflect the cost of delaying facility nodes being offset by the savings of delaying activity nodes. The SS initializes the Facility Queue, which is a queue of all facility nodes sorted by earliest to latest start time.

In block 402, the SS empties the Move Queue and sets the cumulative delay of the Move List to zero. The SS also empties the Candidate List.

In block 403, the SS tests the Facility Queue. If the Facility Queue is empty, then the SS stops and the Final Schedule is complete; otherwise, the SS continues at block 404.

In block 404, the SS removes and selects the top node from the Facility Queue.

In block 405, the SS tests the selected node. If the selected node has been put on the Candidate List at least once before, then the SS continues at block 403; otherwise it continues at block 406.

In block 406, the SS adds nodes to the Candidate List. The SS adds the selected node to the Candidate List. Also, all nodes are added to the Candidate List such that (1) if the start time of the node were delayed it would cause a delay in the start time of the selected node or (2) if the start time of the selected node were delayed the start time of the node would also be delayed.

Figure 5:
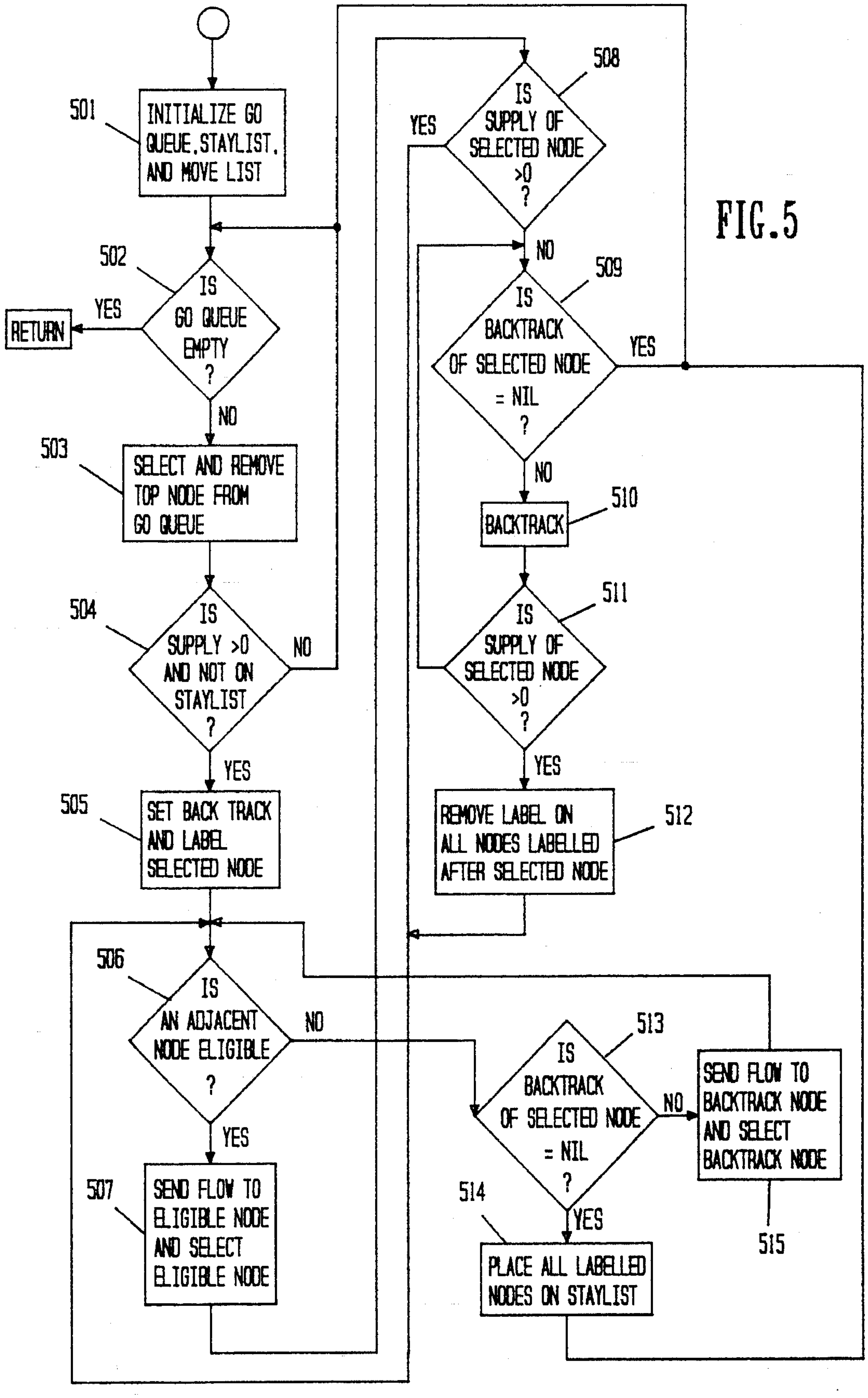
FIG. 5 is the second of two flow charts, which comprise Phase III of a preferred embodiment of the present invention.

In block 407, the SS invokes the MFP at FIG. 5 and continues when the procedure returns at block 408.

In block 408, the SS updates the Move Queue with information returned from the MFP, the Move List and Stay List. The SS adds to the Move Queue those arcs, not already in the Move Queue, whose tail node is in and whose head node is not in the Move List; and the SS increases the length of these arcs by the cumulative delay of the Move List. The SS removes from the Move Queue those arcs whose tail nodes are in the Stay List; and the SS increases the start time of the Stay List nodes by the change in cumulative delay since the node was placed in the Move List.

In block 409, the SS tests the Move Queue. If the Move Queue is empty the SS continues at block 402; otherwise the SS continues at block 410.

In block 410, the SS sets the Candidate List to contain only those nodes that are in the Move List. The SS removes the top arc, the one with the smallest length, from the Move Queue and selects the head node of the removed arc. Also, the SS resets the cumulative delay of the Move List to equal the length of the removed arc.

In block 411, the SS tests the selected node. If the node has not been considered (labeled) by the MFP then the SS continues at block 406; otherwise the SS continues at block 412. The labeling process is more fully described in the explanation of FIG. 5.

In block 412, the SS backtracks from the selected node. Since the selected node has been previously labeled by the MFP, the SS can backtrack from the selected node to the starting node for that path. The SS places each of the nodes along the path onto the Candidate List.

In block 413, the SS invokes the MFP at FIG. 5 and continues when the procedure returns at block 414.

In block 414, the SS tests the Stay List returned by the MFP. If the tail node of the removed arc, the arc removed in block 410, is in the Stay List, then the SS continues at block 408; otherwise it continues at block 406.

In FIG. 5, the SS identifies the nodes on the Candidate List whose start times can be profitably delayed. This procedure is called the Maximum Flow Procedure (MFP). The MFP returns the Move List, which is a list of nodes whose completion times can be profitably delayed.

In block 501, the SS initializes the Go Queue with all the facility nodes on the Candidate List ordered by latest to earliest completion time. The SS also empties the Stay List and Move List.

In block 502, the SS determines whether the Go Queue is empty. If the Go Queue is empty, then the MFP is complete, the SS places all the nodes in the Candidate List but not in the Stay List on the Move List, and the SS returns to FIG. 4; otherwise, the SS continues at block 503.

In block 503, the SS removes and selects the top node from the Go Queue. In block 504, the SS determines whether the selected node is in the Stay List or has a supply less than or equal to zero. If either condition exists, then the SS continues at block 502; otherwise, the SS continues at 505.

In block 505, the SS starts a new MFP iteration. The SS sets the MFP backtrack label for the selected node to nil. Each node has a MFP backtrack label associated with it. As the SS proceeds through the MFP, the MFP backtrack labels are set to indicate the path in the Schedule Precedence Graph along which the SS travels. These MFP backtrack labels allow the SS to backtrack, when necessary. The nil backtrack label indicates the starting node in the path.

In block 506, the SS determines if there is a node adjacent to the selected node that is eligible. A node is eligible if it has not been labeled on this MFP 10 iteration, if the capacity of the arc in the direction of the adjacent node is greater than zero, and if the adjacent node is not on the Stay List. If such an adjacent node exists, then the SS continues processing at block 507; otherwise, the SS continues at 513.

In block 507, the SS determines how much supply it can send to the eligible node; this supply is called "flow." The SS selects the arc between the eligible node and the selected node. The SS can send all of the supply in the selected node up to the capacity of the selected arc in the direction of the eligible node. As stated above, the capacity of an arc in the direction opposite the arrow is always infinite, while initially the capacity in the direction of the arc is zero but can increase. The SS increases the supply of the eligible node, increases the capacity of the selected arc in the direction of the selected node, decreases the capacity of the selected arc in the direction of the eligible node, and decreases the supply of the selected node by the amount of flow. The SS labels the eligible node by setting the MFP backtrack value of the eligible node to point to the selected node. Finally, the SS selects the eligible node and records the current iteration as the iteration number of this selected node.

In block 508, the SS tests the supply of the selected node. If the supply is greater than zero then the SS continues at block 506; otherwise, the SS continues at block 509.

In block 509, the SS tests the MFP backtrack label of the selected node. If the label is equal to nil, the SS has backtracked to the starting node, so the SS continues at block 502; otherwise, the SS continues at block 510.

In block 510, the SS backtracks from the selected node to the node pointed to in the MFP backtrack label. The node pointed to becomes the selected node. In block 511, the SS tests the supply of the selected node. If the supply is greater than zero, then the SS continues at block 512; otherwise it continues at block 509.

In block 512, the supply greater than zero in the selected node means that when the SS last encountered, during this MFP iteration, the selected node, all the supply could not be sent to the eligible node because the capacity of the arc was smaller than the supply of this node. Since the SS could not send all the supply, a residual amount remained. In block 512, the SS removes the label of the selected node and the label of all nodes that were labeled after the selected node. Therefore, these nodes are eligible to receive more supply during this MFP iteration. The SS continues at block 506.

In block 513, the SS has selected a node with a supply greater than zero but there are no eligible adjacent nodes. Consequently, the SS backtracks to return the supply. In block 513, the SS tests the MFP backtrack label of the selected node. If the MFP backtrack label is equal to nil, then the SS continues at block 514; otherwise it continues at block 515.

In block 514, the SS has backtracked to the starting node and there is still a positive supply, that is, not all the supply was distributed to the other nodes. The SS adds to the Stay List all currently labeled nodes which were selected during this MFP iteration. Note that a label may have been removed in block 512 and possibly restored to a node during an iteration of MFP.

In MFP block 515, the SS backtracks from the selected node to the node pointed to by the MFP backtrack label. The SS selects the arc between the selected node and the pointed to node. The SS determines how much supply can be returned to the pointed to node; this supply is called flow. The supply that can be returned is all the supply in the selected node up to the capacity of the selected arc in the direction of the node pointed to. The SS decreases the supply of the selected node, decreases the capacity of the selected arc in the direction of the pointed to node, increases the capacity of the selected arc in the direction of the selected node, and increases the supply of the pointed to node by the amount of flow.

ILLUSTRATIVE EXAMPLE

The following example illustrates the manner by which the method develops a schedule. For purposes of this example, the manufactory comprises three workers, designated as W1–W3, and four work centers, designated as WC–WC4. The FIG. 6 is the compatibility chart, which indicates worker and work center compatibility. The marks (X) on the chart indicate which workers can work at each work center (e.g., W1 and W2 can work at WC4).

Figure 7:
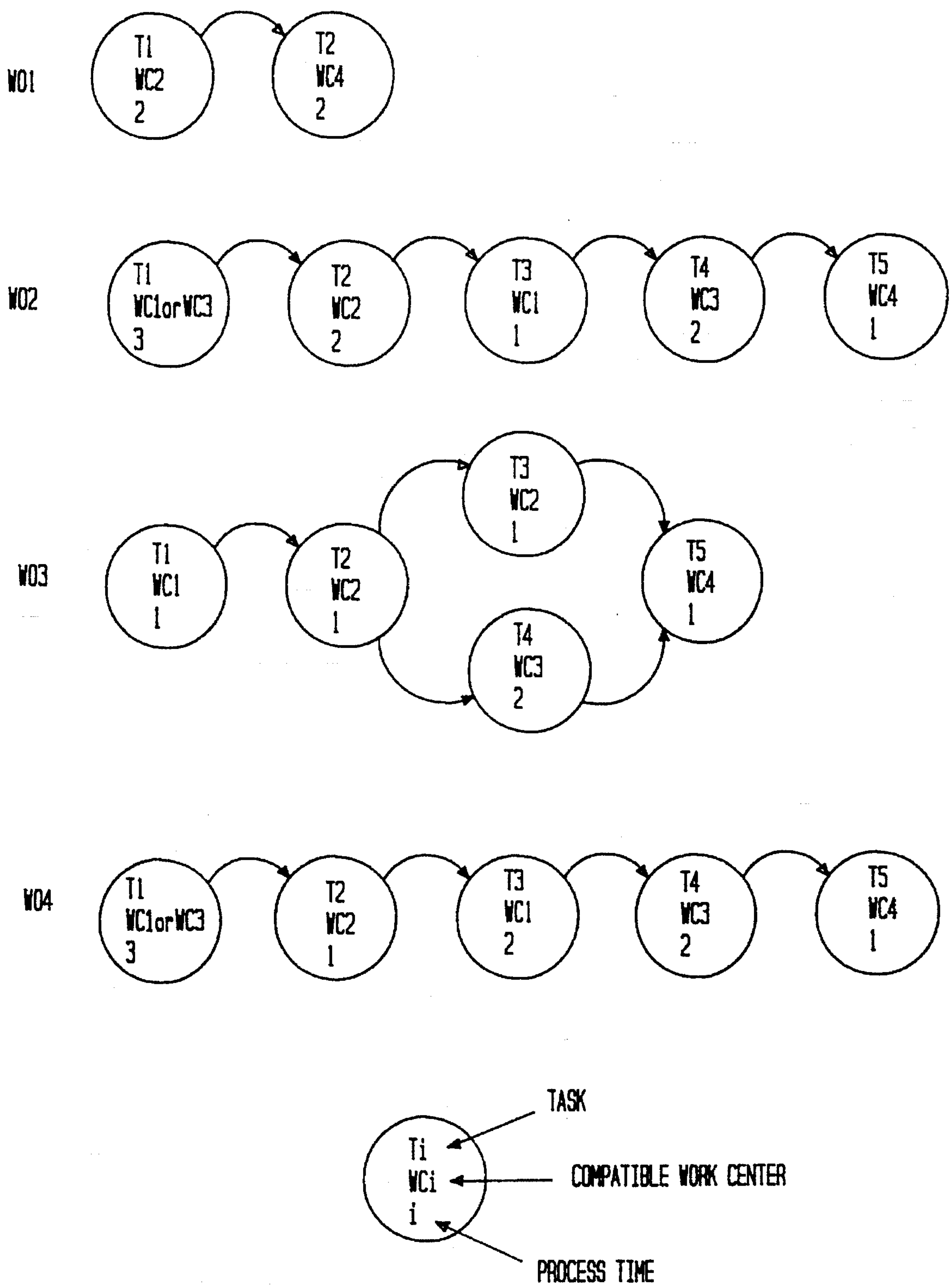
FIG. 7 is the Technological Precedence Graph for the illustrative example.

For this example, there are four work orders, designated as WO1–WO4, that are available to be scheduled. In FIG. 7, the technological precedence for these four work orders is shown. Each circle corresponds to a task, designated as T1–T5 within each circle, that must be performed, and each arc corresponds to an ordering of the tasks (e.g., T5 of WO3 cannot be started until both T3 and T4 complete). Within each circle is the work center at which the task is to be performed (e.g., T1 of WO2 can be performed at WC1 or WC3, whereas T2 of WO2 can only be performed at WC2). Also within each circle is the process time for the task (e.g., T1 of WO4 will take three units of time from start to finish).

FIG. 8 defines some mnemonics that are used in presenting the schedule.

Initially, the tasks are in various stages of completion; i.e., some are complete, some are in process, and some are not started. For this example, the first task of work order one (WO1:T1) is complete; the first task of work order two (WO2:T1) has been in process for one time unit; and all other tasks have not been started. The SS schedules only those tasks that are not started.

Figure 9:
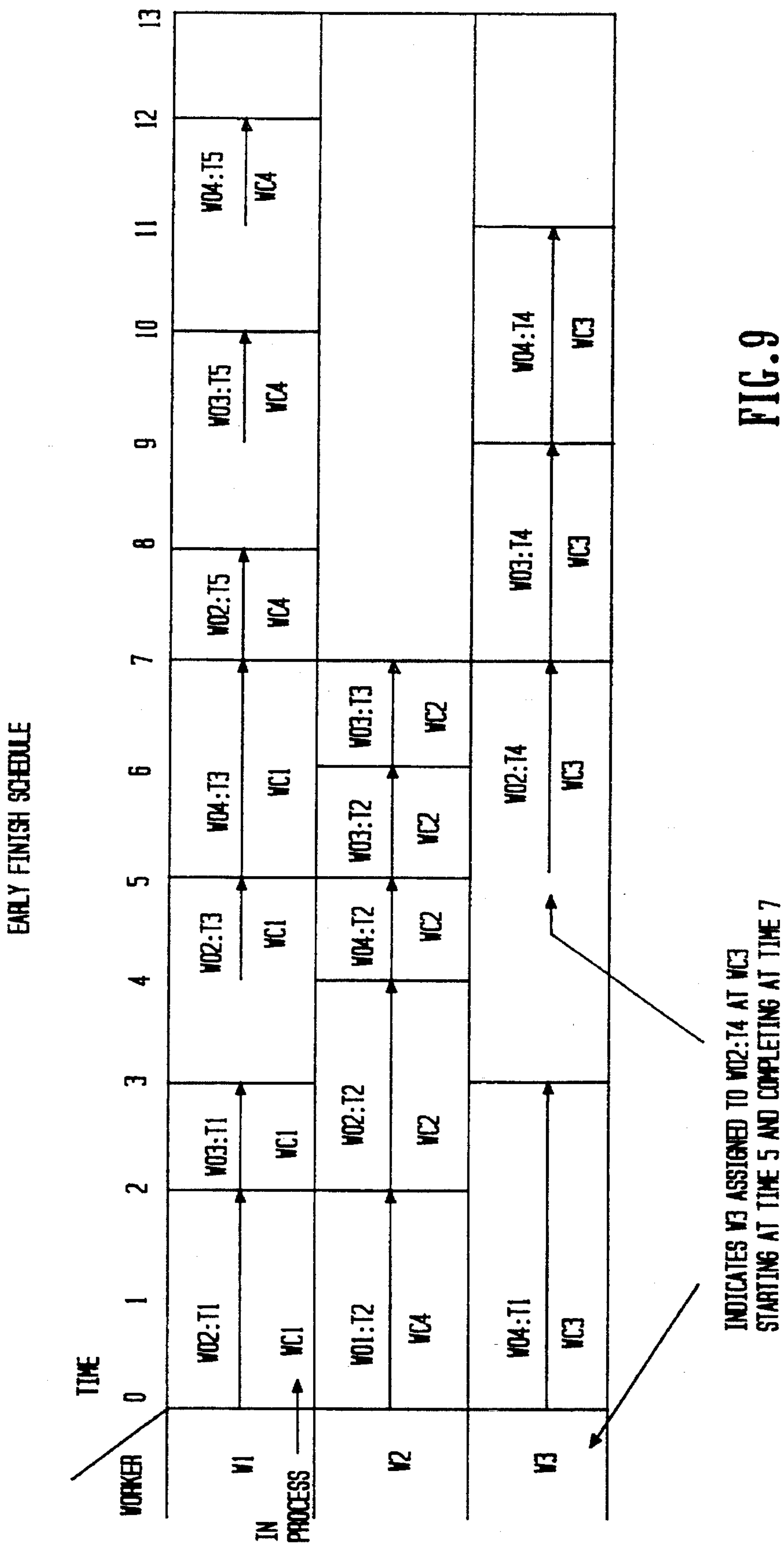
FIG. 9 is the Early Finish Schedule for the illustrative example.

The preceding has defined the data that is needed to produce the Early Finish Schedule for this example. The method illustrated in FIG. 1 will take this data and will generate the schedule shown in the FIG. 9. Each worker is scheduled to work on the assigned task at the assigned work center starting at the assigned time. For example, worker one (W1) is occupied with the in process task WO2:T1; W1 becomes available for tasks that are not yet started at time two. As another example, worker three (W3) is scheduled to work on the fourth task of work order two (WO2:T4) at work center three (WC3) starting at time five. Prior to starting the task, worker three (W3) is scheduled to be idle from time three to time five, at which time he starts the task.

Figure 10:
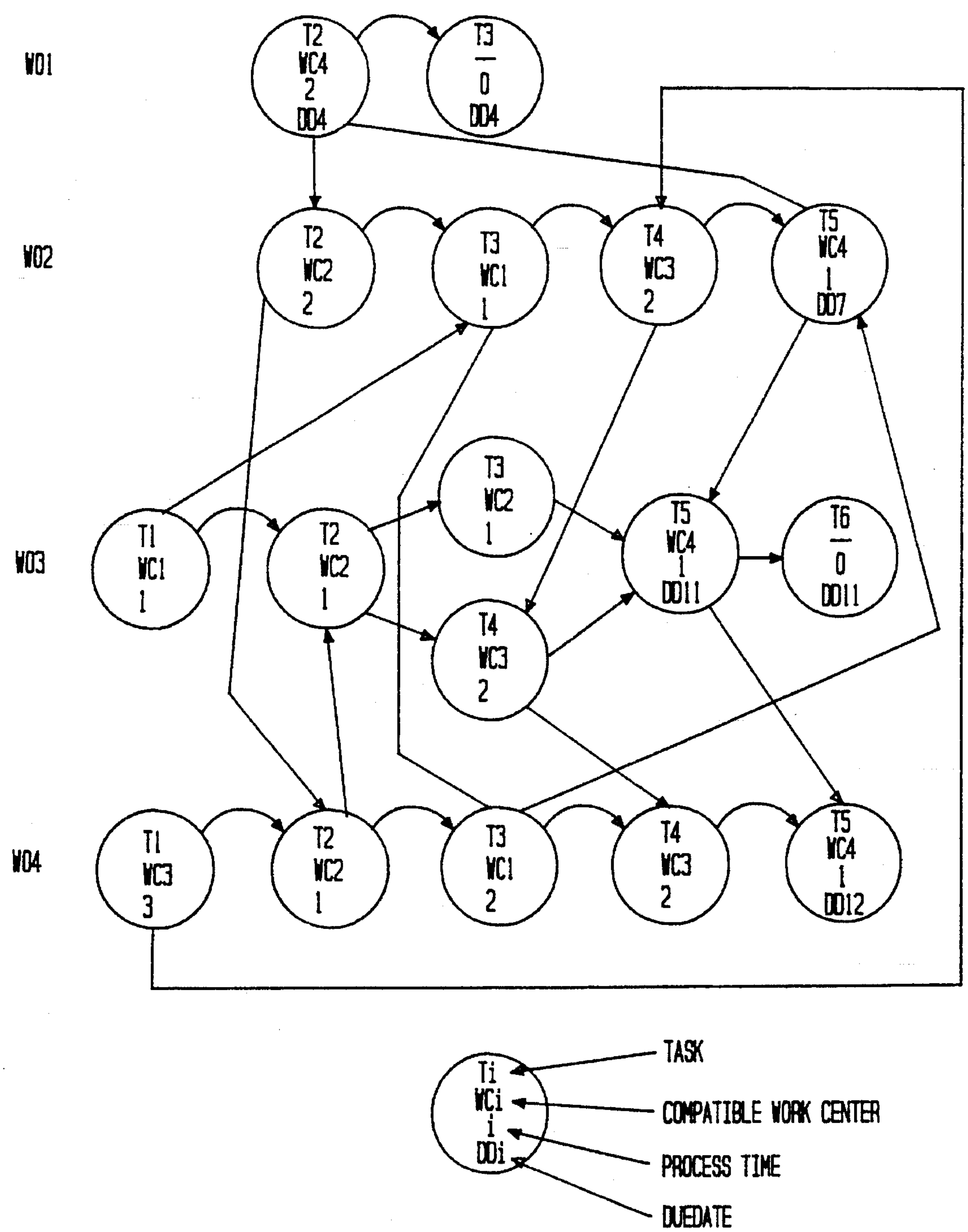
FIG. 10 is the Schedule Precedence Graph for the illustrative example.

After the Early Finish Schedule has been generated, the method proceeds to FIG. 2, Phase II, which generates the Schedule Precedence Graph. The Schedule Precedence Graph for this example is shown in FIG. 10. This graph is similar to the graph shown in FIG. 7. The differences are that the tasks either in process or already completed prior to the start of scheduling are not shown (i.e., WO1:T1 and WO2:T1), that the fictitious nodes WO1:T3 and WO3:T6 have been added for the two early end-product tasks WO1:T2 and WO3:T5, and that the assigned arcs have been added (e.g., the arc from WO1:T2 to WO2:T2). The assigned arcs illustrate the sequence in which each worker and work center will perform the assigned tasks. For example, the arc from node WO4:T1 to node WO2:T4 reflects that worker three (W3) and work center three (WC3) are scheduled to perform task WO4:T1 and them task WO2:T4 the Early Finish Schedule. The arc from WO1:T2 to WO2:T5 indicates that work center 4 (WC4) is scheduled to perform task WO1:T2 and then task WO2:T5 on the Early Finish Schedule. Additionally, the process time for each task and the due date for each end-product task is shown.

Figure 11:
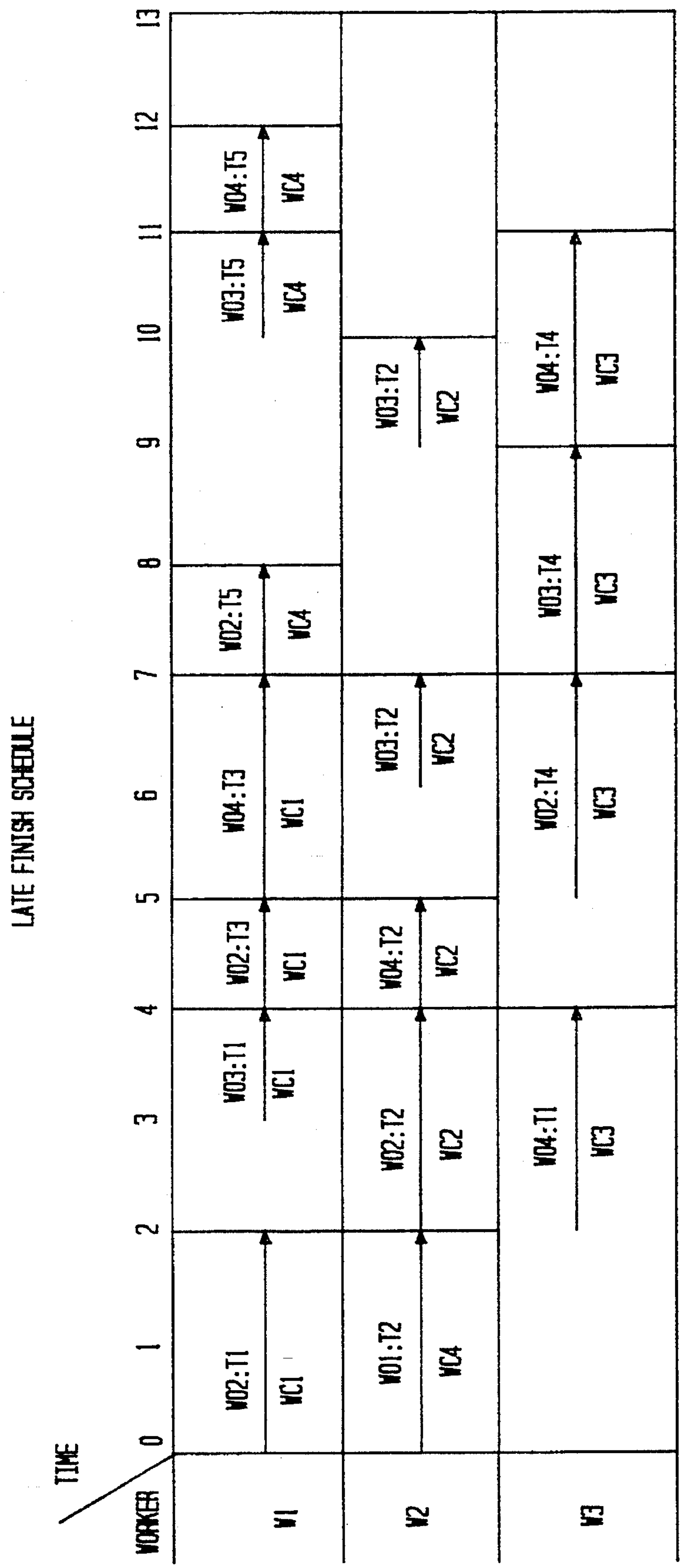
FIG. 11 is the Late Finish Schedule for the illustrative example.

The method illustrated in FIG. 3, Phase II, uses this Schedule Precedence Graph to generate the Late Finish Schedule. The task, worker, and work center assignments are not changed from the Early Finish Schedule in FIG. 9. Rather, only the time that a worker is scheduled to start a task is delayed. These delays are such that no end-product task is further delayed beyond its due date. FIG. 11 shows the Late Finish Schedule for this example.

Figure 12:
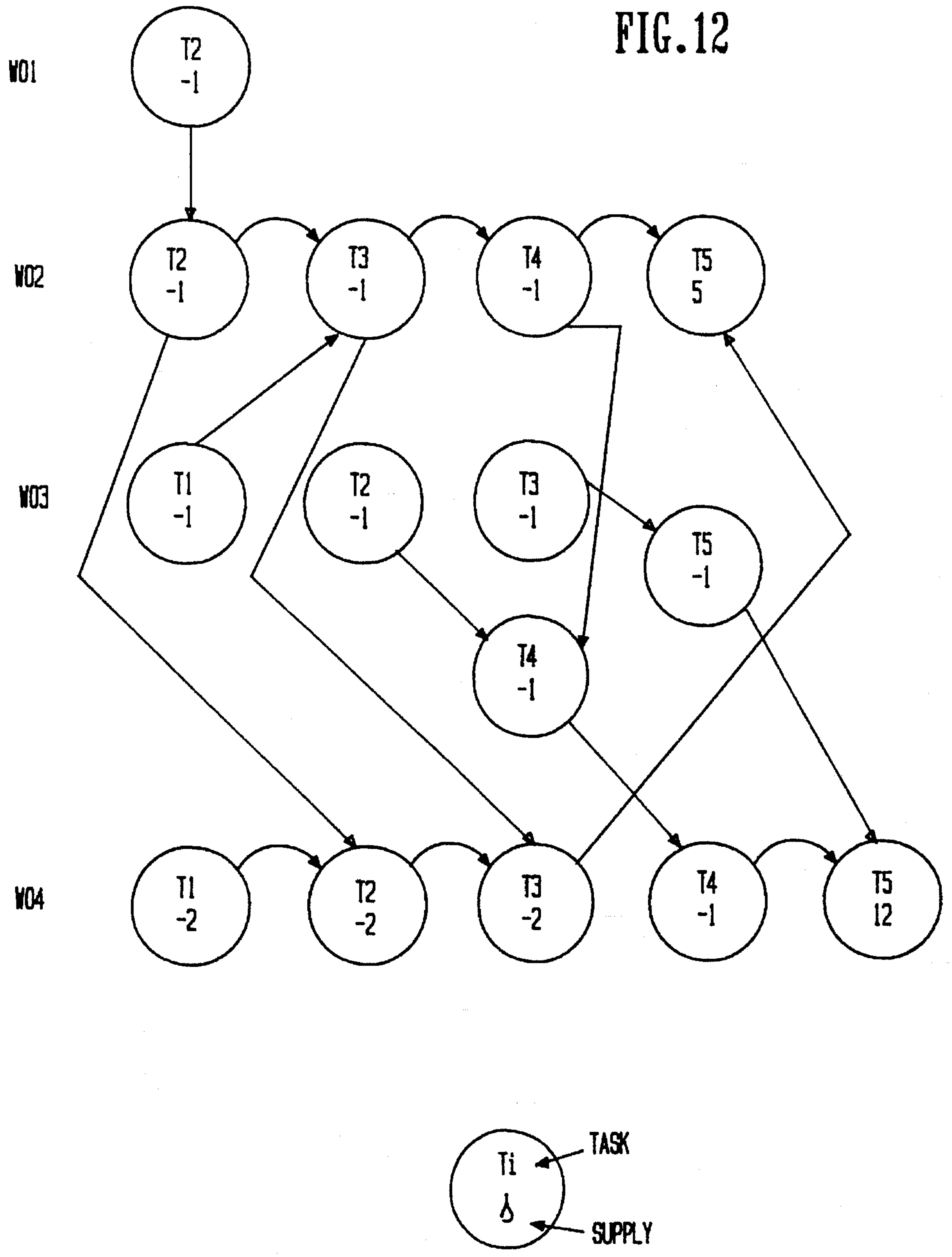
FIG. 12 is the graph that represents the first Candidate List for the illustrative example.

The method illustrated in FIG. 4, Phase III, uses the Schedule Precedence Graph and the Late Finish Schedule. As in Phase II, the task, worker, and work center assignments are not changed from the Early Finish Schedule in FIG. 9. Rather, only the time that a worker is scheduled to start a task is delayed. End-product tasks can be delayed past their due date if the cost can be offset by savings in inventory carrying cost. FIG. 12 shows a portion of the Schedule Precedence Graph that represents the first Candidate List. The nodes in the Candidate List are shown along with the arcs such that the start time of the head node equals the completion time of the tail node (e.g., the start time of WO2:T5 is 7; the completion time of WO4:T3 is also 7; since these times are equal, the arc between the nodes is illustrated). In addition, each node in FIG. 12 displays its supply.

Figure 13:
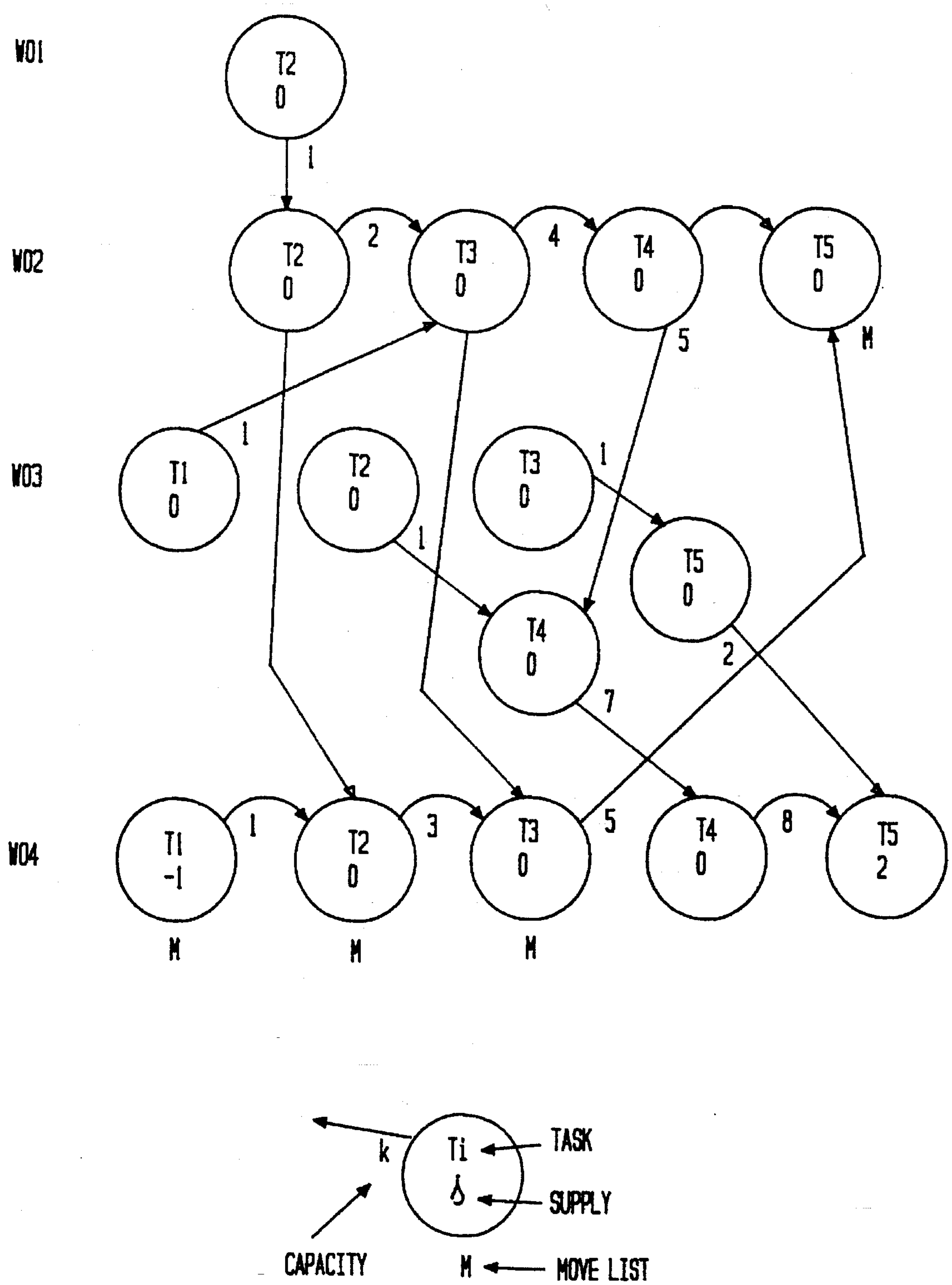
FIG. 13 is the graph that represents the first Candidate List after the MFP was invoked for the illustrative example.

FIG. 13 illustrates the Candidate List portion of the Schedule Precedence Graph after the MFP was invoked the first time in FIG. 4. The number at the tail of each arc represents the capacity in the direction of the arc. The capacity in the direction opposite the arrow is always infinite. Each node with an (M) below it is in the Move List after the first invocation of the MFP. Since the cost of delaying WO2:T5 can be offset by the savings of delaying WO4:T1, WO4:T2, and WO4:T3, these four nodes are in the Move List.

At this stage (block 408 of FIG. 4), the SS identifies those arcs (and their lengths) directed from Move List nodes to nodes not in the Move List. These Move Queue arcs, in order of their lengths, are directed from WO4:T1 to WO2:T4 (with length 1), WO4:T2 to WO3:T2 (with length 1), WO4:T3 to WO4:T4 (with length 2), and WO2:T5 to WO3:T5 (with length 2).

Figure 14:
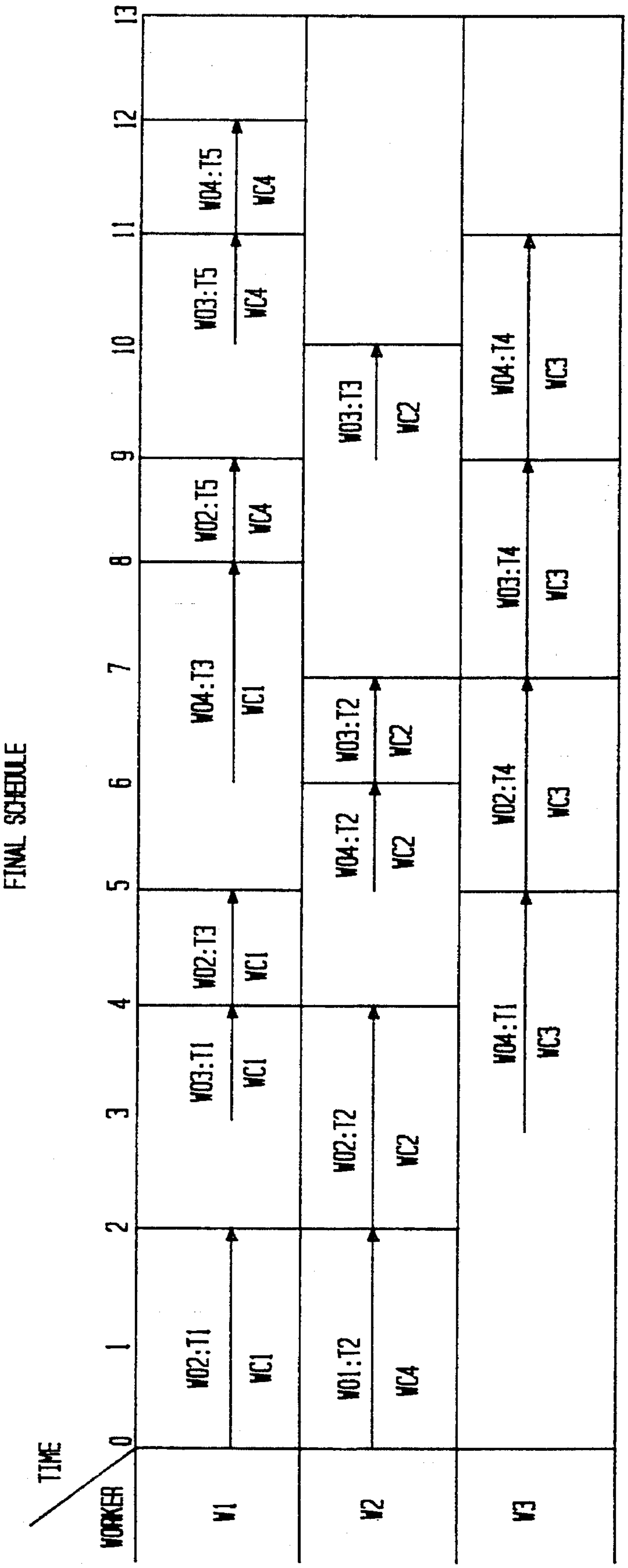
FIG. 14 is the Final Schedule for the illustrative example.

The shortest length of these, a length of 1, is the distance the Move List nodes are delayed. The resulting schedule appears in FIG. 14. One more invocation of MFP would confirm that this schedule is the final schedule for the problem.

Although the invention has been described herein, primarily with respect to preferred methods and systems, it is not intended that the invention be limited to these particular methods and systems. The invention includes the methods and systems described in the claims which follow, including all legal equivalents.

Although the invention is fully described in the "Best Mode for Carrying Out the Invention" section, Tables 1, 2, and 3 contain a hexadecimal listing of an object code embodying the present invention.

Table 1 contains an embodiment of Phase I.

Table 2 contains an embodiment of Phase II.

Table 3 contains an embodiment of Phase III.

This object code was generated on a Digital Equipment Corporation VAX 11/780 computer. The VAX computer was operating under VMS Version 4.5. The object code was generated by VAX FORTRAN V2.6-244.

The following file assignments were made prior to executing these phases.

| | | |
|---|---|---|
| ASSIGN | INPUT.DAT | FOR001 |
| ASSIGN | PHASE1.DAT | FOR002 |

-continued

| | | |
|---|---|---|
| ASSIGN | PHASE2.DAT | FOR004 |

The data input format for Phase I is described by the following. The FORTRAN code is the actual statement that reads the data in. The data was stored in a file named INPUT.DAT.

INPUT

1. Enter the current time [real variable - floating format]
   READ (1, *) C
2. Enter the number of tasks [integer variable - floating format]
   READ (1, *) N
3. Enter the number of work centers [integer variable - floating format]
   READ (1, *) M
4. Enter the number of workers [integer variable - floating format]
   READ (1, *) Q
5. Enter the employee labor rate per unit of time [real variable - floating format]
   READ (1, *) RATE
6. Enter the end product goodwill penalty per unit of time [real variable - floating format]
   READ (1, *) G
7. For each task:
   Enter the work centers that can process the_task in order of preference; enter 0 if no work centers remain [integer variable - FORTRAN format (I(J), J = 1, 16)]
   READ (1, 40) (I3(JJ), JJ = 1, 16)
   40 FORMAT (16I5)
   Enter a "1", the task time and raw material value added for the task [real variable - floating format]
   READ (1, *) VERIFY, DDD, CM
   Enter the technological successor for the task; enter 0 if no successors remain [integer variables - FORTRAN format (I(J), = 1, 16)]
   READ (1, 40) (I3(I1), I1 = 1, 16)
8. For each product task:
   Enter the due date and revenue for the task [real variables - floating format]
   READ (1, *) DDD, PROF
9. For each work center:
   Enter the time when the work center will next become available [real variable - floating format]
   READ (1, *) A
   Enter the last task which was either completed by the work center or is under way at the work center [integer variable - floating format]
   READ (1, *) LASTWC(j)
10. For each worker:
    Enter the worker's current status -- 0 for idle, 1 for busy [integer variable - floating format]
    READ (1, *) STATUSW(k)
    For each busy worker, enter the work center where the worker is occupied [integer variable - floating format]
    READ (1, *) J
11. For each work center:
    Enter the workers in preferred order who can operate the work center; enter 0 if no workers remain [integer variable - floating format]
    READ (1, *) K The Appendix contains object code for an embodiment of Phase I, II, and III.

Appendix

```
Dump of file DRB0:[KB78]PHASE1A.OBJ;1 on 22-JUL-1987 11:38:38.16
File ID (19019,20,0)   End of file block 39 / Allocated 39

Virtual block number 1 (00000001), 512 (0200) bytes

39312D6C 754A2D31 32313002 4E49414D 24413145 53414850 0C040000 00000037 7.......PHASE1A$MAIN.0121-Jul-19 000000
41560100 00160035 353A3031 20373839 312D6C75 4A2D3132 35353A30 31203738 87 10:5521-Jul-1987 10:55.....VA 000020
48500C00 00000100 BC13EC05 00163434 322D362E 3456204E 41525452 4F462058 X FORTRAN V4.6-244... . ......PH 000040
00020000 00350000 00320000 0000BF50 00010402 00474E49 414D2441 31455341 ASE1A$MAING.....P ....2...5..... 000060
4C424F52 50200000 004C0000 00090000 00470000 00440000 00380000 003E0000 ..>...8...D...G.......L... PROBL 000080
F31B0000 0400BE13 FD050017 003D454D 4954203D 572C4357 2C455A49 532D4D45 EM-SIZE,WC,W= TIME=.... . ...... 0000A0
534E4152 5410EF1B 00000401 1717FD04 001B004E 49414D24 41314553 4148500C .PHASE1A$MAIN.... ........ .TRANS 0000C0
1B100204 1B0C0204 00000005 FC504802 040203F7 00535345 52444441 24524546 FER$ADDRESS. ....HP|........... 0000E0
0003FC1B 0001041B 1802041B 04010400 000003FC 1B1C0204 1B180204 1B140204 ............|...............|.. 000100
010E0013 FC1B2402 041B0C01 04000000 02FC1B00 01041B1C 02041B08 01040000 ..............|.........$.|.... 000120
041B1C02 04000000 03FC1B0C 02040000 0001FC1B 3B010401 0E0006FC 1B280104 ..(.|;.....;.|......|.......;... 000140
000004FC 1B300204 00000000 FC1B1001 04000000 03FC1B00 0C6F6003 061B0802 .....`o...|.........|......0.|... 000160
1B1C0204 1B140104 00000003 FC1B08F0 03051B2C 02040000 0000FC1B 30020400 ...0.|..........§..|............ 000180
03061B38 02041B18 02040000 0003FC1B 0802041B 34020400 000002FC 1B000104 ....|......4.....|..........8... 0001A0
00000000 00000003 F81B3802 04000000 00FC1B18 01040000 0003FC1B 000C6F38 8o...|.........|.......8. ....... 0001C0
01040000 0003FC1B 3C02041B 0002041B 2C020400 000003FC 1B200204 1B2C0204 .,.... .|.....,........<.|...... 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 2 (00000002), 512 (0200) bytes

 03FC1B00 0C6F6003 061B0002 041B1C02 04000000 03FC1B00 02041B3C 02041B1C ....<.....|...............`o...|. 000000
 04020400 000000FC 1B240104 00000003 FC1B3002 041B2C02 041B2001 04000000 ..... ......0.|.......$.|........ 000020
 1B440204 00000000 FC1B0402 04000000 04FC1B44 02041B04 02040000 0002FC1B .|.........D.|.........|......D. 000040
 040048AB FA5230AB D05C38AB D05BF41C 000204DE 4BFCFD50 0000041B 08F00305 ..§......P |K*.... [: 8\: OR| H.. 000060
 53D420AB 01D0F91C 52454D49 545F5449 4E492442 494C0E00 00FBFE1C 54494E49 INIT.   ...LIB$INIT_TIMER. !.  rS 000080
 52524505 0060ABFA 00003103 15001318 ABD555F2 1C000404 DE54FE1C 000304DE *.... T*.... UJ .....1..|  ..ERR 0000A0
 FA000031 00130019 1CABD501 0101F01C 504F5453 24524F46 080000FB FE1C524F OR.   ...FOR$STOP.§...J .....1..| 0000C0
 1C52454D 49545F54 41545324 42494C0E 000080CB FAFC1C52 4F525245 050070AB  P..ERROR.||†....LIB$STAT_TIMER. 0000E0
 4C535F45 54495257 24524F46 0C0001FB 7E01CE56 50000043 C88F4750 24AB4EEF  N $PG.*C..PV).  ...FOR$WRITE_SL 000100
 4F460A00 01FB0CAB DDFB1C53 445F545F 4F492452 4F460B00 01FB008C CB9FFA1C .|.†.. ...FOR$IO_T_DS. *  ....FO 000120
 28ABDDFB 1C565F4C 5F4F4924 524F460A 0001FB14 ABDDFB1C 565F4C5F 4F492452 R$IO_L_V. *  ....FOR$IO_L_V. * ( 000140
 545F4F49 24524F46 0B0001FB 0094CB9F FA1C565F 4C5F4F49 24524F46 0A0001FB  ...FOR$IO_L_V.|.†.. ...FOR$IO_T 000160
 4924524F 460A0000 FBFE1C56 5F465F4F 4924524F 460A0001 FB56DDFC 1C53445F  DS.|*V ...FOR$IO_F_V.  ...FOR$I 000180
 4F545324 524F4608 0000FBFE 1C4A4441 45554406 00009CCB FAFC1C44 4E455F4F O_END.||†....DUEADJ.  ...FOR$STO 0001A0
 080000FB FE1C524F 52524505 0000D8CB FA001100 1300191C ABD50101 01F01C50 P.§...J .......|†*...ERROR.  ... 0001C0
 5034ABD0 5608ABD0 E21C504F 54030000 E8CBFA01 0101F91C 504F5453 24524F46 FOR$STOP. ...|† ...TOP. : .V: 4P 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 3 (00000003), 512 (0200) bytes

34ABD0EC 1C504F54 030000E8 CBFA0000 31001900 0C6F5CE4 46000C6F 34E440D1 -@┐4o..F┐\o....1..|† ...TOP. ▪ 4 000000
8FD05C38 ABD0B41C 514C4D45 52050000 F4CBFA38 AB5CD056 000C6F34 E440D050 P▪@┐4o..V▪\ 8|† ...REMLQ. ▪ 8\▪. 000020
E440D150 04ABD004 AB000281 BCE440D0 505CC050 580AC501 5801D057 3B9AC9FF .+.;W▪.X.{.XP \P▪@┐ ... .▪ .P-@┐ 000040
CB001652 9CE440DE 00140013 0016529C E440D550 04ABD001 01001456 000C6D44 Dm..V....▪ .PJ@┐.R......*@┐.R..† 000060
010101F9 1C504F54 5324524F 46080000 F8FE1C52 4F525245 05000164 CBFA016C ].|†d...ERROR.  ...FOR$STOP. ... 000080
1508ECC4 4057D100 140004F1 9CE540D5 5044ABD0 C71C5150 4F540400 0174CBFA |†t...TOPQ.(▪ DPJ@ .¶....-W@+ .. 0000A0
88CB0016 529CE440 DE5004AB D0010011 5204ABD0 2CAB44AB D05708EC C440D000 .▪@+ .W▪ D ,▪ .R...▪ .P*@┐.R..†. 0000C0
BCE44C58 D158D601 01018811 D21C5154 43574D45 52070002 02C00001 80CBFA01 .|†... ....REMWCTQ.‡.....≥X-XL┐ 0000E0
CBFA30AB 52D000CC CB001652 9CE442DE 00183B9A C9FF8F57 D1001100 14000281 .......-W..+.;..*B┐.R..†}.▪R 0|† 000100
5901D050 00028A04 E440D050 2CABD052 30ABD0BF 1C515443 574D4552 070000C4 +...REMWCTQ. ▪ OR▪ ,P▪@┐....P▪.Y 000120
0278D08F C0000031 03126152 D1010101 51000502 D4E441DE 512CABD0 001550D5 JP..▪ ,Q*A┌...Q...-Ra..1.. .▪x. 000140
6E14E44C D45230AB D0E81C52 4F525245 05000154 CBFA30AB 52D0ED59 50F35100 .Q PY ▪R 0]†T...ERROR. ▪ OR┌L┐.n 000160
40D05008 ABD057D4 9A1C5154 4D455205 0000A4CB FA01FEE1 310101FD D231000C ..1‡ ..1* .|† ...REMTQ..┌W▪ .P▪@ 000180
502CABD0 5957D057 D60004F1 9CE540C4 6536018F D02CAB08 ABD05600 0C6F5CE4 ┐\o..V▪ . .▪..6e+@ .¶..≥W▪WY▪ ,P 0001A0
00028A04 E440D050 2CABC050 5700009E 348FC5FD 8E310315 00028A04 E44057D1 ┐W@┐......1. {.4...WP  ,P▪@┐.... 0001C0
050000B4 CBFA30AB 52D000BC CB001652 9CE442DE 00140013 0016529C E442D552 RJB┐.R......*B┐.R..† .▪R 0|† ... 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 4 (00000004), 512 (0200) bytes

00145600 0C6D44E4 42D101E1 1C504F54 5324524F 46080000 FBFE1C52 4F525245 ERROR.  ...FOR$STOP.•.¯B┐Dm..V.. 000000
D0BC1C51 54435744 44410700 00C4CBFA 30AB52D0 00CCCB00 16529CE4 42DE0011 ..•B┐.R..†}.▮R 0|†+...ADDWCTQ. ▮ 000020
5852C058 5034C500 00310315 081CC442 50D150D6 010150D4 01010183 115230AB  OR.....┌P..≥P-PB+....1..{4PX RX 000040
FA38AB5C D0010CCB 000C6E14 E44CDEDB 14001300 0C6E14E4 4CD55CFF 2CC448D0 ▮H+,.\┘L┐.n.....•L┐.n..†..▮\ 8| 000060
D0502CAB D0018D1C 504F5453 24524F46 080000FB FE1C524F 52524505 000104CB †....ERROR.   ...FOR$STOP...▮ ,P▮ 000080
C0585900 009E348F C5000C6E 14E44C01 D00009E3 3CE5405C D000076A 6CE54052 R@ ]┤..▮\@ <¢..▮.L┐.n..{.4...YX 0000A0
4053D053 D6FCA540 000C6F5C E448D000 04F19CE5 4056000C 6F5CE448 C1582CAB  ,X H┐\o..V@ .¶..▮H┐\o..@ |≥S▮S@ 0000C0
DE000C6D 44E44200 04F19CE5 40D0000C 6F34E44C 0004F19C E540D000 0278CCE5  }x..▮@ .¶..L┐4o..▮@ .¶..B┐Dm..• 0000E0
000C6F0C E44CD1E3 1C45434E 45555145 53080001 14CBFA01 18CB000C 6E3CE442 B┐<n..†..|†....SEQUENCE.¢¯L┐.o.. 000100
45434E45 55514553 08000114 CBFA0118 CB000C6F 0CE44CDE 0013000C 6E3CE442 B┐<n....•L┐.o..†..|†....SEQUENCE 000120
44410500 00F4CBFA 38AB5CD0 000C6F0C E44C2CAB D0000C6E 3CE4422C ABD0E61C .‡▮ ,B┐<n..▮ ,L┐.o..▮\ 8|† ...AD 000140
6BD0FC10 3103126B D5CF1C4D 45525145 53060001 24CBFA5C 38ABD0F8 1C514C44 DLQ. ▮ B\|†$...SEQREM.±┘k..1.|▮k 000160
0C6F5CE4 480004F1 9CE540D0 0015000C 6F5CE448 0004F19C E540D150 2CABD058 X▮ ,P-@ .¶..H┐\o....▮@ .¶..H┐\o. 000180
F8F6F005 02FCF902 02F80402 EF110200 6002B9C4 800500C8 C6140013 3CABD500 ,┘ <...≤•...+ . ... .. .. |..§┤ 0001A0
1A0EF402 02F90802 F7F42302 00008509 070EF7B2 0102F8FC F7F80602 F30102F9  .. ..  | ..  .......# .. .. .. 0001C0
E8FEFCFB FAF8F301 02F40502 F90202ED EFF2F007 02FCF9EF 7902F4F7 0000AB09 . ..  .y  |..§  .. .. ..  | |   0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 5 (00000005), 512 (0200) bytes

09030EFB 2502F903 02EFF5F8 DE0302E5 0102F702 02000102 00011009 0C0EFBFE ........... .. ..  .. .% ... 000000
E50000A7 090C0EFF 0402F913 02E9F5EC 0402EFBB FDFEF4FB F4FEF603 02000094 .....  .. ........ .. 000020
02F3F804 02FEF6E6 F80302F8 F4FF0302 F90302E9 F50402F3 0402F5FE FCFB1902 .. .. .. .. .. .. . .. .. 000040
4F525245 05000134 CBFAFC02 0053DD03 02F90102 F7EF0802 F70502F7 DEEDF303 .. .........S..||4...ERRO 000060
EB1C5154 44444105 000144CB FA0101FA 1C504F54 5324524F 46080000 FBFE1C52 R. ...FOR$STOP.|..|D...ADDTQ. 000080
F91C5154 43574444 41070000 C4CBFA30 AB52D000 CCCB0016 529CE442 DE01A911 . .B.R..}..R 0|...ADDWCTQ. 0000A0
4D244131 45534148 500C4BFC 00000000 00000A17 02010163 00FE0631 5230ABD0 . OR1. .c..........|K.PHASE1A$M 0000C0
0152454D 49545F54 494E4924 42494C0E 00081701 54494E49 04000817 014E4941 AIN.....INIT.....LIB$INIT_TIMER. 0000E0
00081701 52454D49 545F5441 54532442 494C0E00 08170152 4F525245 05000817 ....ERROR.....LIB$STAT_TIMER.... 000100
08170151 54435744 44410700 08170151 544D4552 05000817 014A4441 45554406 .DUEADJ.....REMTQ.....ADDWCTQ... 000120
00081701 45434E45 55514553 08000817 01514C4D 45520500 08170150 4F540300 ..TOP.....REMLQ.....SEQUENCE.... 000140
07000817 01515444 44410500 0817014D 45525145 53060008 1701514C 44444105 .ADDLQ.....SEQREM.....ADDTQ..... 000160
02004544 4F432405 0000048A 00E90200 51504F54 04000817 01515443 574D4552 REMWCTQ.....TOPQ..........$CODE.. 000180
01BD0200 4C41434F 4C240600 00019401 89020041 54414450 24060000 004100A9 .A....$PDATA..........$LOCAL... 0001A0
01504F54 5324524F 46080008 1701444D 02000C5C 1001BD02 00494D02 00165370 pS...MI.....\...MD.....FOR$STOP. 0001C0
08170156 5F4C5F4F 4924524F 460A0008 1701444E 455F4F49 24524F46 0A000817 ....FOR$IO_END.....FOR$IO_L_V... 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 6 (00000006), 512 (0200) bytes

00081701 53445F54 5F4F4924 524F460B 00081701 565F465F 4F492452 4F460A00 ..FOR$IO_F_V.....FOR$IO_T_DS.... 000000
0004009A FE503C00 0417FF50 38000402 00D3004C 535F4554 49525724 524F460C .FOR$WRITE_SL.L....8P....<P .... 000020
0538FF50 00DE0005 04FF5000 DC000502 0EFE5058 00040BFF 50560004 05FF5054 TP....VP....XP .....P.....*.P.8. 000040
01740005 7AFF5001 65000501 51FE5001 15000503 FF500113 000513FF 5000E000 .*.P......P......P Q...e.P.z..t. 000060
051DFF50 01C20005 2EFF5001 B100051A FF5001A9 00051DFF 50017600 056BFF50 P.k..v.P.... .P.... .P.... .P... 000080
50023A00 0522FF50 02240005 61FF5001 F6000576 FF5001ED 000502FF 5001EB00 . .P.... .P.v..|.P.a..$.P.*..:.P 0000A0
0520FF50 02EF0005 02FF5002 ED00052B FF5002C4 000521FF 5002C200 05011CFE  .... .P.|..+.P.+.. .P.... .P.. . 0000C0
04480005 0DFF5004 39000513 FF5003DD 000521FF 50033600 05014BFE 50031F00 ...P K...6.P.|..*.P....9.P....K. 0000E0
01000004 8A00BF06 FDE40000 C709020E F50402F9 F7F9B90F E705001B 0014FF50 P......-.    ..|...(......... 000100
754A2D31 32313002 54494E49 04040000 0000002F 00000000 00000003 000700BD  ........../.......INIT.0121-Ju 000120
00160035 353A3031 20373839 312D6C75 4A2D3132 35353A30 31203738 39312D6C 1-1987 10:5521-Jul-1987 10:55... 000140
00000100 BC0BF405 000E3434 322D362E 3456204E 41525452 4F462058 41560100 ..VAX FORTRAN V4.6-244... . .... 000160
65746E45 20200000 001F0000 00000000 03E88050 00010402 021E5449 4E490400 ..INIT......P. ..........  Ente 000180
756E2065 68742072 65746E45 2020454D 49542074 6E657272 75632065 68742072 r the current TIME  Enter the nu 0001A0
45202064 656C7564 65686373 20656220 6F742073 6B736174 20666F20 7265626D mber of tasks to be scheduled  E 0001C0
20737265 746E6563 206B726F 7720666F 20726562 6D756E20 65687420 7265746E nter the number of work centers  0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 7 (00000007), 512 (0200) bytes

 6E452073 72656B72 6F772066 6F207265 62806D75 6E206568 74207265 746E4520  Enter the num.ber of workers En 000000
 68207265 70206574 61722072 6F62616C 20656761 72657661 20656874 20726574 ter the average labor rate per h 000020
 70206C6C 6977646F 6F672065 67617265 76612065 68742072 65746E65 2072756F our enter the average goodwill p 000040
 2074696E 75207265 70207463 75646F72 7020646E 65207265 70207974 6C616E65 enalty per end product per unit  000060
 74207265 746E6520 2C6B7361 74206863 80616520 726F4620 20454D49 5420666F of TIME  For ea.ch task, enter t 000080
 65636F72 70206E61 63202068 63696877 20737265 746E6563 206B726F 77206568 he work centers which  can proce 0000A0
 72702066 6F207265 64726F20 6E692072 65746E65 203B2969 286B7361 74207373 ss task(i); enter in order of pr 0000C0
 63206B72 6F77206F 6E206669 20223022 20726574 6E452020 65636E65 72656665 eference  Enter "0" if no work c 0000E0
 6563206B 726F7720 7478656E 20656880 5420206E 69616D65 72207372 65746E65 enters remain  T.he next work ce 000100
 69742065 68742072 65746E45 20207369 2029286B 73617420 726F6620 7265746E nter for task() is  Enter the ti 000120
 7865646E 69207265 746E6563 206B726F 77207461 206B7361 7420726F 6620656D me for task at work center index 000140
 20524F46 2045554E 45564552 20455441 44204555 44204548 54205245 544E4520  ENTER THE DUE DATE REVENUE FOR  000160
 464F5250 202C5453 4F43202C 4554EC41 44204555 44204B53 4154204C 414E4946 FINAL TASK DUE DA TE, COST, PROF 000180
 02797002 060203E1 0054494E 4904FB1B 00000400 BE0BFD05 000F0405 1001983D =........ . ..... .INIT.'....py. 0001A0
 001DFC1B 4F010401 0E0022FC 1B240104 010E002B FC1B0C01 04010E00 18FC5000 .P|........|+.....$.|"......O.|.. 0001C0
 05010E00 10FC1B00 B4010501 0E0034FC 1B008E01 05010E00 26FC1B71 0104010E ....q.|&........|4..... ..|..... 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 8 (00000008), 512 (0200) bytes

 0105010E 002DFC1B 00010400 00000000 00000200 00000000 000001F0 1B00E801 . ..§....................|-..... 000000
 01A10105 010E0019 FC1B0158 0105010E 0025FC1B 01250105 010E0033 FC1B00F8  ..|3.....%..|%.....X..|...... . 000020
 02061B00 02795402 061B0002 79340206 00000003 FC1B01BA 0105010E 0015FC1B .|...... ..|......4y.....Ty.... 000040
 6004061B 00027918 02060000 0000FC1B 00027920 02060000 0004FC1B 00027930 Oy...|...... y...|.......y.... 000060
 08010400 000003FC 1B01F901 05010E00 16FC1B01 CF010501 0E002AFC 1B000C6F o...|*.....±..|...... ..|....... 000080
 6F380406 1B000279 68020600 00000000 000003F8 1B040104 1B000279 5802061B ...Xy....... ..........hy.....8o 0000A0
 79100206 DE4FFCFD 50000004 00000004 00000010 00000000 BE080004 F01B000C ...§.....................P |O...y 0000C0
 60AB9FFB 1C4C535F 45544952 5724524F 460C0001 FB7E01CE 5E08C25B F71C0002 ... [ .^).  ...FOR$WRITE_SL. .  0000E0
 1C444E45 5F4F4924 524F460A 0000FBFE 1C53445F 545F4F49 24524F46 0B0001FB  ...FOR$IO_T_DS.  ...FOR$IO_END. 000100
 4924524F 460A0001 FB0CABDF FB1C4C53 5F444145 5224524F 460B0001 FB01DDFC |*. ...FOR$READ_SL. ' . ...FOR$I 000120
 500CAB00 0043C88F 45EE1C44 4E455F4F 4924524F 460A0000 FBFE1C52 5F465F4F O_F_R.  ...FOR$IO_END. E.*C.. .P 000140
 0B0001FB 68AB9FFB 1C4C535F 45544952 5724524F 460C0001 FB7E01CE 08AB504A JP .).  ...FOR$WRITE_SL. . h ... 000160
 FB01DDFC 1C444E45 5F4F4924 524F460A 0000FBFE 1C53445F 545F4F49 24524F46 FOR$IO_T_DS.  ...FOR$IO_END.|*. 000180
 5F4C5F4F 4924524F 460A0001 FB10ABDF FB1C4C53 5F444145 5224524F 460B0001 ...FOR$READ_SL. ' . ...FOR$IO_L_ 0001A0
 4F460C00 01FB7E01 CEFB1C44 4E455F4F 4924524F 460A0000 FB5210AB D0FA1C52 R.|. .R ...FOR$IO_END. ).  ...FO 0001C0
 FE1C5344 5F545F4F 4924524F 460B0001 FB70AB9F FB1C4C53 5F455449 52572452 R$WRITE_SL. . p ...FOR$IO_T_DS.  0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 9 (00000009), 512 (0200) bytes

 535F4441 45522452 4F460B00 01FB01DD FC1C444E 455F4F49 24524F46 0A0000FB  ...FOR$IO_END.|'. ...FOR$READ_S 000000
 4F492452 4F460A00 00FBFE1C 525F4C5F 4F492452 4F460A00 01FB14AB DFFB1C4C L. ' . ...FOR$IO_L_R.  ...FOR$IO 000020
 01FB78AB 9FFB1C4C 535F4554 49525724 524F460C 0001FB7E 01CEFB1C 444E455F _END. ).  ...FOR$WRITE_SL. . x . 000040
 DDFC1C44 4E455F4F 4924524F 460A0000 FBFE1C53 445F545F 4F492452 4F460B00 ..FOR$IO_T_DS.  ...FOR$IO_END.|' 000060
 4C5F4F49 24524F46 0A0001FB 6BDFFC1C 4C535F44 41455224 524F460B 0001FB01 . ...FOR$READ_SL.|'k ...FOR$IO_L 000080
 5724524F 460C0001 FB7E01CE FB1C444E 455F4F49 24524F46 0A0000FB FE1C525F  R.  ...FOR$IO_END. ).  ...FOR$W 0000A0
 00FBFE1C 53445F54 5F4F4924 524F460B 0001FB00 80CB9FFA 1C4C535F 45544952 RITE_SL.|.†..  ...FOR$IO_T_DS.  . 0000C0
 1C4C535F 44414552 24524F46 0B0001FB 01DDFC1C 444E455F 4F492452 4F460A00 ..FOR$IO_END.|'. ...FOR$READ_SL. 0000E0
 455F4F49 24524F46 0A0000FB FE1C525F 465F4F49 24524F46 0A0001FB 18ABDFFB  ' . ...FOR$IO_F_R.  ...FOR$IO_E 000100
 0001FB00 88CB9FFA 1C4C535F 45544952 5724524F 460C0001 FB7E01CE FB1C444E ND. ).  ...FOR$WRITE_SL.|.†.. .. 000120
 445F545F 4F492452 4F460B00 01FB0090 CB9FFA1C 53445F54 5F4F4924 524F460B .FOR$IO_T_DS.|.†..  ...FOR$IO_T_D 000140
 41455224 524F460B 0001FB01 DDFC1C44 4E455F4F 4924524F 460A0000 FBFE1C53 S.  ...FOR$IO_END.|'. ...FOR$REA 000160
 000203F7 0000FBFE 1C525F46 5F4F4924 524F460A 0001FB1C ABDFFB1C 4C535F44 D_SL. ' . ...FOR$IO_F_R.  .. ... 000180
 BC6BD004 BC52D055 504A501C AB000043 C88F45DD 1C444E45 5F4F4924 524F460A .FOR$IO_END.'E.'C.. .PJPU.R ..k  0001A0
 FA00A4CB 0CBCDEF6 1C514C4D 41460500 0098CBFA 009CCB08 BCDE0CBC 14ABD008 .. . .' .†..|†....FAMLQ.|' .† .| 0001C0
 0001FB7E 01CEFB1C 00028870 0606D420 ABD4FC1C 51544357 4D414607 0000A0CB †....FAMWCTQ.|r  r..p.... ).  .. 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 10 (0000000A), 512 (0200) bytes

5F545F4F 4924524F 460B0001 FB00ACCB 9FFA1C4C 535F4554 49525724 524F460C .FOR$WRITE_SL.|.† . ...FOR$IO_T  000000
5724524F 460C0001 FB7E01CE FB1C444E 455F4F49 24524F46 0A0000FB FE1C5344 DS.  ...FOR$IO_END. ).  ...FOR$W 000020
00FBFE1C 53445F54 5F4F4924 524F460B 0001FB00 B4CB9FFA 1C4C535F 45544952 RITE_SL.|.† . ...FOR$IO_T_DS.   . 000040
535F4554 49525724 524F460C 0001FB7E 01CEFB1C 444E455F 4F492452 4F460A00 ..FOR$IO_END. ).  ...FOR$WRITE_S 000060
24524F46 0A0000FB FE1C5344 5F545F4F 4924524F 460B0001 FB00BCCB 9FFA1C4C L.|.† . ...FOR$IO_T_DS.  ...FOR$ 000080
000604DE 59FE1C00 0EE83004 06DE0000 31031452 D55701D0 F51C444E 455F4F49 IO_END.|.WJR..1....0 ... Y.... 0000A0
D0F31C46 535F4441 45522452 4F460B00 02FB01DD FC19020F 0105EFDF 015AFC1C .|Z.. ......|.. ...FOR$READ_SF. . 0000C0
00FBF354 10F3FA1C 525F4C5F 4F492452 4F460A00 01FB88DF 010158C0 ABDE5401 .T.  X... ...FOR$IO_L_R.|.T  . 0000E0
02D40406 47DE0015 14ABD554 01D05014 ABD0F21C 444E455F 4F492452 4F460A00 ..FOR$IO_END. . .P..TJ ....G..r. 000100
11FFF3A1 D8E95401 C3AE1301 54D10011 0013B719 6881D051 C0ABDE58 CB1C0005 ...†X.  Q..h. ....T..‡ .T⊥.  .. 000120
5224524F 460B0001 FB01DD01 FFF3A1D8 E95401C3 DD5450F3 58000278 D08FC000 . ..x..X PT. .T⊥.  ... ...FOR$R 000140
01FB2CAB DFFB1C52 5F4C5F4F 4924524F 460A0001 FB04ABDF FB1C4C53 5F444145 EAD_SL. . . ...FOR$IO_L_R. . , . 000160
1C525F46 5F4F4924 524F460A 0001FB30 ABDFFB1C 525F465F 4F492452 4F460A00 ..FOR$IO_F_R. . 0 ...FOR$IO_F_R. 000180
FB7E01CE 001304AB D5001301 04ABD1F0 1C444E45 5F4F4924 524F460A 0000FBFE   ...FOR$IO_END.§- ....J ...). 0001A0
4C5F4F49 24524F46 0A0001FB 04ABDDFB 1C4C535F 45544952 5724524F 460C0001 ...FOR$WRITE_SL. . . ...FOR$IO_L 0001C0
00310312 0104ABD1 0101AA11 E31C444E 455F4F49 24524F46 0A0000FB FE1C565F _V.  ...FOR$IO_END.¢. ... ....T. 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 11 (0000000B), 512 (0200) bytes

01FB7E01 CE0153F9 1C000EE8 2C040647 DE001554 D55801D0 54FFF3A1 D8E9D000 ..........T..XJT..G.......S.).. 000000
545F4F49 24524F46 0B0001FB 00C4CB9F FA1C4C53 5F455449 52572452 4F460C00 ..FOR$WRITE_SL.|.......FOR$IO_T 000020
460B0001 FB00CCCB 9FFA1C56 5F4C5F4F 4924524F 460A0001 FB57DDFC 1C53445F _DS.|.W ...FOR$IO_L_V.|.}....F 000040
525F4C5F 4F492452 4F460A00 01FBFFF6 1AA8E3DF F81C5344 5F545F4F 4924524F OR$IO_T_DS. .......FOR$IO_L_R 000060
44414552 24524F46 0B0001FB 01DDFC1C 444E455F 4F492452 4F460A00 00FBFE1C . ...FOR$IO_END.|.....FOR$READ 000080
24524F46 0A0000F8 FE1C525F 465F4F49 24524F46 0A0001FB 2CA8DFFB 1C4C535F _SL. ......FOR$IO_F_R.  ...FOR$ 0000A0
11926854 F3530002 78D08FC0 63504A50 2CAB0000 43C88F45 CB1C444E 455F4F49 TO_END..E..C.. .PJPc..x..S TX.. 0000C0
2C040647 DE542CAB 4A001553 D55801D0 53FFF3A1 D8E9D02C AB000043 C88F4400 .D..C.. ........S..XJS..J .T.G.. 0000E0
56000043 C88F4656 894EF258 53F35600 0278D08F C06654D0 010156D1 1C000EE8 ....V...Tf ..x..V SX N.VF..C..V 000100
0B0002F8 01DDFC19 020F0105 EFDF8A56 4A560000 C3C88F44 5630AB40 5618AB44 D .V@ OVD.. ..VJV.. ......|..... 000120
4924524F 460B0001 FB0128CB DF012CCB C0ABDEF4 1C46535F 44414552 24524F46 FOR$READ_SF. .  ....(. ...FOR$I 000140
52D55801 D05652D0 E31C444E 455F4F49 24524F46 0A0000FB FE1C4C4E 5F585F4F O_X_NL.  ...FOR$IO_END...RV..XJR 000160
45555145 53080002 03E50000 D4CBFA24 AB57D000 1344AB83 D00153C0 ABDE0015 ...  S... D...W $|T... ....SEQUE 000180
88700606 D0FF1C00 02887006 06D60014 0158D1E5 5856F357 24ABD0F2 1C45434E NCE. . $W VX -X......p.......p. 0001A0
E1570152 F1EC1C00 02809C06 064857D0 FD1C0002 78CC0606 4857D058 FC1C0002 ...|X.WH..}x... .WH....... R.W. 0001C0
CC1C0006 04DE52D4 FD1C5154 54455305 0000E4CB FA10AB52 D000ECCB 148CDEFD  . .. ..R .|.....SETTQ. .R.....} 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 12 (0000000C), 512 (0200) bytes

028874E9 DEF8AD55 4E000031 03140002 8870E9D5 5801D0FC AD000288 70E9D059 Y.⊥p...‡|.XJ⊥p.....1..NU‡ •⊥t.. 000000
5F455449 52572452 4F460C00 01FB7E01 CE57F05C C6D05469 44DE5410 ABD05600 .V. .T•D|T.≤\§W›.¯ ...FOR$WRITE_ 000020
460A0001 FB57DDFC 1C53445F 545F4F49 24524F46 0B0001FB 00F8CB9F FA1C4C53 SL.|.† . ...FOR$IO_T_DS.|•W ...F 000040
0001FB01 DDFC1C44 4E455F4F 4924524F 460A0000 FBFE1C56 5F4C5F4F 4924524F OR$IO_L_V.  ...FOR$IO_END.|•. .. 000060
1C525F46 5F4F4924 524F460A 0001FB2C ABDFFB1C 4C535F44 41455224 524F460B .FOR$READ_SL. ’ , ...FOR$IO_F_R. 000080
455F4F49 24524F46 0A0000FB FE1C525F 465F4F49 24524F46 0A0001FB 50ABDFFB  ’ P ...FOR$IO_F_R.  ...FOR$IO_E 0000A0
64504A50 F8AD4050 50AB0000 43C88F45 66504A50 2CAB0000 43C88F45 DF1C444E ND.’E.•C.. ,PJPfE.•C.. PP@‡ PJPd 0000C0
524F460B 0001FB01 00CB9FFA 1C4C535F 45544952 5724524F 460C0001 FB7E01CE ›.¯ ...FOR$WRITE_SL.|.†.. ...FOR 0000E0
FCA947DF FA1C525F 4C5F4F49 24524F46 0A0001FB 66DFFC1C 53445F54 5F4F4924 $IO_T_DS.|’f ...FOR$IO_L_R.|’G | 000100
525F4C5F 4F492452 4F460A00 01FB84DF FC1C525F 4C5F4F49 24524F46 0A0001FB  ...FOR$IO_L_R.|’. ...FOR$IO_L_R 000120
000EE82C E547C355 D71C0004 04DEFF1C 444E455F 4F492452 4F460A00 00FBFE1C .  ...FOR$IO_END..•....•U G , .. 000140
D0010108 ECC54750 D0001808 ECC54750 D108ECC5 4750D000 1408ECC5 47D55086 .PJG( ....PG[ .¯PG( ....PG( .... 000160
AB52D000 1500009E 348F52D1 52D60101 01000031 03145AE4 1C000278 CC050647 G..}x...¬Z..1.....≥R¯R.4......R 000180
D0FFFD86 ECEB42F8 1CFC0304 4AD05248 ABD0FA1C 524F5252 45050001 08CBFA48 H|†....ERROR.|. HR.J..|. B  . .. 0001A0
08ECC547 000EE82C E540C350 F11CFC03 044AD0FC A4FCA940 C250F71C FC03044A J..|. P @ | |.J..|.¶P @ , ..G( . 0001C0
4AD008EC C54150D0 51F71CFC 03044AD0 001408EC C541D551 F61CFC03 044AD050 P.J..|.┤QJA( ....J..|. Q.PA( ..J 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 13 (0000000D), 512 (0200) bytes

05064AD5 08ECC541 50D051F7 1CFC0304 4AD00018 08ECC541 50D151F5 1CFC0304 ..|.|Q PA{ ...J..|. Q PA{ .J J.. 000000
ECEB42D0 001552D5 0101FF66 315ADB1C 0004F19C 05064AD0 0015FC1C 0004F19C .¶...|...J...¶...Z1f...JR...B  000020
14ABD554 EC1C0004 04DE5201 D0FE6958 01FCADF1 010101FF 433152D7 57FFFD86 . .W.R1C....¶|.X  .R.... TJ . 000040
DFFB1C4C 535F4441 45522452 4F460B00 01FB01DD 01010156 000C6E40 E4DE0015 ...@n..V... ...FOR$READ_SL.  000060
444E455F 4F492452 4F460A00 00FBFE1C 525F465F 4F492452 4F460A00 01FB54AB  T ...FOR$IO_F_R.  ...FOR$IO_END 000080
535F4441 45522452 4F460B00 01FB01DD FF08C650 4A5054AB 000043C8 8F45EE1C . E..C.. TPJP..  ...FOR$READ_S 0000A0
5F4F4924 524F460A 0000FBFE 1C525F4C 5F4F4924 524F460A 0001FB66 DFFC1C4C L.|'f ...FOR$IO_L_R.  ...FOR$IO_ 0000C0
A45214AB F3000C6F 5CE447FF 04C6D057 000C6E3C E447D000 1586D5CD 1C444E45 END.    ...G <n..W  ..G \o..  .R 0000E0
45522452 4F460B00 01FB01DD 01010156 000C6E18 E4DE0015 6BD55701 D010BCD4  ....W k... .n..V...  ...FOR$RE 000100
524F460A 0000FBFE 1C525F4C 5F4F4924 524F460A 0001FB66 DFFC1C4C 535F4441 AD_SL.|'f ...FOR$IO_L_R.  ...FOR 000120
F71C4C53 5F444145 5224524F 460B0001 FB01DD00 1386D5F8 1C444E45 5F4F4924 $IO_END. J...  ...FOR$READ_SL. 000140
00E60000 FB5234AB D0FA1C52 5F4C5F4F 4924524F 460A0001 FB34AB52 D034ABDF ' 4 R 4 ...FOR$IO_L_R.|  4R .. . 000160
44E442D0 000C6F0C E447000C 6E3CE442 D0D81C44 4E455F4F 4924524F 460A0002 ...FOR$IO_END.  B <n..G .o..  B D 000180
C01C514C 44444105 000118C8 FA58AB57 D0011CCB 10BCDE00 0C6F34E4 47000C6D m..G 4o..  . ...W X| ....ADDLQ. 0001A0
F3000281 BCE442D4 001514AB D55601D0 0100156B D55201D0 8C576BF3 5758ABD0   XW kW..RJk....VJ ... B  ... 0001C0
01FB01DD 01010015 6BD55801 D0576BD0 001514AB D55601D0 E8526BF3 F45614AB  .V  kR ..VJ ....kW..XJk..... . 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 14 (0000000E), 512 (0200) bytes

 4F492452 4F460A00 01FB58AB 52D058AB DFF71C4C 535F4441 45522452 4F460B00 ..FOR$READ_SL. ' X:R X ...FOR$IO 000000
 34C50013 52D5D41C 444E455F 4F492452 4F460A00 00FB5258 ABD0FA1C 525F4C5F  L R.|: XR ...FOR$IO_END.┌┘R..{4 000020
 56D05052 C0500002 81BCE442 0AC50002 81BCE442 D6FF2CC4 4052D050 56C05058 XP VP:R@+,.≥B┐ ...{.B┐ ...P RP:V 000040
 02E60102 E4E70202 E5E6E5E2 E5F3E6E5 F4120200 B9C28005 00C60002 81BCE440 @┐ ...≤...  ...  ≠    ≠ ..─┐..≠. 000060
 FEF80202 FBFA0102 FDE8D401 02E70102 E4E4E4FA FDF10802 F1FBFCFC F4E6D901 .┐≠ || ¶..¶ |┐┐┐..─..┌  ..| ..   000080
 E40202F8 010200FE F5F40102 E6C30102 E9F7FEFE E5F5D201 02FF0902 F80102F5 ├.. .....‡├  ┴.. ≠.. ├ ...  ..┐ 0000A0
 DC0102DB FBD0FEED 0802FA02 02F80102 F1FAFBFC EFFEFCF1 0102D9E4 050200F2  ...┐...¶|  | |¶.. ..|..  : ... 0000C0
 FAFDF8F7 E20202E3 ECF20202 F30902E6 FEFDFBF8 FEBDF201 02F3F001 02C7F0F4  §(..§ ..       ≠.. ..   ¢..   | 0000E0
 E9F3F3DE FC0102E7 EF0202FD FB0302F6 F8FCE7F2 0302E6E7 0202F602 02FDFEF8    ..┤...─≠.. ─| ┤.. .. ─..|'  ┴ 000100
 11081CC4 465801C3 0011AE58 57F3E202 0020F9F3 FCDEF403 02F8F0F8 F8FC0402 ..|  §..  '|  ..  WX‡.. .XF+... 000120
 49044FFC 00000000 00000A17 03010145 04895614 ABF3081C C44658D0 01010100 .....:XF+..  .V..E............|O.I 000140
 41460700 08170151 4C4D4146 05000817 01000200 02000200 02000205 0554494E NIT..................FAMLQ.....FA 000160
 00081701 51545445 53050008 17014543 4E455551 45530800 08170151 5443574D MWCTQ.....SEQUENCE.....SETTQ.... 000180
 02004544 4F432405 000007AC 00E90200 514C4444 41050008 1701524F 52524505 .ERROR.....ADDLQ..┴. ....$CODE.. 0001A0
 01BD0200 4C41434F 4C240600 027A4801 89020041 54414450 24060000 021400A9  .......$PDATA....Hz...$LOCAL.. . 0001C0
 02005349 02000E19 6001BD02 00494D02 00165370 01BD0200 4C4C4103 000927C4 +'...ALL.. .pS...MI.. . `....IS.. 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 15 (0000000F), 512 (0200) bytes

4F460A00 08170144 4E455F4F 4924524F 460A0008 17014555 44030002 904401BD  .D....DUE.....FOR$IO_END.....FO 000000
24524F46 0A000817 01565F4C 5F4F4924 524F460A 00081701 525F4C5F 4F492452 R$IO_L_R.....FOR$IO_L_V,.....FOR$ 000020
4924524F 460B0008 17015344 5F545F4F 4924524F 460B0008 1701525F 465F4F49 IO_F_R.....FOR$IO_T_DS.....FOR$I 000040
5224524F 460B0008 17014653 5F444145 5224524F 460B0008 17014C4E 5F585F4F O_X_NL.....FOR$READ_SF.....FOR$R 000060
50020300 050200F3 004C535F 45544952 5724524F 460C0008 17014C53 5F444145 EAD_SL.....FOR$WRITE_SL. ......P 000080
0513FF50 026F0005 0FFF5002 60000502 FF50025E 00052FFF 50024B00 05022EFE  ....K.P./..^.P.... `.P....o.P... 0000A0
036B0005 77FF5002 F2000500 87FE5002 E300051F FF5002BC 000524FF 5002B700 . .P.$.. .P....¢.P .... .P.w..k. 0000C0
051DFF50 040F0005 15FF5003 F5000520 FF5003EA 00051CFF 50038100 0532FF50 P.2....P....┬.P. ..├.P.......P... 0000E0
62000500 9FFE5005 53000506 FF50053F 000506FF 50053100 0501AAFE 50046300 .c.P  ...1.P....?.P....S.P ....b 000100
10FF5005 F700050D FF5005E6 00050EFF 5005CF00 050EFF50 05B10005 11FF5005 .P.... .P....±.P....≠.P..... .P.. 000120
07120005 53FF5006 B400057E FF50068D 000512FF 50066C00 0566FF50 061D0005 ....P.f..l.P......P.¯.. .P.S.... 000140
052EFF50 07650005 62FF5007 3D000577 FF500733 00050CFF 50071B00 0519FF50 P......P....3.P.w..≈.P.b..e.P... 000160
FB0102FA FBF9FA01 02EC0102 B90EE805 001A0009 FF50079C 00050CFF 50079300 ...P.......P...... . .. ..|  |.. 000180
30024543 4E455551 45530804 00000000 00330103 00028D01 000007AC 00BF06FF .. . ..... ....3.......SEQUENCE.0 0001A0
30312037 3839312D 6C754A2D 31323535 3A303120 37383931 2D6C754A 2D313231 121-Jul-1987 10:5521-Jul-1987 10 0001C0
F0050012 3434322D 362E3456 204E4152 54524F46 20584156 01000016 0035353A :55.....VAX FORTRAN V4.6-244...§ 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 16 (00000010), 512 (0200) bytes

FD050013 00000006 FC500001 0402000A 45434E45 55514553 08000000 0100BC0F . ......SEQUENCE......P|........ 000000
01040000 0003FC50 00020402 016F0045 434E4555 51455308 F71B0000 0400BE0F . ..... .SEQUENCE.o.....P|...... 000020
00140013 04BCD55B DC1C0002 04DE480C FD500000 04000000 00000000 00F81B00 .. ...........P .H.....[┘ ..... 000040
52450500 6BFA0CAB 0CBCDE08 AB04BCDE 00110000 31031500 190CBCD5 01010011 ....┘ .....1..... . . . .|k..ER 000060
4108BCD0 51000927 C0E0D000 0927C0E0 D650EB1C 000304DE 01E111FC 1C524F52 ROR.|.........  P≥ '... ' ..Q. .A 000080
0CBCD500 04F19CE2 41FCA243 D00013FC A243D553 04BCD052 DE1C0004 04DEFCA0 .|.....R. .S┘C |...C |A .¶..┘ . 0000A0
11FCA243 000927C0 E0D05304 BCD0D81C 000278CC 05064100 04F19CE2 41D00012 ...A .¶..A..}x.... .S. '..C |. 0000C0
000278CC 050641D4 00120CBC D50004F1 9CE241D4 FCA24300 0927C0E0 D0010100 .... '..C |┌A .¶..┘ ...┌A..}x.. 0000E0
E0D60101 01040012 08BCD5DE 1CFC0504 43FCA243 D05304BC D000120C BCD5F21C . ┘ .... .S.C |C..|..┘ ........≥. 000100
D0D91C00 0BA08C05 0643D653 08BCD0FC A04104BC D0510009 27C0E0D0 000927C0  '.... '..Q. .A.|. .S≥C.........'. 000120
41D00012 0CBCD500 04F19CE2 41000278 CCE243D0 00130002 78CCE243 D55308BC  .S┘C }x.....C }x..A .¶..┘ ....A 000140
00110002 78CCE243 000927C0 E0D05308 BCD0D41C 000278CC 05064100 04F19CE2  .¶..A..}x...┌. .S. '..C }x.... 000160
000278CC 050641D4 00120CBC D50004F1 9CE241D4 000278CC E2430009 27C0E0D0 .. '..C }x..┌A .¶..┘ ...┌A..}x.. 000180
02000203 0345434E 45555145 5308480C 00000000 00000A17 03010079 0004FF1C ....y.............H.SEQUENCE..... 0001A0
0400A902 0045444F 43240500 00014000 E9020052 4F525245 05000817 01000200 .........ERROR..⊥.@....$CODE.. .. 0001C0
0927C401 BD02004C 41434F4C 24060000 00100189 02004154 41445024 06000000 ....$PDATA..........$LOCAL.. .+'. 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 17 (00000011), 512 (0200) bytes

004E4941 4D455206 000E1960 01BD0200 53490200 0E196001 BD02004C 4C410300 ..ALL.. .`....IS.. .`....REMAIN. 000000
FE501C00 0407FF50 1800040E FF501100 0424FF50 0F000406 FF500D00 0402006A j.....P.....P.$...P.....P.....P  000020
5000A000 051EFF50 00890005 0DFF506D 00042DFF 505E0004 14FF501F 00040121 |....P.... P.-..mP......P.......P 000040
00050DFF 50010000 0531FF50 00EE0005 04FF5000 BF00050E FF5000AC 000507FF .... .P.... .P.... .P.1....P.... 000060
02000012 090C0EF5 0102F710 0200B92C CA050038 07FF5001 3700051F FF50011F ..P....7.P..8..°, ... ..├....... 000080
00BF06FF 00F4F9F4 FEF0EEF3 F3F5F3FA F7ED00F4 F9F5FEF3 EEF6EFF3 F3FFED01 . .   ┤   ├  .  │ ├  §   ..... 0000A0
6C754A2D 31323130 02524F52 52450504 00000000 00300003 0002BD01 00000140 @.... ....0.........ERROR.0121-Jul 0000C0
01000016 35353A30 31203738 39312D6C 754A2D31 3235353A 30312037 3839312D -1987 10:5521-Jul-1987 10:55.... 0000E0
05000000 0100BC0C F305000F 3434322D 362E3456 204E4152 54524F46 20584156 VAX FORTRAN V4.6-244... ....... 000100
54532045 554C4156 204E4920 524F5252 4520D250 00010402 00340052 4F525245 ERROR.4.....P‡ ERROR IN VALUE ST 000120
FD050010 3D322045 554C4156 203D3120 45554C41 56203D23 20544E45 4D455441 ATEMENT #= VALUE 1= VALUE 2=... 000140
0DFC1B00 0104010E 000FFC50 00020402 0116524F 52524505 FA1B0000 0400BE0C . .....|.ERROR......P|.........|. 000160
4800FD50 0000041B 25010401 0E0009FC 1B1C0104 010E0009 FC1B0F01 04010E00 :.......|.-.......|.....%....P .H 000180
01F86B9F FC1C4C53 5F455449 52572452 4F460C00 01FB7E01 CE5BFA1C 000204DE ;....||[).-  ...FOR$WRITE_SL.|.k . 0001A0
CEFB1C44 4E455F4F 4924524F 460A0000 FBFE1C53 445F545F 4F492452 4F460B00 ..FOR$IO_T_DS.  ...FOR$IO_END. ) 0001C0
4924524F 460B0001 FB08AB9F FB1C4C53 5F455449 52572452 4F460C00 01FB7E01 .-  ...FOR$WRITE_SL. . . ...FOR$I 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 18 (00000012), 512 (0200) bytes

01FB10AB 9FFB1C56 5F4C5F4F 4924524F 460A0001 FB04BCDD FB1C5344 5F545F4F O_T_DS. . . ...FOR$IO_L_V. . . . 000000
565F4C5F 4F492452 4F460A00 01FB08BC DDFB1C53 445F545F 4F492452 4F460B00 ..FOR$IO_T_DS. . . ...FOR$IO_L_V 000020
524F460A 0001FB0C BCDDFB1C 53445F54 5F4F4924 524F460B 0001FB18 AB9FFB1C . . . ...FOR$IO_T_DS. . . ...FOR 000040
524F4608 0000FBFE 1C444E45 5F4F4924 524F460A 0000FBFE 1C565F4C 5F4F4924 $IO_L_V.   ...FOR$IO_END.   ...FOR 000060
00020002 0303524F 52524505 48000000 00000000 0A170301 00921C50 4F545324 $STOP..............H.ERROR...... 000080
00415441 44502406 0000002E 00A90200 45444F43 24050000 007700E9 02000002 ....⊥.w....$CODE.. .......$PDATA. 0000A0
0A000817 01504F54 5324524F 46080008 17014C41 434F4C24 06000000 20018902 ........$LOCAL.....FOR$STOP..... 0000C0
4F460B00 08170156 5F4C5F4F 4924524F 460A0008 1701444E 455F4F49 24524F46 FOR$IO_END.....FOR$IO_L_V.....FO 0000E0
B908EE05 00144C53 5F455449 52572452 4F460C00 08170153 445F545F 4F492452 R$IO_T_DS.....FOR$WRITE_SL.... . 000100
02504F54 03040000 0000002E 00030002 BD010000 007700BF 06F9B3E6 F7000202 ... ‡ . .w..............TOP. 000120
31203738 39312D6C 754A2D31 3235353A 30312037 3839312D 6C754A2D 31323130 0121-Jul-1987 10:5521-Jul-1987 1 000140
F505000D 3434322D 362E3456 204E4152 54524F46 20584156 01000016 35353A30 0:55....VAX FORTRAN V4.6-244...├ 000160
04020019 504F5403 FC1B0000 0400BE0A FD05000E 00504F54 03000000 0100BC0A . ......TOP.... . .....|.TOP.... 000180
00000A17 03010058 000408BC FD1C0003 04D0048C FD1C0004 04D04000 FD500000 ..P .@:....  .:....  ...X....... 0001A0
02004544 4F432405 00000013 00E90200 00020002 0202504F 54034000 00000000 .....@.TOP........⊥......$CODE.. 0001C0
01BD0200 4C41434F 4C240600 00000001 89020041 54414450 24060000 000000A9  ......$PDATA.........$LOCAL.. . 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 19 (00000013), 512 (0200) bytes

 F8F8FE03 02000302 B90AEC05 0016325A 02000000 2801BD02 00315A02 000278D0 .x...Z1.. .(....Z2... . .....     000000
 2D313231 30025150 4F540404 00000000 002F0003 0002BD01 00000013 00BF06FF .. ...... ..../.......TOPQ.0121- 000020
 0035353A 30312037 3839312D 6C754A2D 31323535 3A303120 37383931 2D6C754A Jul-1987 10:5521-Jul-1987 10:55. 000040
 0100BC0B F405000E 3434322D 362E3456 204E4152 54524F46 20584156 01000016 ....VAX FORTRAN V4.6-244... . .. 000060
 00000402 00160051 504F5404 FB1B0000 0400BE0B FD05000F 51504F54 04000000 ....TOPQ... . ..... .TOPQ....... 000080
 40000000 00000000 0A170301 004E0408 BCFD1CFC 030440D0 5004BCD0 4000F850 P .@. .P.@..|.  ..N...........@ 0000A0
 00000000 A9020045 444F4324 05000000 1000E902 00000200 02020251 504F5404 .TOPQ........⊥......$CODE.. .... 0000C0
 0200032C 8001BD02 004C4143 4F4C2406 00000000 01890200 41544144 50240600 ..$PDATA.........$LOCAL.. ...... 0000E0
 00000030 00030002 00BD0100 00001000 BF06FFF3 FE080200 B907EF05 0013335A Z3... . ... .. ..... .....0... 000100
 2D313235 353A3031 20373839 312D6C75 4A2D3132 31300251 54444441 05040000 ....ADDTQ.0121-Jul-1987 10:5521- 000120
 3456204E 41525452 4F462058 41560100 00163535 3A303120 37383931 2D6C754A Jul-1987 10:55....VAX FORTRAN V4 000140
 0400BE0C FD050010 00515444 44410500 00000100 BC0CF305 000F3434 322D362E .6-244... . ......ADDTQ.... . .. 000160
 78D00120 00000000 00000408 0004E850 08020402 00995154 44444105 FA1B0000 ...|.ADDTQ......P .......... ..x 000180
 5BE91C00 0204DE48 1CFD5000 00041B04 02041B00 02040000 00020000 00000002 ...................P .H....⊥[ 0001A0
 DE5204BC D0ED1CFC 03044008 BCD05004 BCD004BC D618AB0C AC04C30C AB0CACD0 . . . . . .≥ .. .P. .@..|. . .R 0001C0
 446341D1 54EA1CFC 030440D0 51FD1CFC 030442D0 00130152 D1505202 C75318BB  .S(.RP-R....B..|. Q.@..|.┬T-AcD 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 20 (00000014), 512 (0200) bytes

115204AB D0F61C51 54484358 4506001C ABFA04AB 50D06B52 D0010100 11001963 c......Rk P .| ...EXCHTQ.-| .R. 000000
00020002 03035154 44444105 481C0000 00000000 0A170301 005C0004 010101C7 (.....\............H.ADDTQ..... 000020
0000A902 0045444F 43240500 00006900 E9020051 54484358 45060008 17010002 .......EXCHTQ..⊥.i....$CODE.. .. 000040
0278D001 BD02004C 41434F4C 24060000 00280189 02004154 41445024 06000000 ....$PDATA....(.....$LOCAL.. .x. 000060
B919DD05 0025001A FF504D00 0404FF50 4B000433 FF503400 04020013 315A0200 ..Z1.....4P.3..KP....MP...%..". 000080
01000000 6900BF06 FFFDFEFC EFFEE901 02FBFC03 02F80102 F3FDEC03 02000302 .....  .. ..| ..⊥  |  .. .i.... 0000A0
3839312D 6C754A2D 31323130 0251544D 45520504 00000000 00300003 000200BD .....0.......REMTQ.0121-Jul-198 0000C0
20584156 01000016 35353A30 31203738 39312D6C 754A2D31 3235353A 30312037 7 10:5521-Jul-1987 10:55....VAX 0000E0
544D4552 05000000 0100BC0C F305000F 3434322D 362E3456 204E4152 54524F46 FORTRAN V4.6-244.... . ......REMT 000100
04080004 E8500C02 040200FF 51544D45 5205FA1B 00000400 BE0CFD05 00100051 Q.... . .....|.REMTQ......P .... 000120
000002FC 1B000204 1B040204 00000002 00000000 000278D0 01200000 00000000 ...... .x..................|... 000140
0CAC04C3 10AB0CAC D05BF31C 000204DE 487CFD50 0000041B 0802041B 04020400 ...........P |H".... [. . . . . 000160
BCD00101 01000031 04BCD762 D4001201 04BCD108 BC62D052 A71C0003 04DE1CAB ."....  R b .-  ....rb. .1...... 000180
001404BC 55D15655 01C15553 02C50154 1CBBDE53 01D004BC D762FCA2 40D05004 .P @ |b. ..S" .T.{.SU .UV-U ... 0001A0
ABFA6B55 D004AB53 D0001564 416440D1 51FCA245 D050FCA2 43D00015 04BC56D1 -V ....C |P E |Q-@dAd...S ..Uk| 0001C0
00196441 6440D151 FCA246D0 50FCA245 D0010100 11C91C51 54484358 45060020  ..EXCHTQ.+.....E |P F |Q-@dAd.. 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 21 (00000015), 512 (0200) bytes

FA08AB56 D004AB53 D0001564 416445D1 51FCA246 D055FCA2 43D05655 D0010011 ...▪UV▪C |U▪F |Q¯EdAd..▪S .▪V .| 000000
00000000 0A170301 005C0004 01018A11 5308ABD0 F71C5154 48435845 06002CAB  ...EXCHTQ. ▪ .S......\......... 000020
E9020051 54484358 45060008 17010002 00020002 03035154 4D455205 487C0000 ..|H.REMTQ.............EXCHTQ..⊥ 000040
00380189 02004154 41445024 06000000 0000A902 0045444F 43240500 0000BD00 . ....$CODE.. ......$PDATA....8. 000060
2B00040B FF502400 0402003B 315A0200 0278D001 BD02004C 41434F4C 24060000 ...$LOCAL.. .▪x...Z1;....$P....+ 000080
008C0005 42FF5079 000453FF 50680004 24FF5057 00046AFF 50510004 008FFE50 P ...;QP.j..WP.$..hP.S..yP.B.... 0000A0
FDFEFAF5 EC030200 B924D205 00300018 FF5000A3 000504FF 50008E00 0503FF50 P......P.... .P...O..‡$ ... ├| 0000C0
00BD00BF 06FFFEFE FCF0EFFC 0102FEEF 0202FEFE F1EFFAFA FCFCF801 02FDF4FD    .. |||| ¶  ..  ..| §|  .. . . 0000E0
2D6C754A 2D313231 30025154 48435845 06040000 00000031 00030002 BD010000 ... ....1........EXCHTQ.0121-Jul- 000100
01000016 0035353A 30312037 3839312D 6C754A2D 31323535 3A303120 37383931 1987 10:5521-Jul-1987 10:55..... 000120
06000000 0100BC0D F2050010 3434322D 362E3456 204E4152 54524F46 20584156 VAX FORTRAN V4.6-244............ 000140
00000402 00320051 54484358 4506F91B 00000400 BE0DFD05 00115154 48435845 EXCHTQ... . ..... .EXCHTQ.2..... 000160
1CFC0304 40FF1CFC 030442D0 52048CD0 51F91CFC 030440D0 5008BCD0 4004F850 P .@▪ .P▪@..|. Q▪ .R▪B..|..@..|. 000180
43584506 40040000 00000000 0A170301 005004FF 1CFC0304 4251D052 04BCD0F9  ▪ .R▪QB..|...P.............@.EXC 0001A0
06000000 0000A902 0045444F 43240500 00002C00 E9020000 02000202 02515448 HTQ........⊥......$CODE.. ...... 0001C0
315A0200 0278D001 BD02004C 41434F4C 24060000 00000189 02004154 41445024 $PDATA..........$LOCAL.. .▪x...Z1 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 22 (00000016), 512 (0200) bytes

00000030 00030002 00BD0100 00002C00 BF06FFF4 EFF4FE02 0200B909 ED050015 ... . ...   .. ..:.... .....0... 000000
2D313235 353A3031 20373839 312D6C75 4A2D3132 31300251 4C444441 05040000 ....ADDLQ.0121-Jul-1987 10:5521- 000020
3456204E 41525452 4F462058 41560100 00163535 3A303120 37383931 2D6C754A Jul-1987 10:55....VAX FORTRAN V4 000040
0400BE0C FD050010 00514C44 44410500 00000100 BC0CF305 000F3434 322D362E .6-244... . .......ADDLQ.... . .. 000060
00280120 00000000 00000408 0004E850 04020402 00AA514C 44444105 FA1B0000 ...|.ADDLQ .....P .......... .(. 000080
E91C0002 04DE480C FD500000 04000000 00FC1B00 02040000 00020000 00000000 .............|.......P .H....⊥ 0000A0
5204BCD0 F11CFC03 044008BC D05004BC D004BCD6 14AB0CAC 04C308AB 0CACD05B [. . . . . .≥ .. .P. .@..|.¶. .R 0000C0
F21CFC03 0440D051 FD1CFC03 0442D050 FD1CFC04 0442D000 130152D1 5314BBDE . .S-R....B..|. P.B..|. Q.@..|.  0000E0
43584506 0018ABFA 6B52D020 ABF81CFC 040442DE 01010011 00196340 6341D150 P-Ac@c.......B..|.   .Rk| ...EXC 000100
00000000 0A170301 00670401 0101B711 52F91CFC 040442D0 526BD0FB 1C514C48 HLQ. .kR.B..|. R. ....g......... 000120
E9020051 4C484358 45060008 17010002 00020002 0303514C 44444105 480C0000 ...H.ADDLQ............EXCHLQ..⊥ 000140
00240189 02004154 41445024 06000000 0000A902 0045444F 43240500 00007900 .y....$CODE.. .......$PDATA....$. 000160
00315102 00000078 01BD0200 325A0200 00002801 BD02004C 41434F4C 24060000 ...$LOCAL.. .(....Z2.. .x....Q1. 000180
02000102 B916E005 00220026 FF505100 0404FF50 4F000447 FF503000 04020013 .....OP.G..OP....QP.&."..". .... 0001A0
00300003 0002BD01 00000079 00BF06FF FDFEF8E7 FEE10102 FBF80502 F3FDEC05 .   ..  ..' —  .. .y.... ....0. 0001C0
3235353A 30312037 3839312D 6C754A2D 31323130 02514C4D 45520504 00000000 ......REMLQ.0121-Jul-1987 10:552 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 23 (00000017), 512 (0200) bytes

204E4152 54524F46 20584156 01000016 35353A30 31203738 39312D6C 754A2D31 1-Jul-1987 10:55....VAX FORTRAN  000000
00010402 002A0051 4C4D4552 05000000 0100BC0C F305000F 3434322D 362E3456 V4.6-244.........REMLQ.*..... 000020
4E4F5352 2C4E4F53 4C2C4854 41462C57 4C494156 412C4A49 2C494920 1D0FDC50 P.. II,IJ,AVAILW,FATH,LSON,RSON 000040
E8500802 0402011B 514C4D45 5205FA1B 00000400 BE0CFD05 00100405 0601983D =...............|.REMLQ......P  000060
000000F8 1B000204 00000002 00000000 00000028 01200000 00000000 04080004 ..........(................... 000080
0CAB0CAC D05BF31C 000204DE 487CFD50 0000041B 0402041B 00020400 00000200 ...............P |H..... [. . . 0000A0
01000031 04BCD762 D4001201 04BCD108 BC62D052 D61C0003 04DE18AB 0CAC04C3 . . . ......≥R.b .- .....b. .1... 0000C0
43D10101 55C81C00 0404DE54 18BBDE53 01D0048C D762FCA2 40D05004 BCD00101 ... .P.@ |b. ...S. .T.....U..-C 0000E0
50FCA240 D051FCA2 43D05024 A543D000 1504BC4C A543D100 00310315 04BC24A5  $ ...1..-C L ....C $P.C |Q.@ |P 000100
D00011BA 1C514C48 43584506 001CABFA 6B53D024 AB24A543 DE001564 406441D1 -Ad@d...C $ $.Sk| ...EXCHLQ. ... 000120
11514CA5 43D00019 64416440 D151FCA2 41D050FC A240D051 4CA543D0 5024A543 C $P.C LQ.@ |P.A |Q-@dAd...C LQ. 000140
04AB51D0 6B53D000 15644664 40D156FC A241D050 FCA243D0 5124A543 D0010100 ....C $Q.C |P.A |V-@dFd...Sk.Q . 000160
00000000 0A170301 00670004 FF743153 04ABD0F8 1C514C48 43584506 0028ABFA | (..EXCHLQ. . .S1t...g......... 000180
E9020051 4C484358 45060008 17010002 00020002 0303514C 4D455205 487C0000 ..|H.REMLQ.............EXCHLQ..⊥ 0001A0
00340189 02004154 41445024 06000000 2400A902 0045444F 43240500 0000D900 .....$CODE.. .$....$PDATA....4. 0001C0
00315102 00000078 01BD0200 325A0200 00002801 BD02004C 41434F4C 24060000 ...$LOCAL.. .(....Z2.. .x....Q1. 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 24 (00000018), 512 (0200) bytes

 74000429 FF505E00 040081FE 50550004 00ABFE50 2B00040B FF502400 0402003D =....$P....+P  ...UP ....^P.)..t 000000
 0016FF50 00C10005 07FF5000 A9000509 FF5000A2 000550FF 50008700 0563FF50 P.c....P.P.. .P..... .P.... .P... 000020
 02FEFBE5 010200FE EFEAF8F5 F00102FD F4FDFDFE FAF5EC0C 0200B923 D305002F /..└# ... ├|      ..§├ ┬  ...    . 000040
 41460504 00000000 00300103 000200BD 01000000 D900BF06 FF00FDFC F1EFF901 .  ¶| ... . ..... .....Ó.......FA 000060
 39312D6C 754A2D31 3235353A 30312037 3839312D 6C754A2D 31323130 02514C4D MLQ.0121-Jul-1987 10:5521-Jul-19 000080
 3434322D 362E3456 204E4152 54524F46 20584156 01000016 35353A30 31203738 87 10:55....VAX FORTRAN V4.6-244 0000A0
 4605FA1B 00000400 BE0CFD05 00100051 4C4D4146 05000000 0100BC0C F305000F .... . ......FAMLQ.... . ......|.F 0000C0
 1504BCD5 5101D050 04BCD05B F21C0002 04DE481C FD500000 04020053 514C4D41 AMLQS.....P .H*.... {: .P:.Q┘ .. 0000E0
 D054FCA3 D0001404 BC83D128 A36301C1 635102C5 5328A2DE 52CE1C00 0404DE00 .*....)R* (S{.Qc .c (-. ...: |T: 000100
 0A170301 00580004 D45150F3 FCA24451 D05424A3 D0001404 BC24A3D1 FCA24451 QD |- $ ...: $T:QD | PQr..X..... 000120
 45444F43 24050000 004D00E9 02000002 0101514C 4D414605 481C0000 00000000 .......H.FAMLQ......┴.M....$CODE 000140
 02004C41 434F4C24 06000000 04018902 00415441 44502406 00000000 00A90200 .. .......$PDATA..........$LOCAL.. 000160
 2E000437 FF501400 04020013 31510200 00007801 BD020032 5A020000 002801BD  .(....Z2.. .x....Q1......P.7... 000180
 004D00BF 06FFFCF0 F1FBFCE9 F7040200 B90CEA05 00180009 FF503E00 0409FF50 P....>P......┬. ... ┴| ¶§|.. .M. 0001A0
 2D6C754A 2D313231 3002514C 48435845 06040000 00000031 00030002 BD010000 ... .....1........EXCHLQ.0121-Jul- 0001C0
 01000016 0035353A 30312037 3839312D 6C754A2D 31323535 3A303120 37383931 1987 10:5521-Jul-1987 10:55..... 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 25 (00000019), 512 (0200) bytes

06000000 0100BC0D F2050010 3434322D 362E3456 204E4152 54524F46 20584156 VAX FORTRAN V4.6-244... . ...... 000000
00000402 00320051 4C484358 4506F91B 00000400 BE0DFD05 0011514C 48435845 EXCHLQ... . ..... .EXCHLQ.2..... 000020
1CFC0304 40FF1CFC 030442D0 5204BCD0 51F91CFC 030440D0 5008BCD0 4004F850 P .@: .P:@..|. Q: .R:B..|..@..|. 000040
43584506 40040000 00000000 0A170301 005B04FF 1CFC0304 4251D052 04BCD0F9  : .R:QB..|...[.............@.EXC 000060
06000000 0000A902 0045444F 43240500 00002C00 E9020000 02000202 02514C48 HLQ........⊥.,.....$CODE.. ...... 000080
325A0200 00002801 BD02004C 41434F4C 24060000 00000189 02004154 41445024 $PDATA..........$LOCAL.. .(....Z2 0000A0
00002C00 BF06FFF4 EFF4FE04 0200B909 ED050015 00315102 00000078 01BD0200 .. .x....Q1.... . ...  .. .:.. 0000C0
6C754A2D 31323130 02515443 57444441 07040000 00000032 00030002 00BD0100 .. ......2........ADDWCTQ.0121-Jul 0000E0
01000016 35353A30 31203738 39312D6C 754A2D31 3235353A 30312037 3839312D -1987 10:5521-Jul-1987 10:55.... 000100
07000000 0100BC0E F1050011 3434322D 362E3456 204E4152 54524F46 20584156 VAX FORTRAN V4.6-244...¶. ...... 000120
040200C9 51544357 44444107 F81B0000 0400BE0E FD050012 00515443 57444441 ADDWCTQ.... . ..... .ADDWCTQ+... 000140
00000000 00000003 00000000 000278D0 01200000 00000000 04080004 E4500402 ..P┐.......... .:x.............. 000160
10AC04C3 08AB10AC D05BE41C 000204DE 480CFD50 00000400 000000FC 18000204 ....|........P .H'....┐[: . . . . 000180
5314BBDE 5208BCD0 E51CFF2C 0305400C BCD05004 BCC05008 BC34C508 BCD614AB  .≥ .{4 .P  .P: .@.:.: : .R' .S 0001A0
0540D051 04BCC051 F91CFC04 044234C5 5004BCC0 505234C5 00130152 D1010101 ...-R...{4RP  .P{4B..|. Q  .Q:@. 0001C0
42DE1CAB 04BCDE01 00110019 63416340 D151EE1C FF2C0305 41D050FD 1CFF2C03 .,.. P:A..,.. Q-@cAc.....' . .'B 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 26 (0000001A), 512 (0200) bytes

1CFC0404 42D0526B D0FB1C54 43574358 45060018 ABFA6B52 D024ABF8 1CFC0404 ..|.  $.Rk| ...EXCWCT. .kR.B..|. 000000
04045154 43574444 4107480C 00000000 00000A17 0301006B 00040101 A61152FA |R. ....k.............H.ADDWCTQ.. 000020
444F4324 05000000 9100E902 00544357 43584506 00081701 00020002 00020002 ..............EXCWCT..⊥......$COD 000040
004C4143 4F4C2406 00000028 01890200 41544144 50240600 00000000 A9020045 E.. ......$PDATA....(....$LOCAL. 000060
0457FF50 38000402 00130032 51020000 2EE001BD 0200335A 0200032C 8001BD02 . ......Z3.. .*.....Q2......8P.W. 000080
FBF50502 EEFD0102 EC050200 02028918 DE050024 0029FF50 66000403 FF506400 .dP....fP.).$..*. ..... ..  ..├ 0000A0
45520704 00000000 00320003 0002BD01 00000091 00BF06FF FEFEF8E3 FED40102 ..┌ ¢      .. ......... ....2.......RE 0000C0
2D6C754A 2D313235 353A3031 20373839 312D6C75 4A2D3132 31300251 5443574D MWCTQ.0121-Jul-1987 10:5521-Jul- 0000E0
322D362E 3456204E 41525452 4F462058 41560100 00163535 3A303120 37383931 1987 10:55....VAX FORTRAN V4.6-2 000100
180FE150 00010402 00250051 5443574D 45520700 00000100 BC0EF105 00113434 44...¶. ......REMWCTQ.%.....P*.. 000120
00120004 05060198 3D4E4F53 522C4E4F 534C2C48 5441462C 502C4A49 2C494920  II,IJ,P,FATH,LSON,RSON=........ 000140
00000408 0004E450 08020402 017F5154 43574D45 5207F81B 00000400 BE0EFD05 . . ...... .REMWCTQ......P┐...... 000160
03000000 00F41B00 02040000 00000000 00030000 00000002 78D00120 00000000 .... ..x.................... ..... 000180
10ACD05B F31C0002 04DE483C FD500000 041B0402 041B0002 04000000 00000000 .....................P <H*.... [. . 0001A0
D0001201 08BCD10C BCFCA240 D05004BC D052BE1C 000304DE 18AB10AC 04C30CAB  . . . .*.... R. .P.@ | . ~ ....: 0001C0
C240D051 04BCD050 04BCC050 08BC34C5 01010100 003108BC D7FCA240 D45004BC  .P┌@ |• .1.....{4 .P  .P. .Q.@  0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 28 (0000001C), 512 (0200) bytes

204E4152 54524F46 20584156 01000016 35353A30 31203738 39312D6C 754A2D31 1-Jul-1987 10:55....VAX FORTRAN  000000
FD050012 00515443 574D4146 07000000 0100BC0E F1050011 3434322D 362E3456 V4.6-244...¶.  ......FAMWCTQ....  000020
F21C0002 04DE481C FD500000 0402005A 51544357 4D414607 F81B0000 0400BE0E . ...... .FAMWCTQZ.....P .H*....  000040
635102C5 01010153 0FA0C2DE 52C71C00 0404DE00 1508BCD5 5101D050 08BCD05B [. .P..Q  ...*....(R* ..S...{.Qc 000060
9CC3D000 1408BC0F 9CC3D1FC A24451D0 54FCA3D0 001408BC 83D10FA0 C36301C1  .c ..-. ...: |T:QD |- .. ...: . 000080
43574D41 4607481C 00000000 00000A17 0301005C 04D15150 F3FCA244 51D0540F .T:QD | PQ-.\.............H.FAMWC 0000A0
24060000 000000A9 02004544 4F432405 00000054 00E90200 00020002 02025154 TQ........⊥.T....$CODE.. .......$ 0000C0
00335A02 00032C80 01BD0200 4C41434F 4C240600 00000401 89020041 54414450 PDATA.........$LOCAL.. .......Z3. 0000E0
000AFF50 44000409 FF503300 043EFF50 14000402 00133251 0200002E E001BD02 . .*....Q2......P.>..3P....DP... 000100
00310003 0002BD01 00000054 00BF06FF FCEEF1FA FCE5F704 0200B90C EA050018 ...T. ...  ||¶ |.. .T.........1. 000120
35353A30 31203738 39312D6C 754A2D31 32313002 54435743 58450604 00000000 ......EXCWCT.0121-Jul-1987 10:55 000140
41525452 4F462058 41560100 00160035 353A3031 20373839 312D6C75 4A2D3132 21-Jul-1987 10:55.....VAX FORTRA 000160
FD050011 54435743 58450600 00000100 BC0DF205 00103434 322D362E 3456204E N V4.6-244... . ......EXCWCT...  000180
C0500CBC 34C54004 F3500000 04020045 00544357 43584506 F91B0000 0400BE0D . ..... .EXCWCT.E.....P .@{4 .P  0001A0
030540FF 1CFF2C03 0542D052 04BCC052 08BC34C5 51F41CFF 2C030540 D05004BC  .P:@..... Q{4 .R  .R:B..,....@.. 0001C0
00000A17 0301005D 0004FF1C FF2C0305 4051D050 04BCC050 08BC34C5 F41CFF2C ,... {4 .P  .P:Q@..,......]....... 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 29 (0000001D), 512 (0200) bytes

 43240500 00003B00 E9020000 02000200 02030354 43574358 45064004 00000000 .....@.EXCWCT..........⊥.;....$C 000000
 41434F4C 24060000 00000189 02004154 41445024 06000000 0000A902 0045444F ODE.. .......$PDATA..........$LOCA 000020
 0200B909 ED050015 00325102 00002EE0 01BD0200 335A0200 032C8001 BD02004C L.. ..,....Z3.. .'....Q2.... . .. 000040
 44455250 07040000 00000032 00030002 00BD0100 00003B00 BF06FFEF EAEFFE04 . T .. .;..... .....2........PRED 000060
 39312D6C 754A2D31 3235353A 30312037 3839312D 6C754A2D 31323130 024B4843 CHK.0121-Jul-1987 10:5521-Jul-19 000080
 3434322D 362E3456 204E4152 54524F46 20584156 01000016 35353A30 31203738 87 10:55....VAX FORTRAN V4.6-244 0000A0
 532C4A20 CB500001 0402003B 004B4843 44455250 07000000 0100BC0E F1050011 ...¶. .......PREDCHK.;......P† J,S 0000C0
 49285354 584E492C 4D455449 203D294A 28535458 4E4A2C29 4A285353 45434355 UCCESS(J),JNXTS(J)= ITEM,INXTS(I 0000E0
 5007F81B 00000400 BE0EFD05 0012003D 294D4554 49285054 584E492C 294D4554 TEM),INXTP(ITEM)=.... . ..... .P 000100
 041B1701 04010E00 1EFC1B00 0104010E 0017FC50 00020402 014A4B48 43444552 REDCHKJ.....P|..........|.......... 000120
 04DE0015 52D55301 D052F71C 000927C0 0306D05B FE1C0002 04DE483C FD500000 ..P <H'.... [... '... R..SJR..'. 000140
 49525724 524F460C 0001FB7E 01CE0101 0155F71C 0004F1A0 0406DE54 FE1C0003 ... T'...¶... U...).~ ...FOR$WRI 000160
 0A0001FB 53DDFC1C 53445F54 5F4F4924 524F460B 0001FB6B 9FFC1C4C 535F4554 TE_SL.|.k ...FOR$IO_T_DS.|'S ... 000180
 85DFFC1C 525F4C5F 4F492452 4F460A00 01FB84DF FC1C565F 4C5F4F49 24524F46 FOR$IO_L_V.|'. ...FOR$IO_L_R.|'. 0001A0
 F01C444E 455F4F49 24524F46 0A0000FB FE1C525F 4C5F4F49 24524F46 0A0001FB  ...FOR$IO_L_R.  ...FOR$IO_END.§ 0001C0
 0001FB7E 01CE0154 F91C0002 78D00406 DE001552 D55301D0 5204BCD0 C75352F3  RS(. .R..SJR..'...x... T.T.~ .. 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 30 (0000001E), 512 (0200) bytes

445F545F 4F492452 4F460B00 01FB08AB 9FFB1C4C 535F4554 49525724 524F460C .FOR$WRITE_SL. . . ...FOR$IO_T_D 000000
460A0001 FBFFFD87 30E4DFF8 1C565F4C 5F4F4924 524F460A 0001FB53 DDFC1C53 S.|*S ...FOR$IO_L_V. ' 0. . ...F 000020
0000FBFE 1C525F4C 5F4F4924 524F460A 0001FB84 DFFC1C52 5F4C5F4F 4924524F OR$IO_L_R.|'. ...FOR$IO_L_R.  .. 000040
483C0000 00000000 0A170301 00B804C2 5352F3FB 1C444E45 5F4F4924 524F460A .FOR$IO_END.  RS . ..........<H 000060
003500A9 02004544 4F432405 000000B3 00E90200 00020101 4B484344 45525007 .PREDCHK......┴. ....$CODE.. .5. 000080
000927C4 01BD0200 4C41434F 4C240600 00001001 89020041 54414450 24060000 ...$PDATA.........$LOCAL.. .+'.. 0000A0
17014E49 414D4552 06000E19 6001BD02 00534902 000E1960 01BD0200 4C4C4103 .ALL.. .`....IS.. .`.....REMAIN.. 0000C0
00081701 525F4C5F 4F492452 4F460A00 08170144 4E455F4F 4924524F 460A0008 ...FOR$IO_END.....FOR$IO_L_R.... 0000E0
0C000817 0153445F 545F4F49 24524F46 0B000817 01565F4C 5F4F4924 524F460A .FOR$IO_L_V.....FOR$IO_T_DS..... 000100
EA050018 0046FF50 6B00044A FF501600 0402000D 4C535F45 54495257 24524F46 FOR$WRITE_SL......P.J..kP.F....┬ 000120
00000000 00310003 0002BD01 000000B3 00BF06FF FCC6EDFC CBE1F706 0200B90C . ... '†| ≤|.. . .... ....1..... 000140
4A2D3132 35353A30 31203738 39312D6C 754A2D31 32313002 4B484345 55510604 ..QUECHK.0121-Jul-1987 10:5521-J 000160
3456204E 41525452 4F462058 41560100 00160035 353A3031 20373839 312D6C75 ul-1987 10:55.....VAX FORTRAN V4 000180
80500001 04020115 4B484345 55510600 00000100 BC0DF205 00103434 322D362E .6-244... . ......QUECHK......P. 0001A0
4E2C5154 4E205345 55455551 20444E41 20535453 494C204E 4F204B43 45484320  CHECK ON LISTS AND QUEUES NTQ,N 0001C0
28444F4E 28544C49 4156412C 29492844 4F4E2C49 2D2D5154 203D4D2C 512C514C LQ,Q,M= TQ--I,NOD(I),AVAILT(NOD( 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 31 (0000001F), 512 (0200) bytes

49283144 4F4E2857 4C494156 412C2949 2831444F 4E2C492D 2D514C20 3D292949 I))= LQ--I,NOD1(I),AVAILW(NOD1(I 000000
4F4E2850 2C292943 57284E2C 43572832 444F4E2C 29435728 4E2C4357 203D2929 ))= WC,N(WC),NOD2(WC,N(WC)),P(NO 000020
4F572853 55544154 53205245 4B524F57 203D2929 29435728 4E2C4357 28324480 .D2(WC,N(WC)))= WORKER STATUS(WO 000040
4B524F57 203D2952 454B524F 57285743 574E2C52 454B524F 57203D29 52454B52 RKER)= WORKER,NWCW(WORKER)= WORK 000060
45544E45 43204B52 4F57203D 5245544E 4543204B 524F572C 5845444E 492C5245 ER,INDEX,WORK CENTER= WORK CENTE 000080
5245544E 4543204B 524F5720 3D295245 544E4543 204B524F 57284357 574E2C52 R,NWWC(WORK CENTER)= WORK CENTER 0000A0
45555106 F91B0000 0400BE0D FD050011 003D5245 4B524F57 2C584544 4E49F32C , INDEX,WORKER=.... . ..... .QUE 0000C0
001DFC1B 1A010401 0E000DFC 1B000104 010E001A FC500402 04020382 244B4843 CHK$......P|........|........|.. 0000E0
8E010501 0E0007FC 1B630104 010E002B FC1B4401 04010E00 1FFC1B27 0104010E ....'.|......D.|+.....c.|....... 000100
0001FB7E 01CE5BFA 1C000204 DE48FCFD 50000004 1B009501 05010E00 10FC1B00 ..|............P |H*....|[).~ .. 000120
445F545F 4F492452 4F460B00 01FB04AB 9FFB1C4C 535F4554 49525724 524F460C .FOR$WRITE_SL. . . ...FOR$IO_T_D 000140
52572452 4F460C00 01FB7E01 CEFB1C44 4E455F4F 4924524F 460A0000 FBFE1C53 S.  ...FOR$IO_END. ).~ ...FOR$WR 000160
FB04BCDD FB1C5344 5F545F4F 4924524F 460B0001 FB0CAB9F FB1C4C53 5F455449 ITE_SL. . . ...FOR$IO_T_DS. * . 000180
565F4C5F 4F492452 4F460A00 01FB08BC DDFB1C56 5F4C5F4F 4924524F 460A0001 ...FOR$IO_L_V. * . ...FOR$IO_L_V 0001A0
24524F46 0A0001FB 10BCDDFB 1C565F4C 5F4F4924 524F460A 0001FB0C BCDDFB1C . * . ...FOR$IO_L_V. * . ...FOR$ 0001C0
D55301D0 5204BCD0 F41C444E 455F4F49 24524F46 0A0000FB FE1C565F 4C5F4F49 IO_L_V.  ...FOR$IO_END. . .R..S. 0001E0
```

```
Dump of file DRBO:[KB78]PHASE1A.OBJ;1 on 22-JUL-1987 11:38:38.16
File ID (19019,20,0)   End of file block 39 / Allocated 39

Virtual block number 32 (00000020), 512 (0200) bytes

4C535F45 54495257 24524F46 0C0001FB 7E01CE01 010154F7 1C000304 DE001552 R..*.... T...).~ ...FOR$WRITE_SL 000000
24524F46 0A0001FB 53DDFC1C 53445F54 5F4F4924 524F460B 0001FB14 AB9FFB1C . . . ...FOR$IO_T_DS.|*S ...FOR$ 000020
0640DF50 84D0FB1C 525F4C5F 4F492452 4F460A00 01FB64DF FC1C565F 4C5F4F49 IO_L_V.|'d ...FOR$IO_L_R. ..P'@. 000040
4924524F 460A0000 FBFE1C52 5F4C5F4F 4924524F 460A0001 FBFE1C00 0C6F5C06 .\o...  ...FOR$IO_L_R.  ...FOR$I 000060
7E01CE54 FA1C0004 04DE0015 52D55301 D05208BC D0BE5352 F3F01C44 4E455F4F O_END.§ RS . .R..SJR..*....|T).~ 000080
5F4F4924 524F460B 0001FB1C AB9FFB1C 4C535F45 54495257 24524F46 0C0001FB  ...FOR$WRITE_SL. . . ...FOR$IO 0000A0
4F460A00 01FB64DF FC1C565F 4C5F4F49 24524F46 0A0001FB 53DDFC1C 53445F54 T_DS.|*S ...FOR$IO_L_V.|'d ...FO 0000C0
4924524F 460A0001 FBFE1C00 0C6F3406 0640DF50 84D0FB1C 525F4C5F 4F492452 R$IO_L_R. ..P'@..4o...  ...FOR$I 0000E0
D05210BC D0BE5352 F3F01C44 4E455F4F 4924524F 460A0000 FBFE1C52 5F4C5F4F O_L_R.  ...FOR$IO_END.§ RS . .R. 000100
1CFC0504 43DE0015 55D55601 D05584D0 54F31C00 1652A006 06DE0015 52D55301 .SJR..*...R... T..U..VJU..*C..|. 000120
0B0001FB 24AB9FFB 1C4C535F 45544952 5724524F 460C0001 FB7E01CE 010157F8  W..).~ ...FOR$WRITE_SL. . $ ... 000140
DDFC1C56 5F4C5F4F 4924524F 460A0001 FB53DDFC 1C53445F 545F4F49 24524F46 FOR$IO_T_DS.|*S ...FOR$IO_L_V.|* 000160
5F4C5F4F 4924524F 460A0001 FB67DFFC 1C565F4C 5F4F4924 524F460A 0001FB56 V ...FOR$IO_L_V.|'g ...FOR$IO_L_ 000180
00FBFE1C 525F4C5F 4F492452 4F460A00 01FBFE1C 08EC0605 40DF5067 D0FB1C52 R. .gP'@.. ..  ...FOR$IO_L_R. . 0001A0
0CBCD096 5352F3AE 5655F357 000000D0 8FC0E51C 444E455F 4F492452 4F460A00 ..FOR$IO_END.  .....W UV+ RS.. . 0001C0
49525724 524F460C 0001FB7E 01CE54FA 1C000C6E 180606DE 001552D5 5301D052 R..SJR..*...n...|T).~ ...FOR$WRI 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 33 (00000021), 512 (0200) bytes

0001FB53 DDFC1C53 445F545F 4F492452 4F460B00 01FB2CAB 9FFB1C4C 535F4554 TE_SL. . , ...FOR$IO_T_DS.|*S .. 000000
1C53445F 545F4F49 24524F46 0B0001FB 34AB9FFB 1C565F4C 5F4F4924 524F460A .FOR$IO_L_V. . 4 ...FOR$IO_T_DS. 000020
4E455F4F 4924524F 460A0000 FBFE1C52 5F4C5F4F 4924524F 460A0001 FB84DFFC |'. ...FOR$IO_L_R.  ...FOR$IO_EN 000040
0204044B 48434555 510648FC 00000000 00000A17 030100C3 04C55352 F3FB1C44 D.  RS{. ............|H.QUECHK... 000060
50240600 00010D00 A9020045 444F4324 05000001 DC00E902 00000200 02000200 ..........⊥.'....$CODE.. .......$P 000080
0200315A 02000278 D001BD02 004C4143 4F4C2406 0000003C 01890200 41544144 DATA....<....$LOCAL.. ..x...Z1.. 0000A0
01494D02 00165370 01BD0200 335A0200 032C8001 BD020032 5A020000 002801BD  .(....Z2.. ..,....Z3.. .pS...MI. 0000C0
08170152 5F4C5F4F 4924524F 460A0008 1701444E 455F4F49 24524F46 0A000817 ....FOR$IO_END.....FOR$IO_L_R... 0000E0
00081701 53445F54 5F4F4924 524F460B 00081701 565F4C5F 4F492452 4F460A00 ..FOR$IO_L_V.....FOR$IO_T_DS.... 000100
000549FF 5000C800 054CFF50 71000402 0023D04C 535F4554 49525724 524F460C .FOR$WRITE_SL.#....qP.L..'.P.I.. 000120
BDE5F709 0200B919 DD050025 D142FF50 01980005 5CFF5001 2D000571 FF50011C ..P.q..-.P.\....P.B~%..'. ... 000140
01030002 D4BD0100 0001DC00 BF06FFFC C9EEF1B9 0102ECEE FCC20102 EEFCC2EB  |  .. |  .. ¶ +|.. ..'....r.... 000160
3A303120 37383931 2D6C754A 2D313231 30024D45 52514553 06040000 00000031 1.......SEQREM.0121-Jul-1987 10: 000180
54524F46 20584156 01000016 9C35353A 30312037 3839312D 6C754A2D 31323535 5521-Jul-1987 10:55.....VAX FORT 0001A0
000A4D45 52514553 06000000 0100BC0D F2050010 3434322D 362E3456 204E4152 RAN V4.6-244... . ......SEQREM.. 0001C0
00DF004D 45525145 5306F91B 00000400 BE0DFD05 00110000 0041FC50 00010402 ....P|A...... . ..... .SEQREM.'. 0001E0
```

```
Dump of file DRBO:[KB78]PHASE1A.OBJ;1 on 22-JUL-1987 11:38:38.16
File ID (19019,20,0)   End of file block 39 / Allocated 39

Virtual block number 34 (00000022), 512 (0200) bytes

04DE480C FD500000 04000000 00000000 00F81B00 01040000 0003FC50 00020402 ....P|.........  ..........P .H*. 000000
42D552FC A041D000 00310312 FCA041D5 51048CD0 50EB1C00 0404DE5B FE1C0002 ... [*.... P: .QJA.|..1...A.|RJB 000020
0278CCE0 42D052FC A041D000 13000278 CCE042D5 52FCA041 D00015D8 1CFC0304 ..|.*...A.|RJB*}x.....A.|R:B*}x. 000040
E043D453 FCA041D0 5104BCD0 08BCC01C FC030443 D053FCA0 41D052D4 00115200 .R..rR:A.|S:C..|.   .: .Q:A.|S C* 000060
8CE042D0 5208BCD0 000BA08C E042D752 08BCD0FC A04152D0 5104BCD0 000278CC }x..: .Q:RA.|: .R*B*....: .R:B*. 000080
6BFA0CAB 04BCDE08 ABF71CFC 030442DE 52000278 CCE041D0 0101040C BC000BA0 ... ....:A*}x..R*B..|.  .*. . .|k 0000A0
40040CBC 01CE08BC D4F81C50 4F545324 524F4608 0000FBFE 1C524F52 52450500 ..ERROR.   ...FOR$STOP.  r .). ..@ 0000C0
08170100 02000200 0203034D 45525145 5306480C 00000000 00000A17 03010079 y............H.SEQREM.......... 0000E0
50240600 00000400 A9020045 444F4324 05000000 B800E902 00524F52 52450500 ..ERROR..⊥.  ....$CODE.. ......$P 000100
004C4C41 03000927 C4018D02 004C4143 4F4C2406 00000010 01890200 41544144 DATA.........$LOCAL..  .+*...ALL. 000120
0402001A 00504F54 5324524F 46080008 17014E49 414D4552 06000E19 6001BD02 . . ....REMAIN.....FOR$STOP..... 000140
0200B92A CC050036 02FF5047 00040FFF 50380004 61FF502A 00040093 FE501B00 ..P ....*P.a..8P....GP..6..}* .. 000160
00000A09 010EF3F5 F70302F0 F2000102 FE00000E 090F0EF2 0302F203 02ECF706 :.. .. ...... ... §.. ├ ...... 000180
54544553 05040000 00000030 00030002 BD010000 00B800BF 06FFFCFD F90E02E1 *..  |.. ..... ....0.......SETT 0001A0
37383931 2D6C754A 2D313235 353A3031 20373839 312D6C75 4A2D3132 31300251 Q.0121-Jul-1987 10:5521-Jul-1987 0001C0
000F3434 322D362E 3456204E 41525452 4F462058 41560100 00163535 3A303120  10:55....VAX FORTRAN V4.6-244.. 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 35 (00000023), 512 (0200) bytes

 54455305 FA1B0000 0400BE0C FD050010 01515454 45530500 00000100 BC0CF305 . . ......SETTQ.... . .....|.SET 000000
 00030000 00000002 78D00120 00000000 00000408 0004E450 08020402 00865154 TQ......P┐.......... ..x........ 000020
 10ACD05B E31C0002 04DE481C FD500000 04000000 00FC1B00 02040000 00000000 ...........|........P .H.....¢[. . 000040
 1C000BA0 900306DE 5318BBDE 001504BC D56B01D0 5204BCD0 18AB10AC 04C30CAB  . . . .. .R..kJ ... .S........ 000060
 44410500 1CABFA28 AB10BCDE 20AB08BC DE63400C BCD0506B D0001484 D50154E5  T.J....kP. .@c .   . (| ...AD 000080
 04045154 54455305 481C0000 00000000 0A170301 006104DE 6B52F3FB 1C515444 DTQ.  Rk.a..............H.SETTQ.. 0000A0
 45444F43 24050000 004F00E9 02005154 44444105 00081701 00020002 00020002 ..............ADDTQ..⊥.O....$CODE 0000C0
 02004C41 434F4C24 06000000 2C018902 00415441 44502406 00000000 00A90200 ..........$PDATA.........$LOCAL.. 0000E0
 0019171A FF502F00 042EFF50 1F000402 000D0E4E 49414D45 5206000E 196001BD  .`....REMAIN.......P..../P..... 000100
 00310003 000257BD 01000000 4F00BF06 FFFCEEF8 FCE80102 EC040200 B90DE905 .⊥. ... .. | |.. .O.... W....1. 000120
 35353A30 31203738 39312D6C 754A2D31 32313002 4A444145 55440604 00000000 ......DUEADJ.0121-Jul-1987 10:55 000140
 41525452 4F462058 41560100 00150135 353A3031 20373839 312D6C75 4A2D3132 21-Jul-1987 10:55.....VAX FORTRA 000160
 04020097 4A444145 55440600 00000100 BC0DF205 00103434 322D362E 3456204E N V4.6-244.........DUEADJ.... 000180
 43435553 23203D53 54435544 4F525020 444E4523 20534B53 41542320 80500001 ..P. #TASKS #END PRODUCTS= #SUCC 0001A0
 464F2054 53494C20 3D53524F 53534543 45444552 5020444E 41205352 4F535345 ESSORS AND PREDECESSORS= LIST OF 0001C0
 524F2052 4F535345 43435553 20584544 4E492053 54435544 4F525020 444E4520  END PRODUCTS INDEX SUCCESSOR OR 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 36 (00000024), 512 (0200) bytes

0198040A 0301983D 5845444E 49205458 454E203D 524F5353 45434544 45525020  PREDECESSOR= NEXT INDEX=....... 000000
00000400 BE0DFD05 0011FF04 10040198 10130510 05019804 0A0801F0 98041404  ....§........................... 000020
02041B08 02041B0C 02040000 0003FC50 10020402 03EC0B4A 44414555 4406F91B  . .DUEADJ. .....P|.............. 000040
000EFC1B 16010401 0E0010FC 1B070104 010E000F FC1B0001 04010E00 07FC1B00  ..|........|.........|.........|.. 000060
00000004 00000000 00000000 BE080004 F01B3401 04010E00 15FC1B26 0104010E  ....&.|......4.§............... 000080
D0530002 8870E2D0 52F41C00 0604DE6B 01D05BFB 1C000204 DE48FCFD 50000004  ...P |H.... [.k..... R. p...S. 0000A0
66D05004 BC54C101 56000278 D0E2DE00 15000288 70E2D555 B41C0005 04DE5401  .T..... UJ p......x..V. T .P.f 0000C0
0004F19C E541D000 110004F1 9CE5400F A4C6D000 140FA4C6 0004F19C E541D151  Q-A .¶..≤ .....≤ .@ .¶.....A .¶.. 0000E0
F71C4543 4E455551 45530800 10ABFA08 AB50D00C AB51D086 50D00004 F19CE540  @ .¶...P..Q ..P .| ...SEQUENCE. 000100
0B0001FB 20AB9FFB 1C4C535F 45544952 5724524F 460C0001 FB7E01CE BC5453F3   ST ). ...FOR$WRITE_SL. ... 000120
FB1C565F 4C5F4F49 24524F46 0A0001FB 04BCDDFB 1C53445F 545F4F49 24524F46  FOR$IO_T_DS. . ...FOR$IO_L_V. 000140
4F460A00 01FB0002 8870E2DD F81C5344 5F545F4F 4924524F 460B0001 FB28AB9F  . ( ...FOR$IO_T_DS. . p... ...FO 000160
AB9FFB1C 53445F54 5F4F4924 524F460B 0001FB30 AB9FFB1C 565F4C5F 4F492452  R$IO_L_V. . 0 ...FOR$IO_T_DS. . 000180
460A0001 FBFE1C00 0927C003 06DDFF1C 53445F54 5F4F4924 524F460B 0001FB38  8 ...FOR$IO_T_DS.. ... ' ...F 0001A0
750104EF DFFE1C44 4E455F4F 4924524F 460A0000 FBFE1C56 5F4C5F4F 4924524F  OR$IO_L_V. ...FOR$IO_END. ' ..u 0001C0
524F460A 0001FB04 BCDDFB1C 46535F45 54495257 24524F46 0C0002FB 02DDFC19  .|. ...FOR$WRITE_SF. . . ...FOR 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 37 (00000025), 512 (0200) bytes

 DDFF1C56 5F4C5F4F 4924524F 460A0001 FB000288 70E2DDF8 1C565F4C 5F4F4924 $IO_L_V. . p... ...FOR$IO_L_V... 000000
 24524F46 0A0000FB FE1C565F 4C5F4F49 24524F46 0A0001FB FE1C0009 27C00306 .. ....  ...FOR$IO_L_V.  ...FOR$ 000020
 40AB9FFB 1C4C535F 45544952 5724524F 460C0001 FB7E01CE FB1C444E 455F4F49 IO_END. ). ...FOR$WRITE_SL. . @ 000040
 AB000288 70E2D04C AB000278 D0E2DEEB 1C53445F 545F4F49 24524F46 0B0001FB ...FOR$IO_T_DS. . .x.. [. p...  000060
 5F4F4924 524F460A 0000FBFE 1C4C4E5F 585F4F49 24524F46 0B0001FB 48ABDF50 P. H ...FOR$IO_X_NL.  ...FOR$IO_ 000080
 E71C4653 5F455449 52572452 4F460C00 02FB02DD FC197F01 04EFDFFE 1C444E45 END. . ....|.....FOR$WRITE_SF.. 0000A0
 4924524F 460A0001 FB86DF56 000278D0 E2DE0015 53D55401 D0530002 8870E2D0 . p...S..TJS... .x..V'.  ...FOR$I 0000C0
 7A0104EF DFFE1C44 4E455F4F 4924524F 460A0000 FBF35453 F3FA1C52 5F4C5F4F O_L_R.| ST  ...FOR$IO_END. . ..z 0000E0
 5401D053 00028870 E2D0E51C 46535F45 54495257 24524F46 0C0002FB 03DDFC19 .T... ...FOR$WRITE_SF.. p...S..T 000100
 D0F41C52 5F4C5F4F 4924524F 460A0001 FB07D0C6 DF560002 78D0E2DE 001553D5 JS... .x..V'<.. ...FOR$IO_L_R. . 000120
 0000FBE0 5453F3FA 1C525F4C 5F4F4924 524F460A 0001FB00 04F19CE5 40DF5086 .P'@ .... ...FOR$IO_L_R.| ST. .. 000140
 52572452 4F460C00 02FB03DD FC197A01 04EFDFFE 1C444E45 5F4F4924 524F460A .FOR$IO_END. . ..z.T.. ...FOR$WR 000160
 4C5F4F49 24524F46 0A0001FB 7ED40101 015401D0 53788F9A F21C4653 5F455449 ITE_SF. ..xS..T... ...FOR$IO_L 000180
 4F460A00 00FBEA54 53F3FA1C 565F4C5F 4F492452 4F460A00 01FB7ED4 FC1C565F  V.T.. ...FOR$IO_L_V.| ST. ...FO 0001A0
 D00406DE 54000278 D0E5DE00 00310314 08ABD553 01D0ED1C 444E455F 4F492452 R$IO_END. ..SJ ...T.. .x..T...  0001C0
 52572452 4F460C00 02FB02DD FC190084 0105EFDF 01010157 62DE56F7 1C000278 x... V.bW... .....|.. ...FOR$WR 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 38 (00000026), 512 (0200) bytes

FFFD8730 E4DFF81C 565F4C5F 4F492452 4F460A00 01FB53DD FC1C4653 5F455449 ITE_SF.|.S ...FOR$IO_L_V. ..0. . 000000
524F460A 00020113 01FB0002 78D0E4DF F81C525F 4C5F4F49 24524F46 0A0001FB  ...FOR$IO_L_R. ..x.. ......FOR 000020
FD8730E6 DFF81C52 5F4C5F4F 4924524F 460A0001 FB87DFFC 1C525F4C 5F4F4924 $IO_L_R.|.. ...FOR$IO_L_R. .*0.  000040
5F4C5F4F 4924524F 460A0001 FB86DFFC 1C525F4C 5F4F4924 524F460A 0001FBFF . ...FOR$IO_L_R.|.. ...FOR$IO_L_ 000060
FB0004F1 A0E4DFF8 1C525F4C 5F4F4924 524F460A 0001FB00 076A70E4 DFF81C52 R. ..pj.. ...FOR$IO_L_R. ....¶.. 000080
1C525F4C 5F4F4924 524F460A 0001FB84 DFFC1C52 5F4C5F4F 4924524F 460A0001 ...FOR$IO_L_R.|.. ...FOR$IO_L_R. 0000A0
FB02DDFC 197F0104 EFDF8053 08ABF3F9 1C444E45 5F4F4924 524F460A 0000FBFE  ...FOR$IO_END.   .S.. ....|..  0000C0
52D55301 D052F71C 000927C0 0306D0FF 1C46535F 45544952 5724524F 460C0002 ...FOR$WRITE_SF..... .... R..SJR 0000E0
4F492452 4F460A00 01FB84DF 0155FA1C 0004F1A0 0406DE54 FE1C0003 04DE0015 ........ T....¶...|U.. ...FOR$IO 000100
0A0000FB EA5352F3 FA1C525F 4C5F4F49 24524F46 0A0001FB 85DFFC1C 525F4C5F  L_R.|.. ...FOR$IO_L_R.| RS. ... 000120
45554406 48FC0000 00000000 0A170301 00ED5204 FF1C444E 455F4F49 24524F46 FOR$IO_END...R ...........|H.DUE 000140
4F432405 000002E6 00E90200 45434E45 55514553 08000817 01000201 014A4441 ADJ.........SEQUENCE.......$CO 000160
4C41434F 4C240600 00005801 89020041 54414450 24060000 009000A9 02004544 DE.. .......$PDATA....X....$LOCAL 000180
02000C5C 1001BD02 00534902 000E1960 01BD0200 4C4C4103 000927C4 01BD0200 .. .+'...ALL.. .....IS.. ..\... 0001A0
08170144 4E455F4F 4924524F 460A0008 17014555 44030002 904401BD 0200444D MD.. .D....DUE.....FOR$IO_END... 0001C0
08000817 01565F4C 5F4F4924 524F460A 00081701 525F4C5F 4F492452 4F460A00 ..FOR$IO_L_R.....FOR$IO_L_V..... 0001E0
```

```
Dump of file DRB0:[KB78]PHASE1A.OBJ;1 on 22-JUL-1987 11:38:38.16
File ID (19019,20,0)   End of file block 39 / Allocated 39

Virtual block number 39 (00000027), 512 (0200) bytes

0C000817 014C4E5F 585F4F49 24524F46 0B000817 0153445F 545F4F49 24524F46 FOR$IO_T_DS.....FOR$IO_X_NL..... 000000
0030244C 535F4554 49525724 524F460C 00081701 46535F45 54495257 24524F46 FOR$WRITE_SF.....FOR$WRITE_SL$0. 000020
FF500198 000514FF 50016000 050DFF50 5300040C FF504700 044CFF50 2B000402 ...+P.L..GP....SP.....P......P. 000040
02F4FDF8 D8FDF70A 0200B92D C9050039 25FF5002 B8000500 94FE5002 06000527 '....P .... .P.%9..+- ...  .   . 000060
FB0A0285 0202E104 02CA0202 B50202C8 0402CBC6 0102A301 02FCF0FD F3FEF602 .    §|.. ..≤†..... ........ 000080
5724524F 460C0001 FB7E01CE FB1CFFFF 01030002 24BD0100 0002E600 BF06FFB7 .. .‡.... $....... ). ...FOR$W 0000A0
00FBFE1C 53445F54 5F4F4924 524F460B 0001F800 80CB9FFA 1C4C535F 45544952 RITE_SL.|.†.. ...FOR$IO_T_DS.  . 0000C0
1C4C535F 44414552 24524F46 0B0001FB 01DDFC1C 444E455F 4F492452 4F460A00 ..FOR$IO_END.|. ...FOR$READ_SL. 0000E0
455F4F49 24524F46 0A0000FB FE1C525F 465F4F49 24524F46 0A0001FB 18ABDFFB  ...FOR$IO_F_R.  ...FOR$IO_E 000100
0001FB00 88CB9FFA 1C4C535F 45544952 5724524F 460C0001 FB7E01CE FB1C444E ND. ). ...FOR$WRITE_SL.|.†.. . 000120
445F545F 4F492452 4F460B00 01FB0090 CB9FFA1C 53445F54 5F4F4924 524F460B .FOR$IO_T_DS.|.†.. ...FOR$IO_T_D 000140
41455224 524F460B 0001FB01 DDFC1C44 4E455F4F 4924524F 460A0000 FBFE1C53 S.  ...FOR$IO_END.|. ...FOR$REA 000160
000203F7 0000FBFE 1C525F46 5F4F4924 524F460A 0001FB1C ABDFFB1C 4C535F44 D_SL. ' ....FOR$IO_F_R.  .. ... 000180
BC6BD004 BC52D055 504A501C AB000043 C88F45DD 1C444E45 5F4F4924 524F460A .FOR$IO_END..E..C...PJPU.R ..k 0001A0
FA00A4CB 0CBCDEF6 1C514C4D 41460500 0098CBFA 009CCB08 BCDE0CBC 14ABD008 .. . .. .†..|†....FAMLQ.. .† .| 0001C0
0001FB7E 01CEFB1C 00028870 0606D420 ABD4FC1C 51544357 4D414607 0000A0CB †....FAMWCTQ.|r  r..P.... ),  .. 0001E0
```

Phase 2

```
Dump of file DRBO:[KB78]PHASE2D.OBJ;1 on 22-JUL-1987 11:55:19.61
File ID (6351,41,0)   End of file block 9 / Allocated 9

Virtual block number 1 (00000001), 512 (0200) bytes

39312D6C 754A2D32 32313002 4E49414D 24443245 53414850 0C040000 00000037 7.......PHASE2D$MAIN.0122-Jul-19 000000
41560100 00160035 343A3131 20373839 312D6C75 4A2D3232 35343A31 31203738 87 11:4522-Jul-1987 11:45.....VA 000020
48500C00 00000100 BC13EC05 00163434 322D362E 3456204E 41525452 4F462058 X FORTRAN V4.6-244... . ......PH 000040
53204D45 4C424F52 50200000 0002E850 00010402 001E4E49 414D2444 32455341 ASE2D$MAIN......P .... PROBLEM S 000060
4D244432 45534148 500CF31B 00000400 BE13FD05 00173D45 4D495420 3D455A49 IZE= TIME=... . ...... .PHASE2D$M 000080
53455244 44412452 4546534E 41525410 EF1B0000 04011717 FD04001B 004E4941 AIN.... ........ .TRANSFER$ADDRES 0000A0
061B0013 881C0206 1B001388 0C020600 000003FC 50001388 24020602 03E20053 S. ....$...P|.................. 0000C0
FC1B0401 04010E00 0EFC1B00 13882002 061B0001 04000000 02FC1B00 13881802 ......|.......... ....|........| 0000E0
13881402 061B0013 88040206 1B001388 18020600 000003FC 1B120104 010E0006 ........|........................ 000100
13880002 06DE48FC FD500000 04000000 04000000 00000000 00BE0800 04F01B00 ..§... ................P |H*..... 000120
524F460A 0001FB6B DFFC1C4C 535F4441 45522452 4F460800 01FB02DD 5BFB1C00 .. [*. ...FOR$READ_SL.|'k ...FOR 000140
DFFB1C52 5F4C5F4F 4924524F 460A0001 FB04ABDF 5C6BD0F8 1C525F4C 5F4F4924 $IO_L_R. :k\' . ...FOR$IO_L_R. ' 000160
4F492452 4F460A00 00FB5208 ABD0FA1C 525F4C5F 4F492452 4F460A00 01FB08AB  . ...FOR$IO_L_R.|: .R ...FOR$IO 000180
53F11C00 0304DEFF 1C4C535F 44414552 24524F46 0B0001FB 02DDFC1C 444E455F _END.|*. ...FOR$READ_SL..*....¶S 0001A0
AB01C1F9 1C4C4E5F 585F4F49 24524F46 0B0001FB 60ABDF68 AB04ABD0 64AB63DE Tc d: . h' ` ...FOR$IO_X_NL.  . 0001C0
00310314 55D55601 D0555C04 ABC1EC1C 444E455F 4F492452 4F460A00 00FB5404 .T ...FOR$IO_END.   .\U:.VJU..1. 0001E0
```

```
Dump of file DRB0:[KB78]PHASE2D.OBJ;1 on 22-JUL-1987 11:55:19.61
File ID (6351,41,0)   End of file block 9 / Allocated 9

Virtual block number 2 (00000002), 512 (0200) bytes

 0A0001FB 0CAB54D0 0CABDFF7 1C4C535F 44414552 24524F46 0B0001FB 02DD0100 ..*. ...FOR$READ_SL. ' .:T . ... 000000
 5F4F4924 524F460A 0001FB07 CCC344DF 540CABD0 F51C525F 4C5F4F49 24524F46 FOR$IO_L_R.|: .T'D }. ...FOR$IO_ 000020
 ECE344DF F71C525F 4C5F4F49 24524F46 0A0001FB 0001A5DC E344DFF7 1C525F4C L_R. 'D¢* .. ...FOR$IO_L_R. 'D¢ 000040
 4F460A00 01FBFFEC 77FCEB44 DFF71C52 5F4C5F4F 4924524F 460A0001 FB000343 C.. ...FOR$IO_L_R. 'D Tw . ...FO 000060
 1C525F4C 5F4F4924 524F460A 0001FBFF EE160CEB 44DFF71C 525F4C5F 4F492452 R$IO_L_R. 'D .. . ...FOR$IO_L_R. 000080
 FB000680 0CE344DF F71C525F 4C5F4F49 24524F46 0A0001FB 0004E1FC E344DFF7  'D¢T*. ...FOR$IO_L_R. 'D¢... 0000A0
 525F4C5F 4F492452 4F460A00 01FB10AB DFFB1C52 5F4C5F4F 4924524F 460A0001 ...FOR$IO_L_R. ' . ...FOR$IO_L_R 0000C0
 1CE34054 D05010AB D000145C 54D1E51C 444E455F 4F492452 4F460A00 00FBFE1C .  ...FOR$IO_END. -T\..: .P:T@¢. 0000E0
 D55401D0 E81C4C53 5F444145 5224524F 460B0001 FB02DDFF 5D560155 F100081E ...¶U.V]. . ...FOR$READ_SL. :.T 000100
 525F4C5F 4F492452 4F460A00 01FBFFF9 7820E6DF 010156FF F63C00EB DE001552 R..* .<|.V..'≠ x . ...FOR$IO_L_R 000120
 24524F46 0A0000FB E65452F3 FA1C525F 4C5F4F49 24524F46 0A0001FB 86DFFC1C .|'. ...FOR$IO_L_R.| RT≠ ...FOR$ 000140
 14AB55D0 801C5245 4D49545F 54494E49 2442494C 0E0000FB FE1C444E 455F4F49 IO_END.  ...LIB$INIT_TIMER..:U . 000160
 50D6505C 52C354D4 01550008 1E20E34C DE000031 03145CD5 5201D018 AB5202C7 '.R .:.R \..1..*L¢ ...U.T R\P≥P 000180
 1CEB47D0 001357D5 0157FFEC 77FCEB40 D0500CAB D05605F5 E0FF8FD0 0CAB75D0 :u .:..*|.V: .P:@ |w .W.JW..:G . 0001A0
 185651D1 510001A5 DCE34007 CCC340C3 01001100 13FFFE61 ECEB40D5 50FFEFB4   .PJ@  a ...... @ }.@¢' ..Q-QV. 0001C0
 080024FF ABFA1CAB 50D0FFFE 61ECEB40 01D0FFFC C3DCEB44 50D054D6 5651D000 .:QV≥T:PD ' |.:.@  a .:P .| .$.. 0001E0
```

```
Dump of file DRB0:[KB78]PHASE2D.OBJ;1 on 22-JUL-1987 11:55:19.61
File ID (6351,41,0)   End of file block 9 / Allocated 9

Virtual block number 3 (00000003), 512 (0200) bytes

0001A5DC E34756D0 570CABD0 AC1157FF F63BFCEB 47D0C31C 45434E45 55514553 SEQUENCE. G |;-|.W. : .W VG¢  .. 000000
5CF1F257 54F3FFFE 61ECEB40 D45086D0 010156FF FCC3E0EB DE001554 D55701D0 :.WJT..  |.V..:.P @  a . TW ¶\ 000020
C88F4750 20AB4EEF 1C52454D 49545F54 41545324 42494C0E 0034ABFA FF5C5201 .R\.| 4..LIB$STAT_TIMER. N  PG.  000040
0001FB40 AB9FFB1C 4C535F45 54495257 24524F46 0C0001FB 7E01CE53 50000043 C..PS>.- ...FOR$WRITE_SL. . @ .. 000060
1C565F4C 5F4F4924 524F460A 0001FB14 ABDDFB1C 53445F54 5F4F4924 524F460B .FOR$IO_T_DS.  . ...FOR$IO_L_V. 000080
4F460A00 01FB53DD FC1C5344 5F545F4F 4924524F 460B0002 004D01FB 48AB9FFB  . H .M....FOR$IO_T_DS.| S ...FO 0000A0
50070050 ABFAFD1C 444E455F 4F492452 4F460A00 00FBFE1C 565F465F 4F492452 R$IO_F_V.  ...FOR$IO_END. | P..P 0000C0
00000000 0A170201 011A001C 504F5453 24524F46 080000FB FE1C4B48 43444552 REDCHK.  ...FOR$STOP........... 0000E0
545F5449 4E492442 494C0E00 0817014E 49414D24 44324553 4148500C 48FC0000 ..|H.PHASE2D$MAIN.....LIB$INIT_T 000100
545F5441 54532442 494C0E00 08170145 434E4555 51455308 00081701 52454D49 IMER.....SEQUENCE.....LIB$STAT_T 000120
02004544 4F432405 0000027B 00E90200 4B484344 45525007 00081701 52454D49 IMER.....PREDCHK..⊥.{....$CODE.. 000140
01BD0200 4C41434F 4C240600 13887001 89020041 54414450 24060000 001800A9 ......$PDATA....p....$LOCAL.... 000160
4F492452 4F460A00 08170150 4F545324 524F4608 00081701 4C4C4103 0009BC30 0 ...ALL.....FOR$STOP.....FOR$IO 000180
4C5F4F49 24524F46 0A000817 01525F4C 5F4F4924 524F460A 00081701 444E455F _END.....FOR$IO_L_R.....FOR$IO_L 0001A0
445F545F 4F492452 4F460B00 08170156 5F465F4F 4924524F 460A0008 1701565F _V.....FOR$IO_F_V.....FOR$IO_T_D 0001C0
535F4441 45522452 4F460B00 0817014C 4E5F585F 4F492452 4F460B00 08170153 S.....FOR$IO_X_NL.....FOR$READ_S 0001E0
```

```
Dump of file DRB0:[KB78]PHASE2D.OBJ;1 on 22-JUL-1987 11:55:19.61
File ID (6351,41,0)   End of file block 9 / Allocated 9

Virtual block number 4 (00000004), 512 (0200) bytes

 010C0005 00A4FE50 79000402 00414C53 5F455449 52572452 4F460C00 0817014C L.....FOR$WRITE_SLA....yP  ..... 000000
 03FF5001 B0000550 FF50019F 000500AD FE500171 000523FF 50012E00 050CFF50 P......P.#..q.P ½.....P.P.. .P.. 000020
 02001902 B93BBB05 00470017 FF500202 000503FF 5001C400 0533FF50 01B20005 .. .P.3..+.P......P...G.. ; .... 000040
 F8FCF3F9 FCFAFEED FBFCF9C6 0A02FAEF 0402008C 010202F0 D10102CC 0102F704 . ..}..¯§....... |..≤ |   ||  |  000060
 00BD0100 00027B00 8F06F9F8 C80102F8 FCF8FAF2 F0F4FEF8 F4F8F8FE F8F3FEF7           § | | ..   . .{.... . 000080
 6C754A2D 32323130 02524F52 52450504 00000000 00300000 00000000 00030007 .........0.......ERROR.0122-Jul 0000A0
 01000016 35343A31 31203738 39312D6C 754A2D32 3235343A 31312037 3839312D -1987 11:4522-Jul-1987 11:45.... 0000C0
 05000000 0100BC0C F305000F 3434322D 362E3456 204E4152 54524F46 20584156 VAX FORTRAN V4.6-244... ....... 0000E0
 203D4A20 454E494C 20544120 524F5252 4520EC50 00010402 001A0052 4F525245 ERROR.......P  ERROR AT LINE J=  000100
 010E000E FC500002 040200D4 524F5252 4505FA1B 00000400 BE0CFD05 00103D4B K=... . .....|.ERROR.....P|.... 000120
 0204DE48 00FD5000 00041B11 0104010E 0003FC1B 0E010401 0E0003FC 1B000104 ...|.......|..........P .H... 000140
 460B0001 FB6B9FFC 1C4C535F 45544952 5724524F 460C0001 FB7E01CE 5BFA1C00 ..|[.  ...FOR$WRITE_SL.|.k ...F 000160
 9FFB1C56 5F4C5F4F 4924524F 460A0001 FB04BCDD FB1C5344 5F545F4F 4924524F OR$IO_T_DS. * . ...FOR$IO_L_V. . 000180
 4F492452 4F460A00 01FB08BC DDFB1C53 445F545F 4F492452 4F460B00 01FB08AB  . ...FOR$IO_T_DS. * . ...FOR$IO 0001A0
 0001FB0C BCDDFB1C 53445F54 5F4F4924 524F460B 0001FB10 AB9FFB1C 565F4C5F _L_V. . . ...FOR$IO_T_DS. * . .. 0001C0
 0000FBFE 1C444E45 5F4F4924 524F460A 0000FBFE 1C565F4C 5F4F4924 524F460A .FOR$IO_L_V.  ...FOR$IO_END.  .. 0001E0
```

```
Dump of file DRB0:[KB78]PHASE2D.OBJ;1 on 22-JUL-1987 11:55:19.61
File ID (6351,41,0)   End of file block 9 / Allocated 9

Virtual block number 5 (00000005), 512 (0200) bytes

 0303524F 52524505 48000000 00000000 0A170301 00921C50 4F545324 524F4608 .FOR$STOP.............H.ERROR.. 000000
 44502406 00000014 00A90200 45444F43 24050000 005C00E9 02000002 00020002 ........┴.\....$CODE.. ......$PD 000020
 01504F54 5324524F 46080008 17014C41 434F4C24 06000000 18018902 00415441 ATA.........$LOCAL.....FOR$STOP. 000040
 08170156 5F4C5F4F 4924524F 460A0008 1701444E 455F4F49 24524F46 0A000817 ....FOR$IO_END.....FOR$IO_L_V... 000060
 00114C53 5F455449 52572452 4F460C00 08170153 445F545F 4F492452 4F460B00 ..FOR$IO_T_DS.....FOR$WRITE_SL.. 000080
 45530804 00000000 00330003 000200BD 01000000 5C00BF06 F9B4F700 B905F105 .¶.........\.........3.......SE 0000A0
 6C754A2D 32323534 3A313120 37383931 2D6C754A 2D323231 30024543 4E455551 QUENCE.0122-Jul-1987 11:4522-Jul 0000C0
 362E3456 204E4152 54524F46 20584156 01000016 0035343A 31312037 38393120 -1987 11:45.....VAX FORTRAN V4.6 0000E0
 FC500001 0402000A 45434E45 55514553 08000000 0100BC0F F0050012 3434322D -244...§. ......SEQUENCE......P| 000100
 00020402 00E50045 434E4555 51455308 F71B0000 0400BE0F FD050013 00000006 ....... . ..... .SEQUENCE. ..... 000120
 EE1C0002 04DE4804 FD500000 04000000 00000000 00F81B00 01040000 0003FC50 P|........ ...........P .H•.... 000140
 1C000304 DEFF1C52 4F525245 05006BFA 0CAB08BC DE08AB04 BCDE0014 04BCD55B [┘ ...• . .• . .|k..ERROR..•.... 000160
 FCA042D5 5204BCD0 0009C3FC E04108BC D0510010 4BE0E0D0 00104BE0 E0D65080 .P≥••K..▪••K..Q▪ .A•| ..▪ .R┘B.| 000180
 4BE0E0D0 010011FC A0420010 4BE0E0D0 5204BCD0 00033C1C E041FCA0 42D00013 ..▪B.|A•.<..▪ .R▪••K..B.|...▪••K 0001A0
 04BCD051 00104BE0 E00CBCC1 01010400 1208BCD5 00033C1C E041D4FC A0420010 ..B.|┌A•.<..┘ ...... .••K..Q▪ . 0001C0
 00033C1C E0410001 9E0CE042 D0001300 019E0CE0 42D55208 BCD00009 C3FCE041 A•| ..▪ .R┘B•......▪B•....A•.<.. 0001E0
```

```
Dump of file DRB0:[KB78]PHASE2D.OBJ;1 on 22-JUL-1987 11:55:19.61
File ID (6351,41,0)   End of file block 9 / Allocated 9

Virtual block number 6 (00000006), 512 (0200) bytes

00033C1C E041D400 019E0CE0 4251D001 01001100 019E0CE0 4251D052 088CE1D0 .' .R.QB'........QB'.....A'.<.. 000000
02000200 02030345 434E4555 51455308 48040000 00000000 0A170301 005E0004 ..............H.SEQUENCE....... 000020
00000400 A9020045 444F4324 05000000 C400E902 00524F52 52450500 08170100 ......ERROR.......$CODE.. .... 000040
0200104B E401BD02 004C4143 4F4C2406 00000010 01890200 41544144 50240600 ..$PDATA.........$LOCAL.. ..K... 000060
96000503 FF507400 0411FF50 5E00041A FF504500 0411FF50 0D000402 00275349 IS'.....P....EP....^P....tP..... 000080
FEF3F6F6 F0F3EF01 02F8F70F 0200B91F D705002B 0011FF50 00B10005 1DFF5000 .P.... .P...+..•. ...  ..  §   0000A0
00320003 000200BD 01000000 C400BF06 FFF90102 F6FEF4F3 F3F7F7F8 F90102F6 ..     ... .. ..+.........2. 0000C0
343A3131 20373839 312D6C75 4A2D3232 3130024B 48434445 52500704 00000000 ......PREDCHK.0122-Jul-1987 11:4 0000E0
41525452 4F462058 41560100 00163534 3A313120 37383931 2D6C754A 2D323235 522-Jul-1987 11:45....VAX FORTRA 000100
003C004B 48434445 52500700 00000100 BC0EF105 00113434 322D362E 3456204E N V4.6-244...¶. ......PREDCHK.<. 000120
46205443 203D4C4E 4649203D 53435241 23203D53 4B534154 2320CA50 00010402 ....P° #TASKS= #ARCS= IFNL= CT F 000140
FD050012 040A0801 98041004 01981013 05100501 983D4920 4C414E49 4620524F OR FINAL I=.................... 000160
04010E00 08FC5000 0687E002 060203FC 4B484344 45525007 F81B0000 0400BE0E . ...... .PREDCHK|....'...P|..... 000180
04F01B15 0104010E 0010FC1B 0F010401 0E0006FC 1B080104 010E0007 FC1B0001 ...|........|........|........§. 0001A0
5BFE1C00 0687E002 06DE4BFC FD500000 04000000 04000000 00000000 00BE0800 .. ..............P |K'..'.... [ 0001C0
01FB6B9F FC1C4C53 5F455449 52572452 4F460C00 01FB7E01 CE52FA1C 000404DE '....|R).~ ...FOR$WRITE_SL.|.k . 0001E0
```

```
Dump of file DRB0:[KB78]PHASE2D.OBJ;1 on 22-JUL-1987 11:55:19.61
File ID (6351,41,0)   End of file block 9 / Allocated 9

Virtual block number 7 (00000007), 512 (0200) bytes

565F4C5F 4F492452 4F460A00 01FB0CBC DDFB1C53 445F545F 4F492452 4F460B00 ..FOR$IO_T_DS. . . ...FOR$IO_L_V 000000
0A0001FB 00104BE0 E2DDF81C 53445F54 5F4F4924 524F460B 0001FB08 AB9FFB1C . . . ...FOR$IO_T_DS. . .K.. ... 000020
FB1C5344 5F545F4F 4924524F 460B0001 FB10AB9F FB1C565F 4C5F4F49 24524F46 FOR$IO_L_V. . . ...FOR$IO_T_DS.  000040
4E455F4F 4924524F 460A0000 FBFE1C56 5F4C5F4F 4924524F 460A0001 FB08BCDD . . ...FOR$IO_L_V.  ...FOR$IO_EN 000060
4F460A00 01FB0CBC DDFB1C4C 535F4554 49525724 524F460C 0001FB04 DDFC1C44 D.|. ...FOR$WRITE_SL. . . ...FO 000080
E0E2DDF8 1C565F4C 5F4F4924 524F460A 0001FB08 BCDDFB1C 565F4C5F 4F492452 R$IO_L_V. . . ...FOR$IO_L_V. . . 0000A0
4E455F4F 4924524F 460A0000 FBFE1C56 5F4C5F4F 4924524F 460A0001 FB00104B K.. ...FOR$IO_L_V.  ...FOR$IO_EN 0000C0
460B0001 FB18AB9F FB1C4C53 5F455449 52572452 4F460C00 01FB7E01 CEFB1C44 D. ).  ...FOR$WRITE_SL. . . ...F 0000E0
65DE0015 53D555E9 1C000304 DE5401D0 5308BC00 F81C5344 5F545F4F 4924524F OR$IO_T_DS. . .S.,T....⊥UJS...e 000100
53F3FA1C 525F4C5F 4F492452 4F460A00 01FB0001 A5DCE540 DF5086D0 01010156 V....P7@ . .. ...FOR$IO_L_R.| S 000120
54495257 24524F46 0C0001FB 04DDFC1C 444E455F 4F492452 4F460A00 00FBEB54 T  ...FOR$IO_END.|. ...FOR$WRIT 000140
4E5F585F 4F492452 4F460B00 01FB20AB DF28AB08 BCD024AB 65DEF21C 4C535F45 E_SL. .e $. . (7   ...FOR$IO_X_N 000160
540CBCD0 5304BC00 1048E0E2 C3CB1C44 4E455F4F 4924524F 460A0000 FBFE1C4C L.  ...FOR$IO_END.†  .K.. .S. .T 000180
53C30015 00019E10 E8D559D4 5862DE57 00081E20 E5DE0000 31031454 D55601D0 ..VJT..1..   ...W.bX_YJ ...... S 0001A0
1C46535F 45544952 5724524F 460C0002 FB04DDFC 19250104 EFDF5900 019E10E8 ....Y'  ..%.|. ...FOR$WRITE_SF. 0001C0
524F460A 0001F8FF F7E9B0E7 DFF81C56 5F4C5F4F 4924524F 460A0001 FB56DDFC |.V ...FOR$IO_L_V. 7_ ⊥ . ...FOR 0001E0
```

```
Dump of file DRB0:[KB78]PHASE2D.OBJ;1 on 22-JUL-1987 11:55:19.61
File ID (6351,41,0)   End of file block 9 / Allocated 9

Virtual block number 8 (00000008), 512 (0200) bytes

 DFF81C52 5F4C5F4F 4924524F 460A0001 FBFFF987 C0E7DFF8 1C525F4C 5F4F4924 $IO_L_R. '_ . .  ...FOR$IO_L_R. ' 000000
 4924524F 460A0001 FB88DFFC 1C525F4C 5F4F4924 524F460A 0001FBFF FB25D0E7 -•%  .  ...FOR$IO_L_R.|'. ...FOR$I 000020
 FBFFFCC3 E0E7DFF8 1C565F4C 5F4F4924 524F460A 0001FB59 DDFC1C52 5F4C5F4F O_L_R.|•Y ...FOR$IO_L_V. '_• |.  000040
 5F4F4924 524F460A 0001FBFF FE61F0E7 DFF81C52 5F4C5F4F 4924524F 460A0001 ...FOR$IO_L_R. '_§a . ...FOR$IO_  000060
 4924524F 460A0000 FBFE1C52 5F4C5F4F 4924524F 460A0001 FB87DFFC 1C525F4C L_R.|'. ...FOR$IO_L_R.  ...FOR$I  000080
 01C15404 BC00104B E0E2C100 1500104B E0E2D5FF 6D560154 F1B51C44 4E455F4F O_END. ¶T.Vm.┘ •K....  •K.. .T .  0000A0
 50D40101 0158FFF9 781CEB46 DE570003 3C1CE246 DE001454 56D15655 D05504BC  .U•UV-VT..•F .<..W•F .x .X...┌P 0000C0
 524F460C 0002FB04 DDFC1931 0104EFDF EE5654F3 8850D050 FCA753C3 001587D5 ┘...  S |P•P. TV ' ..1.|•. ...FOR 0000E0
 5700033C 20E2DE00 1553D556 01D05300 104BE0E2 D0E11C46 535F4554 49525724 $WRITE_SF.'• •K..S•.V┘S..•  <..W  000100
 4F460A00 01FB87DF FC1C525F 4C5F4F49 24524F46 0A0001FB 000687E0 E7DF0101 ..'_•... ...FOR$IO_L_R.|'. ...FO  000120
 EFDFFE1C 444E455F 4F492452 4F460A00 00FBE656 53F3FA1C 525F4C5F 4F492452 R$IO_L_R.| SV≠ ...FOR$IO_END. '   000140
 45DE0014 5455D1EB 1C46535F 45544952 5724524F 460C0002 FB04DDFC 19310104 ..1.T•. ...FOR$WRITE_SF. -UT..•E  000160
 4924524F 460A0001 FB83DF01 0101F902 003E56FF F9781CEB 45DE5300 09C3FCE2  | ..S•E .x .V>.. ...'. ...FOR$I  000180
 0000FBEA 5554F3FA 1C525F4C 5F4F4924 524F460A 0001FB86 DFFC1C52 5F4C5F4F O_L_R.|'. ...FOR$IO_L_R.| TU┬ ..  0001A0
 45525007 4BFC0000 00000000 0A170301 00CE04FF 1C444E45 5F4F4924 524F460A .FOR$IO_END...'...........|K.PRE  0001C0
 003600A9 02004544 4F432405 0000027E 00E90200 00020002 00020303 4B484344 DCHK...........┴. ....$CODE.. .6.  0001E0
```

```
Dump of file DR80:[KB78]PHASE2D.OBJ;1 on 22-JUL-1987 11:55:19.61
File ID (6351,41,0)   End of file block 9 / Allocated 9

Virtual block number 9 (00000009), 512 (0200) bytes

 0009BC30 01BD0200 4C41434F 4C240600 06881001 89020041 54414450 24060000 ...$PDATA.........$LOCAL.. .0 .. 000000
 1701444E 455F4F49 24524F46 0A000817 01534902 00104BE4 01BD0200 4C4C4103 .ALL.. ..K...IS.....FOR$IO_END.. 000020
 00081701 565F4C5F 4F492452 4F460A00 08170152 5F4C5F4F 4924524F 460A0008 ...FOR$IO_L_R.....FOR$IO_L_V.... 000040
 00081701 4C4E5F58 5F4F4924 524F460B 00081701 53445F54 5F4F4924 524F460B .FOR$IO_T_DS.....FOR$IO_X_NL.... 000060
 003A4C53 5F455449 52572452 4F460C00 08170146 535F4554 49525724 524F460C .FOR$WRITE_SF.....FOR$WRITE_SL:. 000080
 000500FF 5001B600 0508FF50 01250005 009DFE50 01100005 1BFF5000 B5000502 ... .P......P ....%.P.... .P.... 0000A0
 B925D105 003129FF 50024C00 0523FF50 020E0005 05FF5001 E5000525 FF5001CC }.P.%.. .P......P.#..L.P.)1..-% 0000C0
 B9FCFDF7 0102FED7 010200F8 0102FA85 0402F0FE E8F7DDB8 CF0202AA F7090200 ...  ..±  '   §...|.. ...• ..  | 0000E0
 00000000 00000000 00000000 FFFF0003 000200BD 01000002 7E00BF06 FF8C0102 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Phase 3

```
Dump of file DRB0:[KB78]PHASE3I.OBJ;1 on 22-JUL-1987 11:58:22.61
File ID (7639,36,0)   End of file block 38 / Allocated 39

Virtual block number 1 (00000001), 512 (0200) bytes

39312D6C 754A2D32 32313002 4E49414D 24493345 53414850 0C040000 00000037 7.......PHASE3I$MAIN.0122-Jul-19 000000
41560100 00160037 353A3131 20373839 312D6C75 4A2D3232 37353A31 31203738 87 11:5722-Jul-1987 11:57.....VA 000020
48500C00 00000100 BC13EC05 00163434 322D362E 3456204E 41525452 4F462058 X FORTRAN V4.6-244... . ......PH 000040
20736968 54200000 00000000 00028050 00010402 03A74E49 414D2449 33455341 ASE3I$MAIN .....P......... This  000060
35303520 666F206D 756D6978 616D2061 2073656D 75737361 206D6172 676F7270 program assumes a maximum of 505 000080
6F662820 30303030 3531202C 73637261 20303030 3537202C 736B7361 74203030 00 tasks, 75000 arcs, 150000 (fo 0000A0
30352064 6E61202C 73637261 20296472 61776B63 61622064 6E612064 72617772 rward and backward) arcs, and 50 0000C0
656D7573 7361206F 736C6120 74804920 202E7374 6375646F 72702064 6E652030 0 end products.  I.t also assume 0000E0
74696C69 63616628 20737463 75646F72 7020646E 65206568 74207461 68742073 s that the end products (facilit 000100
20796C65 76697475 6365736E 6F632064 65726562 6D756E20 65726120 29736569 ies) are numbered consecutively  000120
52524120 44454E4F 49534E45 4D494420 4E454557 54454220 48435441 4D53494D MISMATCH BETWEEN DIMENSIONED ARR 000140
52415752 4F462023 20444E41 80205343 52412023 20524F46 20455A49 53205941 AY SIZE FOR # ARCS .AND # FORWAR 000160
4F542052 45424D45 4D455220 20534352 41204452 41574B43 41422044 4E412044 D AND BACKWARD ARCS  REMEMBER TO 000180
534B5341 54204556 4F4D2054 53524946 204F5420 44324553 41485020 4E555220  RUN PHASE2D TO FIRST MOVE TASKS 0001A0
41525241 20524F46 20454752 414C204F 4F54204D 454C424F 52502021 54554F20  OUT! PROBLEM TOO LARGE FOR ARRA 0001C0
4C554653 53454343 55532080 4D415247 4F525020 4E4F4954 41434944 45442059 Y DEDICATION PROGRAM. SUCCESSFUL 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 2 (00000002), 512 (0200) bytes

 344C2854 432C2934 4C285353 45434F52 502C344C 204C2044 4544414F 4C20594C LY LOADED L L4,PROCESS(L4),CT(L4 000000
 54554F54 53524620 2020202C 29344C28 584E4954 5352462C 4854474E 454C2C29 ),LENGTH,FRSTINX(L4),     FRSTOUT 000020
 344C2029 344C284C 54554F54 5352462C 29344C28 4C4E4954 53524629 344C2858 X(L4)FRSTINL(L4),FRSTOUTL(L4) L4 000040
 203D4553 41485020 2934804C 28435241 54584E2C 29344C28 45444F4E 54584E2C ,NXTNODE(L4),NXTARC(L.4) PHASE=  000060
 4F4C4658 414D204E 4920454D 4954203D 53444E4F 43455320 55504320 2E544F54 TOT. CPU SECONDS= TIME IN MAXFLO 000080
 2D534E4F 49544152 45544920 574F4C46 58414D20 464F2052 45424D55 4E203D57 W= NUMBER OF MAXFLOW ITERATIONS- 0000A0
 202C574F 4C465841 4D205245 50203D44 45534E45 444E4F43 2D2D203D 4745522D -REG= --CONDENSED= PER MAXFLOW,  0000C0
 4C41544F 54202932 2880203D 534B5341 54202931 28203A46 4F202320 2E455641 AVE. # OF: (1) TASKS= .(2) TOTAL 0000E0
 462C2949 28505553 2C294928 54432C49 203D4445 474E4148 43205348 53415420  TASKS CHANGED= I,CT(I),SUP(I),F 000100
 2949284C 54554F54 5352462C 29492858 4E495453 52462C29 49284C4E 49545352 RSTINL(I),FRSTINX(I),FRSTOUTL(I) 000120
 514D4E2D 44455050 4F545320 594C494D 4146203D 29492858 54554F54 5352462C ,FRSTOUTX(I)= FAMILY STOPPED-NMQ 000140
 54414745 4E204120 80485449 5720454C 42414952 41562041 2D524F52 5245203D = ERROR-A VARIABLE WITH. A NEGAT 000160
 444E4946 20544E41 432D524F 52524520 53545349 58452045 554C4156 20455649 IVE VALUE EXISTS ERROR-CANT FIND 000180
 20464F20 504F5420 474E4944 4E494620 52455446 41205820 4E492053 43524120  ARCS IN X AFTER FINDING TOP OF  0001A0
 45203D29 4A28584E 49545352 462C2949 28585455 4F545352 462C4A2C 4920514D MQ I,J,FRSTOUTX(I),FRSTINX(J)= E 0001C0
 544F4E20 435241E6 20455352 45564552 2D333920 454E494C 20544120 524F5252 RROR AT LINE 93-REVERSE #ARC NOT 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 3 (00000003), 512 (0200) bytes

F31B0000 0400BE13 FD050017 003D314D 2C4D2C54 584E492C 4920444E 554F4620  FOUND I,INXT,M,M1=.... . .....  000000
534E4152 5410EF1B 00000401 1717FD04 001B004E 49414D24 49334553 4148500C .PHASE3I$MAIN.... ........ .TRANS 000020
FC1B0801 04010E00 2FFC5000 4212D802 060203E6 00535345 52444441 24524546 FER$ADDRESS.#....*.B.P|/........| 000040
05010E00 27FC1B6B 0104010E 002CFC1B 43010401 0E0028FC 1B370104 010E000C .......7.|(.....C.|,......k.|'.... 000060
20010501 0E0031FC 1B011F01 05010E00 01FC1B00 BE010501 0E000EFC 1B009701 ....|...... ..|..........|1.....  000080
42126802 06000000 04FC1B01 78010501 0E001EFC 1B015101 05010E00 27FC1B01 ..|'.....Q..|.......x..|.......h.B 0000A0
12680206 00000004 FC1B0042 121C0206 1B004212 6C02061B 00421270 02061B00 ....p.B....l.B.......B..|........h. 0000C0
68020600 000004FC 1B004212 1C02061B 0042129C 02061B00 42127002 061B0042 B....p.B.......B.......B..|.......h 0000E0
061B0001 04000000 02000000 00F81B00 42129C02 061B0042 12A00206 1B004212 .B.......B.......B.. ............... 000100
05010E00 11FC1B02 09010501 0E0012FC 1B020201 05010E00 07FC1B00 4212B402 . .B..|..........|..........|..... 000120
5C010501 0E0023FC 1B024F01 05010E00 0DFC1B02 2C010501 0E0023FC 1B021B01 ....|#.......,..|.......O..|#.....\ 000140
1B02BE01 05010E00 18FC1B02 98010501 0E0026FC 1B027F01 05010E00 19FC1B02 ..|..........|&.........|....... .. 000160
02000000 00F81B00 42121402 061B0042 12A00206 1B004212 68020600 000004FC |.......h.B.......B.......B.. ..... 000180
00421240 02061B00 42123802 06000000 10FC1B00 4212B802 061B0001 04000000 .......... .B..|.......8.B....@.B. 0001A0
5002061B 0018B050 02061B00 2B174002 061B0037 54100206 1B000631 F002061B ...§1.......T7....@.+....P .....P 0001C0
1B000947 0002061B 00421274 02061B00 3EFD0002 061B0021 EF800206 1B002E2C ,....... !..... >....t.B.....G... 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 4 (00000004), 512 (0200) bytes

 12680206 1B003BE7 F002061B 004212A0 02061B00 0C5C1002 061B0042 12900206 ....B.....\.......B....§-;....h. 000000
 FC1B0042 12A40206 00000005 FC1B0042 12BC0206 1B000104 00000002 FC1B0042 B..|.......... .B..|...... .B..| 000020
 0105010E 0014FC1B 00421298 02061B00 42129402 061B0042 12180206 00000000 ........B......B......B..|...... 000040
 9402061B 00421218 02061B00 42125C02 061B0042 12A40206 00000005 FC1B0206 ≥..|...... .B....\.B......B..... 000060
 42125C02 061B0042 12A40206 1B040104 00000005 FC1B0042 12980206 1B004212 .B......B..|.......... .B....\.B 000080
 12A00206 1B004212 68020600 000004FC 1B004212 9402061B 00421218 02061B00 ......B......B..|......h.B...... 0000A0
 00421240 02061B00 42123802 06000000 10000000 00F81B00 4212D402 061B0042 B....r.B.. ..........8.B....@.B. 0000C0
 5002061B 0018B050 02061B00 2B174002 061B0037 54100206 1B000631 F002061B ...§1......T7....@.+....P .....P 0000E0
 1B000947 0002061B 004212D0 02061B00 3EFD0002 061B0021 EF800206 1B002E2C ,....... |..... >.....B.....G... 000100
 12680206 1B003BE7 F002061B 004212A0 02061B00 0C5C1002 061B0042 12900206 ....B.....\.......B....§-;....h. 000120
 034A0105 010E001C FC1B0318 0105010E 0032FC1B 02EA0105 010E002E FC1B0042 B..|.......|2.........|.......J. 000140
 1B00031C E002061B 07D00205 1B004212 4402061B 00421244 02060000 0C0BFC1B .|......D.B....D.B.........'.... 000160
 B0500206 1B00159B 4002061B 002B1740 02061B00 1BC56002 061B0006 31F00206 ..§1.....`{......@.+....@......P 000180
 5002061B 00421250 02060000 000BFC1B 002E2C50 02061B00 21EF8002 061B0018 ...... |....P,...|.......P.B....P 0001A0
 02061B00 1BC56002 061B0006 31F00206 1B00031C E002061B 07D00205 1B004212 .B.........'......§1.....`{..... 0001C0
 002E2C50 02061B00 21EF8002 061B0018 B0500206 1B00159B 4002061B 002B1740 @.+....@......P ...... |....P,.. 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 5 (00000005), 512 (0200) bytes

 00421210 0206DE4F FCFD5000 00040000 00040000 00000000 0000BE08 0004F01B .§.....................P |O*....B. 000000
 49525724 524F460C 000203EA 01FB7E01 CE58008C CBD05654 ABD05E08 C25BEE1C . [ . : TV:†..X). ...........FOR$WRI 000020
 0A0000FB FE1C5344 5F545F4F 4924524F 460B0001 FB00C8CB 9FFA1C4C 535F4554 TE_SL.|.†*. ...FOR$IO_T_DS.  ... 000040
 1C4C535F 45544952 5724524F 460C0001 FB7E01CE FB1C444E 455F4F49 24524F46 FOR$IO_END. ).  ...FOR$WRITE_SL. 000060
 4F492452 4F460A00 00FBFE1C 53445F54 5F4F4924 524F460B 0001FB00 D0CB9FFA |.†:. ...FOR$IO_T_DS.  ...FOR$IO 000080
 FB00D8CB 9FFA1C4C 535F4554 49525724 524F460C 0001FB7E 01CEFB1C 444E455F _END. ).  ...FOR$WRITE_SL.|.†*. 0000A0
 FB1C444E 455F4F49 24524F46 0A0000FB FE1C5344 5F545F4F 4924524F 460B0001 ...FOR$IO_T_DS.  ...FOR$IO_END.  0000C0
 524F460B 0001FB00 E0CB9FFA 1C4C535F 45544952 5724524F 460C0001 FB7E01CE ).  ...FOR$WRITE_SL.|.†*. ...FOR 0000E0
 0001FB7E 01CEFB1C 444E455F 4F492452 4F460A00 00FBFE1C 53445F54 5F4F4924 $IO_T_DS.  ...FOR$IO_END. ).  .. 000100
 5F545F4F 4924524F 460B0001 FB00E8CB 9FFA1C4C 535F4554 49525724 524F460C .FOR$WRITE_SL.|.† . ...FOR$IO_T_ 000120
 5724524F 460C0001 FB7E01CE FB1C444E 455F4F49 24524F46 0A0000FB FE1C5344 DS.  ...FOR$IO_END. ).  ...FOR$W 000140
 00FBFE1C 53445F54 5F4F4924 524F460B 0001FB00 F0CB9FFA 1C4C535F 45544952 RITE_SL.|.†§. ...FOR$IO_T_DS.  . 000160
 535F4554 49525724 524F460C 0001FB7E 01CEFB1C 444E455F 4F492452 4F460A00 ..FOR$IO_END. ).  ...FOR$WRITE_S 000180
 24524F46 0A0000FB FE1C5344 5F545F4F 4924524F 460B0001 FB00F8CB 9FFA1C4C L.|.† . ...FOR$IO_T_DS.  ...FOR$ 0001A0
 00CB9FFA 1C4C535F 45544952 5724524F 460C0001 FB7E01CE FB1C444E 455F4F49 IO_END. ).  ...FOR$WRITE_SL.|.†. 0001C0
 444E455F 4F492452 4F460A00 00FBFE1C 53445F54 5F4F4924 524F460B 0001FB01 . ...FOR$IO_T_DS.  ...FOR$IO_END 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 6 (00000006), 512 (0200) bytes

460B0001 FB00F8CB 9FFA1C4C 535F4554 49525724 524F460C 0001FB7E 01CEFB1C . ).¯ ...FOR$WRITE_SL.|.† . ...F 000000
01FB04DD FC1C444E 455F4F49 24524F46 0A0000FB FE1C5344 5F545F4F 4924524F OR$IO_T_DS.  ...FOR$IO_END.|'. . 000020
525F4C5F 4F492452 4F460A00 01FB28AB DFFB1C4C 535F4441 45522452 4F460B00 ..FOR$READ_SL. ' ( ...FOR$IO_L_R 000040
24524F46 0A0001FB 30ABDFFB 1C525F4C 5F4F4924 524F460A 0001FB2C ABDFFB1C . ' , ...FOR$IO_L_R. ' 0 ...FOR$ 000060
000124F8 8F30ABD1 DD1C444E 455F4F49 24524F46 0A0000FB FE1C525F 4C5F4F49 IO_L_R.  ...FOR$IO_END.'- 0. $.. 000080
524F460C 0001FB7E 01CE0015 000001F4 8F2CABD1 00140000 C5448F28 ABD10014 ..‾ T.D{....¯ ,. .....).¯ ...FOR 0000A0
FE1C5344 5F545F4F 4924524F 460B0001 FB0108CB 9FFA1C4C 535F4554 49525724 $WRITE_SL.|.†.. ...FOR$IO_T_DS.  0000C0
FB04DDF8 AD30AB02 C5FCAD28 AB2CABC3 EF1C444E 455F4F49 24524F46 0A0000FB  ...FOR$IO_END.  , (‡|{.¯0‡ '.  0000E0
DF0340CB 2CABD003 3CCBFFBD EDF0EBDE EB1C4C53 5F444145 5224524F 460B0001 ...FOR$READ_SL. ' §  .†<., ,†@.' 000100
455F4F49 24524F46 0A0000FB FE1C4C4E 5F585F4F 4924524F 460B0001 FB0338CB †8. ...FOR$IO_X_NL.  ...FOR$IO_E 000120
CA4A00EB DE575004 C55059D0 00003103 1459D55C 01D059FC AD2CABC1 D41C444E ND.┌  ,‡|Y:.\JY¯..1..:YP{.PW' .J° 000140
E41C3552 5F354556 4F4D2453 544F0C00 16545AD0 5357D052 D4515ED0 50D45AFF .Z┌P:¯Q┌R:WS:ZT...OTS$MOVE5_R5.┐ 000160
544F0C00 16545AD0 5357D052 D4515ED0 50D45AFF D69E40EB DE575004 C55059D0 :YP{.PW' @.≥.Z┌P:¯Q┌R:WS:ZT¯..O† 000180
D4515ED0 50D45AFF E90530EB DE575004 C55059D0 E41C3552 5F354556 4F4D2453 S$MOVE5_R5.┐:YP{.PW' 0.⊥.Z┌P:¯Q┌ 0001A0
DE575004 C55059D0 E41C3552 5F354556 4F4D2453 544F0C00 16545AD0 5357D052 R:WS:ZT¯..OTS$MOVE5_R5.┐:YP{.PW' 0001C0
5F354556 4F4D2453 544F0C00 16545AD0 5357D052 D4515ED0 50D45AFF FCEAF0EB  §┬|.Z┌P:¯Q┌R:WS:ZT¯..OTS$MOVE5_ 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 7 (00000007), 512 (0200) bytes

 16545AD0 5357D052 D4515ED0 50D45AFF F9D5E0EB DE575004 C55059D0 E41C3552 R5.┐▮YP{.PW* *┘ .Z┌P▮^Q┌R▮WS▮ZT. 000000
 080001FB 04DD57FF D38930EB DEF51C35 525F3545 564F4D24 53544F0C 000203FC |....OTS$MOVE5_R5.├* 0.└.W*. ... 000020
 F81C525F 4C5F4F49 24524F46 0A0001FB 38ABDFFB 1C4C535F 44414552 24524F46 FOR$READ_SL. ’ 8 ...FOR$IO_L_R.  000040
 0A0001FB FFED81A0 E7DFF81C 525F4C5F 4F492452 4F460A00 01FBFFEA 6C90E7DF ’—.1┬. ...FOR$IO_L_R. ’—.. . ... 000060
 525F4C5F 4F492452 4F460A00 01FBFFF0 96B0E7DF F81C525F 4C5F4F49 24524F46 FOR$IO_L_R. ’— .§. ...FOR$IO_L_R 000080
 4F460A00 01FB87DF FC1C525F 4C5F4F49 24524F46 0A0001FB 00062A20 E7DFF81C . ’— *.. ...FOR$IO_L_R.|’. ...FO 0000A0
 20ABDFFB 1C525F4C 5F4F4924 524F460A 0001FB1C ABDFFB1C 525F4C5F 4F492452 R$IO_L_R. ’ . ...FOR$IO_L_R. ’  0000C0
 5F4C5F4F 4924524F 460A0001 FB3CABDF FB1C525F 4C5F4F49 24524F46 0A0001FB  ...FOR$IO_L_R. ’ < ...FOR$IO_L_ 0000E0
 524F4608 0001FB04 DD875C59 F3F81C44 4E455F4F 4924524F 460A0000 FBFE1C52 R.  ...FOR$IO_END.  Y\.*. ...FOR 000100
 3CD0ECDF 5CFFDFDD 70EBDE00 1557D559 01D057F8 ADD0E61C 4C535F44 41455224 $READ_SL.≠▮┼ W▮.Y┘W..* p▮’.\’ ▮< 000120
 4C5F4F49 24524F46 0A0001FB 8CDFFC1C 525F4C5F 4F492452 4F460A00 01FB000C .. ...FOR$IO_L_R.|’. ...FOR$IO_L 000140
 30ABD000 1530ABD5 DE1C444E 455F4F49 24524F46 0A0000FB E65957F3 FA1C525F  R.| WY≠ ...FOR$IO_END.*┘ 0..▮ 0 000160
 2453544F 0C001654 59D05357 D052D451 5ED050D4 59FFF542 00EBDE57 5004C550 P{.PW* .B├.Y┌P▮ Q┘R▮WS▮YT...OTS$ 000180
 59FFD9B3 50EBDE00 00310314 28ABD557 01D05028 ABD0801C 35525F35 45564F4D MOVE5_R5..▮ {P▮.W┘ (..1..* P ¹.Y 0001A0
 8DF5BCEB 41C351FF EC1A3CEB 4CD05AFF DFDD6CE8 4CD00000 3103125C 89D00101 ..▮.\..1..▮L ]*’.Z▮L <. .Q A  ├ 0001C0
 5CD00014 00003103 18000F51 DCE9D500 1451FFE7 577CE9C2 51FFC10A CCEB41FF .A }. .Q ┴|W—.Q..┘┴*Q....1....▮\ 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 8 (00000008), 512 (0200) bytes

 000F51DC E9D00101 010011FF DFDD6CEB 4CD4FCA9 FFDFDD6C EB4CD000 0F51DCE9 ⊥⁴Q..▮L ]⁶⁷. |┌L ]⁶⁷......▮⊥⁴Q.. 000000
 D0010011 FFDFDD6C EB4C50AB D0FCA9FF DFDD6CEB 4C83D000 0F51DCE9 5CD050AB  P▮\⊥⁴Q..▮.L ]⁶⁷. |▮ PL ]⁶⁷.....▮ 000020
 F5BCEB41 C351FFEC 1A3CEB4C D05AFFDF DD6CEB4A D0000031 03125C5A D001565C \V.▮Z\..1..▮J ]⁶⁷.Z▮L <. .Q A  ├ 000040
 D0001400 00310318 000F51DC E9D5CD14 51FFE757 7CE9C251 FFC10ACC EB41FFBD  .A }. .Q ⊥|W—.Q.¤┘⊥⁴Q....1....▮ 000060
 D001A511 FFDFDD6C EB4CD4FC A9FFDFDD 6CEB4CD0 00125CFC A9D1000F 51DCE95C \⊥⁴Q..⁻ |\..▮L ]⁶⁷. |┌L ]⁶⁷.. .▮ 000080
 50AB000F 51DCE9D0 01018E11 FFDFDD6C EB4CD4FF DFDD6C80 EB46FFDF DD6CEB4C L ]⁶⁷.F .]⁶⁷.┌L ]⁶⁷......▮⊥⁴Q.. P 0000A0
 31FFDFDD 6CEB4C50 ABD0FCA9 FFDFDD6C EB4CD000 125CFCA9 D1000F51 DCE95CD0 ▮\⊥⁴Q..⁻ |\..▮L ]⁶⁷. |▮ PL ]⁶⁷.1 0000C0
 010101FF 4731FFDF DD6CEB4C 50ABD0FF DFDD6CEB 46FFDFDD 6CEB4CD0 0101FF62 b...▮L ]⁶⁷.F ]⁶⁷.▮ PL ]⁶⁷.1G.... 0000E0
 426CE9C3 51FFEC1A 3CEB4AD0 5CFFDFDD 6CEB4AD0 00003103 125AFFF9 D5DCE9D0 ▮⊥⁴┘ .Z..1..▮J ]⁶⁷.\▮J <. .Q ⊥1B 000100
 14000031 0318FFFC EAECE9D5 00145152 FFC10ACC EB4180C3 52FFE757 7CE9FFE4 ┐.⊥|W—.R .A }. .RQ..┘⊥ ┬|...1... 000120
 ECE9D000 11FFDFDD 6CEB4AD4 FFF9D5DC E9FFDFDD 6CEB4AD0 FFFCEAEC E95AD000 .▮Z⊥ ┬|.▮J ]⁶⁷.⊥⁴┘ .┌J ]⁶⁷...▮⊥ 000140
 DFDD6CEB 4A50ABD0 FFF9D5DC E9FFDFDD 6CEB4AD0 FFFCEAEC E95AD050 ABFFFCEA ┬|. P▮Z⊥ ┬|.▮J ]⁶⁷.⊥⁴┘ .▮ PJ ]⁶⁷ 000160
 FFEC1A3C EB4AD05C FFDFDD6C EB4CD000 00310312 5A5CD001 565AD001 010011FF .....▮ZV.▮\Z..1..▮L ]⁶⁷.\▮J <. . 000180
 FCEAECE9 5AD00014 00003103 18FFFCEA ECE9D5D9 14805152 FFC10ACC EB41C351 Q A }. .RQ..¹┘⊥ ┬|...1....▮Z⊥ ┬| 0001A0
 01AB11FF DFDD6CEB 4AD4FFF9 D5DCE9FF DFDD6CEB 4AD00012 5AFFF9D5 DCE9D1FF .⁻⊥⁴┘ .Z..▮J ]⁶⁷.┬⊥⁴┘ .┌J ]⁶⁷.. . 0001C0
 FFFCEAEC E9D00101 9211FFDF DD6CEB4A D4FFDFDD 6CEB46FF DFDD6CEB 4AD00101 ..▮J ]⁶⁷.F ]⁶⁷.┌J ]⁶⁷.....▮⊥ ┬|. 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 9 (00000009), 512 (0200) bytes

 017CFFF9 D5DCE9FF DFDD6CEB 4AD00012 5AFFF9D5 DCE9D1FF FCEAECE9 5AD050AB  P.Z⊥ ┬|.-⊥.J .Z...J 1.7.⊥.J .|. 000000
 EB4A50AB D0FFDFDD 6CEB46FF DFDD6CEB 4AD0FF60 31FFDFDD 6CEB4A50 ABD0CD02 .¤. PJ 1.7.1`..J 1.7.F 1.7.. PJ  000020
 45544952 5724524F 460C0001 FB7E01CE FD7A5701 50F10101 01FF4731 FFDFDD6C 1.7.1G....¶P.Wz ).- ...FOR$WRITE 000040
 4F460A00 00FBFE1C 53445F54 5F4F4924 524F460B 0001FB01 10CB9FFA 1C4C535F  SL.|.†.. ...FOR$IO T DS.  ...FO 000060
 01C3B41C 52454D49 545F5449 4E492442 494C0E00 00FBFE1C 444E455F 4F492452 R$IO_END.   ...LIB$INIT_TIMER.   . 000080
 DE001556 D55701D0 562CABD0 24AB03D0 58ABD400 180F28AB D158ABFF BDEDF0EB  §  . X- (...┌ X.. $. ,V..WJV... 0000A0
 FFC10ACC EB40FFBD F5BCEB40 C3FFD074 1CEB40D4 5089D001 010159FF BDEDF0EB  §  .Y....P┌@ .t.. @ ├ .@ }. . 0000C0
 ABD468AB D464AB02 D0D65756 F3C51C51 46444441 05000118 CBFA5CAB 50D00CAB  ..P \|†....ADDFQ.{ VW≥.. d┌ h┌. 0000E0
 60ABD501 0157D400 88CBD400 84CBD400 80CBD47C ABD478AB D474ABD4 70ABD46C 1┌ p┌ t┌ x┌ |┌†..┌†..┌†..┌W..┘ 000100
 1CEB48D5 58008CCB D09B1C51 464D4552 0500012C CBFA008C CB58D000 00310312 ..1...X†..|†....REMFQ...†..X┘H . 000120
 01010088 CBD40084 CB0088CB C00098CB D459D400 94CBD400 90CBD4DC 12FFD074 t...┌†..┌†..┌Y┌†.. †..†..┌†.... 000140
 4859D0FF CD5F10EB 58D0009C CB01D05C 01D0FFDC C85CEB48 57D059D6 6B58D001 ..Xk≥Y.WH \...\..†...X ._¤..YH 000160
 800500C8 0015FFC4 1FDCEB48 D5FFFCEA ECEB48D4 FFF9D5DC EB48D4FF CA49FCEB  |I°.┌H .┘ .┌H ┬|.┘H ..†....... 000180
 D60102FA F9C60302 D2E40302 E40102E4 E40602E4 E4E4E4E4 EB100200 0702B9C4 † ....., ┐┐┐┐┐..┐┐..┐..┐‡..≤ |..≥ 0001A0
 02FEF7F7 F9F5FEF9 F7F9F3FE EBF8F8F8 FDE80006 02D90102 C4FC8808 0200BC01 . ....|†.. ...         ├      . 0001C0
 F8FBF9FD FDF7F3FE FDF7F7FA F9F6FEF9 F3FFFEF9 F7FAF9F3 FEEBF8F8 FBFDFB01 .         |  .  ┤ |             0001E0
```

```
Dump of file DRBO:[KB78]PHASE3I.OBJ;1 on 22-JUL-1987 11:58:22.61
File ID (7639,36,0)   End of file block 38 / Allocated 39

Virtual block number 10 (0000000A), 512 (0200) bytes

FEF9F3FD FEF9F4F7 F9F3FEF7 F8F8FBFD FA0102FE F7F4F9F8 FEF9F4F9 F3FEEBF8  000000
FCFCF303 02F1F9FD EBFCF703 02F7F9E4 0502F701 02FDF7F3 00FDF7F4 F7F9F6BB  000020
FBFDF8FE FDF9F9FC FEFCFCF7 0102ED02 02F8FC01 02FC0402 FCFCFDFD FDFDFDFD  000040
ABFFC10A CCEB48FF BDF5BCEB 48C3FFD0 741CEB48 01D0D702 03E5F905 02F9F8F9  000060
D05E04C0 801C5147 44444105 000140CB FA008CCB 58D00150 CB5ED07E 0CABCE0C  000080
10ABD500 13000031 031814AB D518AB6B D014AB01 D010AB01 D0010101 58008CCB  0000A0
052CEB40 4E5018AB D0001100 A0CBFFD6 9E3CEB40 4E5018AB D0001400 00310318  0000C0
31031853 D553FFDF DD6CEB40 D05018AB D0010101 00115300 A0CB4A00 A0CBFFE9  0000E0
009CCBE2 D1009CCB D6019511 10ABD400 13000031 031810AB D5000031 03150000  000100
42494C0E 0001BCCB FA78AB7C ABC07CAB 500080CB C3507CAB 5CC10000 3103145C  000120
020CCBFA FC1C574F 4C465841 4D070001 C8CBFAFC 1C52454D 49545F54 41545324  000140
68AB5000 A8CBC350 68AB00AC CBC1801C 52454D49 545F5441 54532442 494C0E00  000160
150080CB D55001D0 010098CB 500080CB C3500098 CB5CC174 AB0080CB C06CABD6  000180
5CEB44C3 55FFC10A CCEB4457 C1FFD074 1CEB4401 CE5481D0 51FFC734 F0EBDE00  0001A0
00310314 0080CBD5 5501D054 0080CBD0 D8500080 CBF3FFC1 0ACCEB44 55FFDCC8  0001C0
00310312 00003103 1853D501 5383FFE9 052CEB4A D05A86D0 56FFC734 F0EBDE00  0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 11 (0000000B), 512 (0200) bytes

 D69E3CEB 40D00000 31001400 00310318 FFCA49FC EB40D550 FFEC1A3C EB43D000 .:C <.  .P┘@ |I°...1....1..:@ <.≥ 000000
 00B4CB51 D000135A FFEC1A3C EB41D100 00310312 00003103 1851D501 010151FF .Q...┘Q..1....1..¯A <.  .Z..:Q† . 000020
 EB40D1FF D3892CEB 4051D052 FFD3892C EB40D001 0101DB11 51FFDFDD 6CEB41D0 :A ]:'.Q.³....:@ ,.└.R:Q@ ,.└.¯@  000040
 010011FF DFDD6CEB 4152D0FF D69E3C83 EB40FFDF DD6CEB41 D0001251 FFD69E3C <.≥.Q..:A ]:'.@ .<.≥.:RA ]:'.... 000060
 4CEB4AD0 FFDFDD6C EB4152D0 FFDFDD6C EB40FFDF DD6CEB41 D05000B4 CBD00101 ..:† .P:A ]:'.@ ]:'.:RA ]:'.:J L 000080
 2CEB4AFF DFDD6CEB 43D00012 53FFE905 2CEB4AD1 FFD9B34C EB4A53D0 51FFD9B3  ¹.Q:SJ L '.¯J ,.┴.S..:C ]:'.J , 0000A0
 D0FFDFDD 6CEB42FF DFDD6CEB 43D05250 ABD00100 11FFDFDD 6CEB4351 D0FFE905 .┴.:QC ]:'....: PR:C ]:'.B ]:'.: 0000C0
 C85CEB4A D1001357 D5FF0031 53FFDFDD 6C90EB43 D050AB53 D0FFDFDD 6CEB4351 QC ]:'.:S P:C .]:'.S1..┘W..¯J \' 0000E0
 1A3CEB43 D0010013 00003103 1853FFD3 892CEB4A D0001300 98CBD500 1357FFDC '.W..┘†....:J ,.└.S..1.....:C <. 000100
 C252FFC1 0ACCEB4A FFBDF5BC EB4AC300 13000031 0318FFCA 49FCEB41 D551FFEC  .Q┘A |I°...1....  J  ├ .J }.  .R 000120
 000218CB FA0220CB 5ED07E53 30ABC308 AB52FFDC C85CEB41 C152FFC1 0ACCEB41 A }.  .R A \'‘.R .  OS ‘:“† .|†... 000140
 6F550154 F1A51400 00310318 53FFDFDD 6CEB43D0 5E04C0DD 1C514D54 49444506 .EDITMQ.' .`:C ]:'.S..1... ¶T.Uo 000160
 0230CB9F FA1C4C53 5F455449 52572452 4F460C00 01FB7E01 CE001200 98CBD5FE  ┘†....}.¯ ...FOR$WRITE_SL.|.†O. 000180
 5F4F4924 524F460A 0001FB00 94CBDDFA 1C53445F 545F4F49 24524F46 0B0001FB  ...FOR$IO_T_DS.|:†.. ...FOR$IO_ 0001A0
 01D0545C D0010101 FC6B3188 1C444E45 5F4F4924 524F460A 0000FBFE 1C565F4C L_V.  ...FOR$IO_END..1k|...:\T:_ 0001C0
 CA49FCEB 4AD553FF D9B34CEB 4AD05A86 D056FFCD 5F10EBDE 00003103 145CD555 UJ\..1..' ._¤.V¯.Z:J L '.S┘J |I° 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 12 (0000000C), 512 (0200) bytes

 FCEB40D5 50FFEC1A 3CEB43D0 00130000 31031853 D5010101 00130000 310318FF ...1......┘S..1....▮C <. .P┘@ | 000000
 50FFC10A CCEB4AC2 50FFC10A CCEB40FF BDF5BCEB 40C30014 00003103 18FFCA49 I°...1.... @  ├ .@ }. .P J }. .P 000020
 D0534CAB D0DA1C51 4D544944 45060002 01190002 38CBFA4C AB53D008 AB5057C1  WP .▮S L|†8.......EDITMQ.▪▮ LS▮ 000040
 50CBFA4C AB53D0FB D3310314 0094CBD5 885554F3 010101AB 1153FFDF DD6CEB43 C 1▪'.S. ... TU.┘†....1└ ▮S L|†P 000060
 1A3CEB43 D054FFEC 1A3CEB40 D0505330 ABC1534C ABD0801C 514D4D45 52050002 ...REMMQ..▮ LS  OSP▮@ <. .T▮C <. 000080
 C3B51400 00310318 FFCA49FC EB45D5C3 13000031 0318FFCA 49FCEB44 D555FFEC  .U┘D |I°...1... ┘E |I°...1...    0000A0
 08ABD150 FFDCC85C EB44C050 FFC10ACC EB44C250 FFC10ACC EB45FFBD F5BCEB45 E  ├ .E }. .P D }. .P D \'▪.P- .  0000C0
 031253FF D9B34CEB 44D05855 D0FFCA49 FCEB4450 D0505901 C15708AB D0911250 P..▮ .W .YP▮PD |I°.▮UX▮D L '.S..  0000E0
 6CEB43FF E9052CEB 44D056FF DFDD6CEB 43D00012 55A2FFEC 1A3CEB43 D1000031 1..-C <. . U..▮C 1▪'.V▮D ..┴.C 1 000100
 53FFDFDD 6CEB43D0 5653D000 11FFD9B3 4CEB4456 D0FFE905 2CEB4453 D0FFDFDD ▪'.▮SD ..┴.▮VD L '...▮SV▮C 1▪'.S 000120
 2CEB44D0 FFDFDD6C EB46FFDF DD6CEB43 D0E61255 FFEC1A3C EB43D100 00310312 ..1..-C <. .U.≠▮C 1▪'.F 1▪'.▮D , 000140
 0502FCFC 0102DE03 02F1F801 02F70202 B9C28005 00C500FF DFDD6CEB 43FFE905 .┴.C 1▪'..≤... .. ..¶..'..||.. 000160
 F7F70802 F70802FB F4F65602 FBFEFDF6 0102F401 02F10202 FEFBF2FE F2F6F6FC |┤┤       ..¶.. ..┤   .V┤  .. ..  000180
 F6F4F505 02EF0302 F8F4F7FD 0302E8FA 0202E902 02F8FDF0 F10202FA FD0102F2  .. |..¶§  ..┴..| ..    .. ..├ ┤ 0001A0
 000402FD 1C02F8FC 00019109 080EEEFE F8F3F6F8 F8F8EBFE F8F3F6F8 F5FEF8FB  ├ ┤        ┤   ......| .. ... 0001C0
 ECFD0402 FD0202D9 FAFA0302 F9F8EA03 02BDE0F2 0102F7F9 F8FA0202 F60402FC |..┤..|    .. ▪ ..┬  ..||'.. ..   0001E0
```

Dump of file DRB0:[KB78]PHASE3I.OBJ;1 on 22-JUL-1987 11:58:22.61
File ID (7639,36,0)   End of file block 38 / Allocated 39

Virtual block number 13 (0000000D), 512 (0200) bytes

```
FAE2F2F2 F80202F3 EF0602F7 00F90702 FEF8EF03 02E5F201 02F80102 F4F2F8FD   ..  ..  ..   .. . ..  ..   |  000000
45D0FFE9 052CEB44 53D08002 03E8F3F6 FBF8FDFE F8F8F3F8 F6FBF8FD 0802F4FC  | ..   ┤        ┤  ...▮SD  ..⊥.▮E  000020
EB45D056 FFDFDD6C EB43D000 1254FFEC 1A3CEB43 D1000031 031253FF D3892CEB  ..L.S..1..-C <.  .T..▮C ]▮'.V▮E   000040
46FFDFDD 6CEB43D0 E61254FF EC1A3CEB 43D10000 31031253 FFDFDD6C EB43D056  <.≥.C ]▮'.▮SE <.≥.▮VE ..L.....▮S  000060
D5DCEB45 D5FFD69E 3C8EEB45 53D0FFDF DD6CEB43 FFD69E3C EB45D0FF DFDD6CEB  V▮C ]▮'.S..1..-C <.  .T.≠▮C ]▮'.F  000080
FCEB4659 D0015655 D000C0CB 64AB02C3 5950D000 BCCBD45C D4FA9831 0312FFF9   ]▮'.▮E <.≥.C ]▮'.▮SE .<.≥.┘E ⁴┘   0000A0
0015FFC4 1FDCEB46 D500BCCB D6FFFCEA ECEB46D4 FFDCC85C EB4608AB D0FFCA49  ...1.|┌\┌† .▮PY . d† .▮UV.▮YF |   0000C0
0278CB5E D07E0CAB CE0CABFF C10ACCEB 46FFBDF5 BCEB46C3 FFD0741C EB4601D0  I°.▮ .F \┌⁴.┌F ┌T|.≥† .┘F ⁴.†...  0000E0
F9D5DCEB 46D55600 C4CBD05E 04C0A01C 51474444 41050002 68CBFA00 C4CB56D0  ▮.F .t▮. F  [.F┬}. . .) .-▮^†x.  000100
56FFEC1A 3CEB40D0 50FFF9D5 DCEB4630 ABC10014 30ABFFF9 D5DCEB46 D10015FF  ▮V††.|†h...ADDGQ.. .^▮††.V┘F ⁴┘   000120
AB00BCCB C1010101 FF673156 FFEC1A3C EB40D050 FFF9D5DC EB4630AB C3FF7C31  ...-F ⁴┘ . 0..  OF ⁴┘ .P▮@ <. .V  000140
4D49545F 54415453 2442494C 0E0001BC CBFA78AB 7CABC07C AB560080 CBC3567C  1|.  OF ⁴┘  .P▮@ <.  .V1g.... † .  000160
41545324 42494C0E 00020CCB FAFC1C57 4F4C4658 414D0700 027CCBFA FC1C5245  |V †..V |   | x|† ...LIB$STAT_TIM  000180
74AB0080 CBC070AB D668AB50 00A8CBC3 5068AB00 ACCBC1AD 1C52454D 49545F54  ER.||†|...MAXFLOW.||†....LIB$STA  0001A0
FFCA49FC EB44D500 98CB5000 80CBC350 0098CB00 BCCBC100 12FFCA49 FCEB44D5  T_TIMER.‡ † . hP † .P h≥ p †.. t   0001C0
                                                                          ┘D |I°... † .†..P †..P†..┘D |I°.  0001E0
```

```
Dump of file DRB0:[K878]PHASE3I.OBJ;1 on 22-JUL-1987 11:58:22.61
File ID (7639,36,0)   End of file block 38 / Allocated 39

Virtual block number 14 (0000000E), 512 (0200) bytes

4F460C00 01FB7E01 CE01F96D 31FFCA49 FCEB4459 01C1FABD 31031200 00310318 ..1....1 | .YD |I°.1m .).˜ ...FO 000000
1C53445F 545F4F49 24524F46 0B0001FB 02C8CB9F FA1C4C53 5F455449 52572452 R$WRITE_SL.|.†·. ...FOR$IO_T_DS. 000020
54495257 24524F46 0C0001FB 7E01CEFB 1C444E45 5F4F4924 524F460A 0000FBFE  ...FOR$IO_END. ).˜ ...FOR$WRIT 000040
0001FB54 DDFC1C53 445F545F 4F492452 4F460800 01FB02D0 CB9FFA1C 4C535F45 E_SL.|.†:. ...FOR$IO_T_DS.|'T .. 000060
DFF71C56 5F4C5F4F 4924524F 460A0001 FB55DDFC 1C565F4C 5F4F4924 524F460A .FOR$IO_L_V.|'U ...FOR$IO_L_V. ' 000080
0001FBFF D3892CEB 45DFF71C 525F4C5F 4F492452 4F460A00 01FBFFD9 B34CEB44 D L '. ...FOR$IO_L_R. 'E ..L. .. 0000A0
AB54D0F8 1C444E45 5F4F4924 524F460A 0000FBFE 1C525F4C 5F4F4924 524F460A .FOR$IO_L_R. ...FOR$IO_END. :T 0000C0
31811C54 4E495250 05000308 CBFA40AB 55D0F81C 544E4952 50050002 D8CBFA34 4|†°...PRINT. :U @|†....PRINT..1 0000E0
49FCEB40 D150FFEC 1A3CEB43 D0F94C31 6BFFCD5F 0CEB40D0 50009CCB D0010000 ...:†..P:@ ._¤.k1L :C <. .P-@ |I 000100
FFF9D5DC EB40D4FF CA49FCEB 4059D0FF CD5F0CEB 4C50D05C D6001400 1359FFCA °.Y....≥\:PL¯._¤.:Y@ |I°.┌@ ·┘ . 000120
FFD0741C EB4001D0 0015FFC4 1FDCEB40 D5FFDCC8 5CEB4057 D0FFFCEA ECEB40D4 ┌@ ┬|.:W@ \··.┘@ ·.†...:.@ .t:. 000140
A8FECBFA 04AB50D0 01B8CB5E D07E0CAB CE0CABFF C10ACCEB 40FF9DF5 BCEB40C3  @ ┴ .@ }. : .) .¯:·† .:P_.|† 000160
460C0001 FB7E01CE 01F8D931 18AB53D0 14ABD45E 04C0ED1C 51474444 41050001 ...ADDGQ. . ┌.:S .1' .).˜ ...F 000180
53445F54 5F4F4924 524F460B 0001FB02 C0CB9FFA 1C4C535F 45544952 5724524F OR$WRITE_SL.|.† . ...FOR$IO_T_DS 0001A0
54415453 2442494C 0E000154 CBFAFC1C 444E455F 4F492452 4F460A00 00FBFE1C .  ...FOR$IO_END.||†T...LIB$STAT 0001C0
50000043 C88F4750 68AB4E57 50000043 C88F4750 00A4CB4E E21C5245 4D49545F _TIMER. N† .PG.·C..PWN hPG.·C..P 0001E0
```

```
Dump of file DRB0:[KB78]PHASE3I.OBJ;1 on 22-JUL-1987 11:58:22.61
File ID (7639,35,0)    End of file block 38 / Allocated 39

Virtual block number 15 (0000000F), 512 (0200) bytes

 000202D9 01FB0160 CB9FFA1C 4C535F45 54495257 24524F46 0C0001FB 7E01CE58 X›.˜ ...FOR$WRITE_SL.|.†`. .'... 000000
 1C565F4C 5F4F4924 524F460A 0001FB24 ABDDFB1C 53445F54 5F4F4924 524F460B .FOR$IO_T_DS. • $ ...FOR$IO_L_V. 000020
 54495257 24524F46 0C0001FB 7E01CEFB 1C444E45 5F4F4924 524F460A 0000FBFE   ...FOR$IO_END. ›.˜ ...FOR$WRIT 000040
 0001FB57 DDFC1C53 445F545F 4F492452 4F460B00 01FB0168 CB9FFA1C 4C535F45 E_SL.|.†h. ...FOR$IO_T_DS.|•W .. 000060
 53445F54 5F4F4924 524F460B 0001FB01 70CB9FFA 1C565F46 5F4F4924 524F460A .FOR$IO_F_V.|.†p. ...FOR$IO_T_DS 000080
 455F4F49 24524F46 0A0000FB FE1C565F 465F4F49 24524F46 0A0001FB 58DDFC1C .|•X ...FOR$IO_F_V.  ...FOR$IO_E 0000A0
 0001FB01 78CB9FFA 1C4C535F 45544952 5724524F 460C0001 FB7E01CE FB1C444E ND. ›.˜ ...FOR$WRITE_SL.|.†x. .. 0000C0
 1C565F4C 5F4F4924 524F460A 0001FB6C ABDDFB1C 53445F54 5F4F4924 524F460B .FOR$IO_T_DS. • l ...FOR$IO_L_V. 0000E0
 524F460A 0001FB70 ABDDFB1C 53445F54 5F4F4924 524F460B 0001FB01 80CB9FFA |.†.. ...FOR$IO_T_DS. • p ...FOR 000100
 70ABC150 74AB4EE2 1C444E45 5F4F4924 524F460A 0000FBFE 1C565F4C 5F4F4924 $IO_L_V.  ...FOR$IO_END. N tP  p 000120
 49525724 524F460C 0001FB7E 01CE5850 58475078 AB4E5750 58475858 4E586CAB  1XNXXGXPWN xPGXPX›.˜ ...FOR$WRI 000140
 01FB58DD FC1C5344 5F545F4F 4924524F 460B0001 FB0188CB 9FFA1C4C 535F4554 TE_SL.|.†.. ...FOR$IO_T_DS.|•X . 000160
 445F545F 4F492452 4F460B00 01FB0190 CB9FFA1C 565F465F 4F492452 4F460A00 ..FOR$IO_F_V.|.†.. ...FOR$IO_T_D 000180
 5F4F4924 524F460A 0000FBFE 1C565F46 5F4F4924 524F460A 0001FB57 DDFC1C53 S.|•W ...FOR$IO_F_V.  ...FOR$IO_ 0001A0
 01FB0198 CB9FFA1C 4C535F45 54495257 24524F46 0C0001FB 7E01CEFB 1C444E45 END. ›.˜ ...FOR$WRITE_SL.|.†.. . 0001C0
 5F545F4F 4924524F 460B0001 FB01A0CB 9FFA1C53 445F545F 4F492452 4F460B00 ..FOR$IO_T_DS.|.†.. ...FOR$IO_T_ 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 16 (00000010), 512 (0200) bytes

 1FE0EBDE 001528AB D55701D0 E21C444E 455F4F49 24524F46 0A0000FB FE1C5344 DS.  ...FOR$IO_END. ;.WJ (..' '. 000000
 4C535F45 54495257 24524F46 0C0001FB 7E01CE00 15FCAD57 D1001288 D558FFC4 +.XJ...~W||..)..  ...FOR$WRITE_SL 000020
 4F460A00 01FBFFFC EAECE8DF F81C565F 4C5F4F49 24524F46 0A0001FB 57DDFC1C .|'W ...FOR$IO_L_V. '  T|. ..;FO 000040
 5CE8DFF8 1C525F4C 5F4F4924 524F460A 0001FBFC A8DFF81C 525F4C5F 4F492452 R$IO_L_R. ' | ...FOR$IO_L_R. ' \ 000060
 524F460A 0001FB00 0F694CE8 DFF81C52 5F4C5F4F 4924524F 460A0001 FB00127E  .. ...FOR$IO_L_R. ' Li.. ...FOR 000080
 DFF81C52 5F4C5F4F 4924524F 460A0001 FB0024E5 4CE8DFF8 1C525F4C 5F4F4924 $IO_L_R. ' L $. ...FOR$IO_L_R. ' 0000A0
 5F4F4924 524F460A 0000FBFE 1C525F4C 5F4F4924 524F460A 0001FB00 15936CE8  1... ...FOR$IO_L_R.  ...FOR$IO_ 0000C0
 00000A17 0201014F 001C504F 54532452 4F460800 00FB8C57 28ABF3F9 1C444E45 END.    (W. ...FOR$STOP..O....... 0000E0
 54494E49 2442494C 0E000817 014E4941 4D244933 45534148 500C4FFC 00000000 ....|O.PHASE3I$MAIN.....LIB$INIT 000100
 41050008 17015146 4D455205 00081701 51464444 41050008 17015245 4D49545F _TIMER.....ADDFQ.....REMFQ.....A 000120
 4658414D 07000817 0152454D 49545F54 41545324 42494C0E 00081701 51474444 DDGQ.....LIB$STAT_TIMER.....MAXF 000140
 49525005 00081701 514D4D45 52050008 1701514D 54494445 06000817 01574F4C LOW.....EDITMQ.....REMMQ.....PRI 000160
 00415441 44502406 0000039A 00A90200 45444F43 24050000 104700E9 0200544E NT..⊥.G....$CODE..  ......$PDATA. 000180
 0A000817 01504F54 5324524F 46080008 17014C41 434F4C24 06004215 58018902 ...X.B..$LOCAL.....FOR$STOP..... 0001A0
 4F460A00 08170152 5F4C5F4F 4924524F 460A0008 1701444E 455F4F49 24524F46 FOR$IO_END.....FOR$IO_L_R.....FO 0001C0
 24524F46 0B000817 01565F46 5F4F4924 524F460A 00081701 565F4C5F 4F492452 R$IO_L_V.....FOR$IO_F_V.....FOR$ 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 17 (00000011), 512 (0200) bytes

 24524F46 0B000817 014C4E5F 585F4F49 24524F46 0B000817 0153445F 545F4F49 IO_T_DS.....FOR$IO_X_NL.....FOR$ 000000
 53544F0C 00081701 4C535F45 54495257 24524F46 0C000817 014C535F 44414552 READ_SL.....FOR$WRITE_SL.....OTS 000020
 50015C00 050AFF50 01520005 14FF5001 48000502 02C80035 525F3545 564F4D24 $MOVE5_R5.'....H.P....R.P....\.P 000040
 028FFE50 03550005 22FF5003 25000521 FF5002F8 00050125 FE5001BE 00051CFF .... .P %... .P.!..%.P."..U.P .. 000060
 00051CFF 50039B00 050AD2FE 50039800 054DFF50 038E0005 0134FE50 03660005 ..f.P 4.....P.M....P ‡.....P.... 000080
 041B0005 0A52FE50 04180005 00B4FE50 03E60005 04FF5003 DA00052A FF5003B4  .P.*..'.P....*.P  .....P R..... 0000A0
 51FF5004 CE000501 38FE5004 A6000517 FF500468 000513FF 50042800 0538FF50 P.8..(.P....h.P.... .P 8...).P.Q 0000C0
 2A000505 FF50051D 00052BFF 5004F700 051CFF50 04D80005 0992FE50 04D80005 ..•.P ....'.P.... .P.+....P....* 0000E0
 5005AB00 0518FF50 05630005 40FF5005 53000509 1AFE5005 50000500 B4FE5005 .P  ...P.P ....S.P.@..c.P.... .P 000100
 0536FF50 06FE0005 07FCFE50 068A0005 34FF5006 29000503 FF500617 000518FF ......P....).P.4....P |... .P.6. 000120
 67000510 FF500757 00050716 FE500754 000532FF 50074D00 050720FE 50074A00 .J.P  ...M.P.2..T.P ....W.P....g 000140
 50079E00 050654FE 50079600 0506D9FE 50079100 050FFF50 077C0005 0EFF5007 .P....|.P......P '.....P T.....P 000160
 98FE5008 4F00052F FF500810 00050626 FE5007B4 000506FF 5007A100 0506CCFE  }.... .P.... .P &.....P./..O.P . 000180
 03FF5008 85000505 E8FE5008 82000500 F4FE5008 6E000506 01FE5008 69000501 ...i.P ....n.P  .....P  .....P.. 0001A0
 0512FF50 08A90005 00B5FE50 089E0005 05D1FE50 08990005 00CCFE50 08870005 ....P }.....P -.....P  ... .P... 0001C0
 50096700 051AFF50 093A0005 18FF5009 2300051D FF5008EC 00051AFF 5008D500 .J.P.... .P....#.P....:.P....g.P 0001E0
```

```
Dump of file DRBO:[KB78]PHASE3I.OBJ;1 on 22-JUL-1987 11:58:22.61
File ID (7639,36,0)   End of file block 38 / Allocated 39

Virtual block number 18 (00000012), 512 (0200) bytes

 055CFF50 09860005 04E7FE50 09830005 6BFF5009 77000571 FF500971 00057BFF .{..q.P.q..w.P.k....P —.....P.\. 000000
 2700052D FF5009EE 0005048B FE5009DF 000536FF 50099D00 0504D0FE 50099A00 ...P ......P.6..'.P .....P.-..' 000020
 0A540005 0419FE50 0A510005 5BFF500A 48000504 25FE500A 45000500 7FFE500A .P ....E.P %...H.P.[..Q.P ....T. 000040
 FE500AEF 00050389 FE500AE1 00052CFF 500A6A00 050403FE 500A6700 054FFF50 P.O..g.P ....J.P.,...P ......P 000060
 01E0FE50 0B760005 3CFF500B 67000527 FF500B40 00050221 FE500B35 0005037B {...5.P !...@.P.'..g.P.<..v.P .. 000080
 00050164 FE500BF2 00053EFF 500BE100 0529FF50 0BBA0005 01A7FE50 0BAF0005 ....P ... .P.)...P.>.. .P d... 0000A0
 FE500D44 000510FF 500D2900 0515FF50 0CAE0005 38FF500C A3000536 FF500C64 d.P.6.. .P.8...P....).P....D.P 0000C0
 0530FF50 0E300005 6CFF500D FF000563 FF500DFD 000500AD FE500DD9 00050126 &....P .... .P.c....P.l..0.P.0. 0000E0
 F8F6FBF8 F8F3B99C 800500A9 65FF500F D5000506 FF500FCF 00057BFF 500FC400 .+.P.{...P....┘.P.e ....     ┤ 000100
 F1F8F7FC F9F70102 F8FC0302 F9FDFCFE F40402F8 0402F3F3 F6FBF8FB FEF8F8F3 000120
 02E3FD04 02F70102 EFE70102 FAFDF2F7 F70302F7 FBF2FDFD EEFDEEF5 F7E10102 000140
 02F9F901 02F8F8FE F40102F8 2D02FD01 02F20001 0CC9030E F30102F3 0102B601 000160
 F4F8F8F7 000102DA 00011F09 1D0EFD01 0803FC01 02FDE705 02F1F801 02F7F803 000180
 00BD0100 00104700 BF06F9FB 01029B01 02F6F1D9 0102C704 02F8EFC5 0102C7DA 0001A0
 6C754A2D 32323130 02514644 44410504 00000000 00300000 00000000 00030007 ...........0........ADDFQ.0122-Jul 0001C0
 01000016 37353A31 31203738 39312D6C 754A2D32 3237353A 31312037 3839312D -1987 11:5722-Jul-1987 11:57.... 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 19 (00000013), 512 (0200) bytes

 05000000 0100BC0C F305000F 3434322D 362E3456 204E4152 54524F46 20584156 VAX FORTRAN V4.6-244... . ...... 000000
 FC500802 04020090 51464444 4105FA1B 00000400 BE0CFD05 00100051 46444441 ADDFQ.... . .....|.ADDFQ......P| 000020
 04BCC308 BCD65BEF 1C000204 DE480CFD 50000004 1B040204 1B000204 00000002 ...............P .H'.... [≥ .  . 000040
 02C70152 08BCD0F0 1C07CC03 054010BC D0FC1CFC 03044150 D05108BC D0500CBC  .P: .Q:PA..|.|: .@..}..S: .R.(. 000060
 43FF1C07 CC030541 D153FD1C FC030440 D051FD1C FC030442 D0001301 52D15052 RP-R...:B..|. Q:@..|. S-A..}...C 000080
 F61C5146 48435845 060008AB FA04AB50 D06B52D0 01010011 0019F01C 07CC0305 ..}..S.....:.:Rk:P .| ...EXCHFQ.-| 0000A0
 04046146 44444105 480C0000 00000000 0A170301 008E0401 0101BF11 8204A800 : .R. .... ...........H.ADDFQ.. 0000C0
 444F4324 05000000 7100E902 00514648 43584506 00081701 00020002 00020002 .............EXCHFQ..⊥.q....$COD 0000E0
 004C4143 4F4C2406 00000014 01890200 41544144 50240600 00000000 A9020045 E.. .......$PDATA.........$LOCAL. 000100
 001AFF50 55000404 FF505300 043BFF50 34000402 0013315A 0200000F A001BD02 . .......Z1.....4P.;..SP....UP... 000120
 BF06FFFD FEFCEFFE E10102FB FC0302FB 0102F7F4 FAFDF703 02008919 DD050025 %..'. ...  |. .. ..| ..   |  .. 000140
 4A2D3232 31300251 464D4552 05040000 00000030 00030002 00BD0100 00007100 .q.... .....0.......REMFQ.0122-J 000160
 00163735 3A313120 37383931 2D6C754A 2D323237 353A3131 20373839 312D6C75 ul-1987 11:5722-Jul-1987 11:57.. 000180
 00000100 BC0CF305 000F3434 322D362E 3456204E 41525452 4F462058 41560100 ..VAX FORTRAN V4.6-244... . .... 0001A0
 0C020402 01005146 4D455205 FA1B0000 0400BE0C FD050010 0051464D 45520500 ..REMFQ.... . .....|.REMFQ...... 0001C0
 FD500000 041B0802 041B0002 04000000 02FC1B04 02041B00 02040000 0002FC50 P|............|...............P  0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 20 (00000014), 512 (0200) bytes

 D110BC07 CCC240D0 500CBCD0 0CBC62D0 52961C00 0304DE5B FE1C0002 04DE483C <H'.... ['.....R.b .. .P.@ }. .- 000000
 01530100 08BCD762 FCA240D0 5008BCD0 01010100 003108BC D762D400 120108BC  .....rb. .1...... .P.@ |b. ...S. 000020
 D050FCA2 43D00015 50555150 08BC4E00 1408BC54 D155504E 505401C1 545302C5 {.ST .TPNPU-T ...N .PQUP...C |P. 000040
 46484358 4506000C ABFA04AB 54D06B53 D0001507 CCC24107 CCC240D1 51FCA244 D |Q-@ }.A }....Sk.T .|....EXCHF 000060
 01001100 1907CCC2 4107CCC2 40D151FC A245D050 FCA244D0 55554A00 11C01C51 Q. ..JUU.D |P.E |Q-@ }.A }...... 000080
 08AB55D0 6B53D000 1507CCC2 4107CCC2 44D151FC A245D054 FCA243D0 5554D001 ..TU.C |T.E |Q-D }.A }....Sk.U . 0000A0
 0301005E 040CBC04 BCC00101 FF763153 08ABD0F1 1C514648 43584506 0018ABFA | ...EXCHFQ.¶. .S1v... . .. ... 0000C0
 45060008 17010002 00020002 00020404 51464D45 5205483C 00000000 00000A17 ........<H.REMFQ................E 0000E0
 41445024 06000000 0000A902 0045444F 43240500 0000D200 E9020051 46484358 XCHFQ..⊥.‡....$CODE.. .......$PDA 000100
 0402003B 315A0200 000FA001 BD02004C 41434F4C 24060000 00240189 02004154 TA....$....$LOCAL.. .......Z1;... 000120
 00045DFF 506E0004 26FF5059 00047BFF 50500004 009FFE50 2B00040B FF502400 .$P....+P ....PP.{..YP.&..nP.].. 000140
 B926D005 00320018 FF5000B3 000505FF 50009900 0504FF50 00970005 4CFF507F .P.L....P......P..... .P...2...& 000160
 F1EBFB01 02FEE802 0200FEF1 EBF7FAF9 FCFC0102 FDF4FDFD FEFAF5F5 F7030200 ... ├┤|     ..|| | ¶ ...  ... ¶ 000180
 51464843 58450604 00000000 00310003 0002BD01 000000D2 00BF06FF FBFEFDFC |  .. .‡.... ....1........EXCHFQ 0001A0
 20373839 312D6C75 4A2D3232 37353A31 31203738 39312D6C 754A2D32 32313002 .0122-Jul-1987 11:5722-Jul-1987  0001C0
 00103434 322D362E 3456204E 41525452 4F462058 41560100 00160037 353A3131 11:57.....VAX FORTRAN V4.6-244.. 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 21 (00000015), 512 (0200) bytes

43584506 F91B0000 0400BE0D FD050011 51464843 58450600 00000100 BC0DF205 . ......EXCHFQ... . ..... .EXC 000000
42D05204 BCD051F9 1CFC0304 40D05008 BCD04004 F8500000 04020032 00514648 HFQ.2.....P .@. .P.@..|. Q. .R.B 000020
00000A17 03010050 04FF1CFC 03044251 D05204BC D0F91CFC 030440FF 1CFC0304 ..|..@..|. . .R.QB..|...P....... 000040
444F4324 05000000 2C00E902 00000200 02020251 46484358 45064004 00000000 ......@.EXCHFQ.........⊥......$COD 000060
004C4143 4F4C2406 00000000 01890200 41544144 50240600 00000000 A9020045 E.. ......$PDATA.........$LOCAL. 000080
01000000 2C00BF06 FFF4EFF4 FE030200 B909ED05 0015315A 0200000F A001BD02 . ......Z1... . .... .. ....... 0000A0
38393120 6C754A2D 32323130 02514744 44410504 00000000 00300003 000200BD  .....0........ADDGQ.0122-Jul-198 0000C0
20584156 01000016 37353A31 31203738 39312D6C 754A2D32 3237353A 31312037 7 11:5722-Jul-1987 11:57....VAX 0000E0
47444441 05000000 0100BC0C F305000F 3434322D 362E3456 204E4152 54524F46 FORTRAN V4.6-244.... . ......ADDG 000100
00000002 FC500802 04020090 51474444 4105FA1B 00000400 BE0CFD05 00100051 Q.... . .....|.ADDGQ......P|.... 000120
D0500CBC 04BCC308 BCD65BEF 1C000204 DE480CFD 50000004 1B040204 1B000204 ..........P .H'.....[≥ .  . .P. 000140
52D15052 02C70152 08BCD0F0 1C07CC03 054010BC D0FC1CFC 03044150 D05108BC  .Q.PA..|.|. .@..}..§. .R.(.RP-R 000160
07CC0305 43FF1C07 CC030541 D153FD1C FC030440 D051FD1C FC030442 D0001301 ....B..|. Q.@..|. S-A..}...C..}. 000180
5204ABD0 F61C5147 48435845 060008AB FA04AB50 D06B52D0 01010011 0019F01C .§.....Rk.P .| ...EXCHGQ.-|. .R 0001A0
00020002 04045147 44444105 480C0000 00000000 0A170301 005E0401 0101BF11 . .... ............H.ADDGQ...... 0001C0
A9020045 444F4324 05000000 7100E902 00514748 43584506 00081701 00020002 .........EXCHGQ..⊥.q....$CODE..  0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 22 (00000016), 512 (0200) bytes

 A001BD02 004C4143 4F4C2406 00000014 01890200 41544144 50240600 00000000 ......$PDATA.........$LOCAL.. .. 000000
 DD050025 001AFF50 55000404 FF505300 043BFF50 34000402 0013325A 0200000F ....Z2.....4P.;..SP....UP...%..  000020
 00007100 BF06FFFD FEFCEFFE E10102FB FC0302FB 0102F7F4 FAFDF703 0200B919 . ...  |  .. ..| .. '  |  .. .q.. 000040
 312D6C75 4A2D3232 31300251 474D4552 05040000 00000030 00030002 00BD0100 .. .....0........REMGQ.0122-Jul-1 000060
 41560100 00163735 3A313120 37383931 2D6C754A 2D323237 353A3131 20373839 987 11:5722-Jul-1987 11:57....VA 000080
 45520500 00000100 BC0CF305 000F3434 322D362E 3456204E 41525452 4F462058 X FORTRAN V4.6-244... . .......RE 0000A0
 0002FC50 0C020402 01005147 4D455205 FA1B0000 0400BE0C FD050010 0051474D MGQ.... . .....|.REMGQ......P|.. 0000C0
 04DE483C FD500000 041B0802 041B0002 04000000 02FC1B04 02041B00 02040000 ..........|................P <H'. 0000E0
 120108BC D110BC07 CCC240D0 500CBCD0 0CBC62D0 52961C00 0304DE5B FE1C0002 ... ['.....R:b .: .P:@ }. .  ... 000100
 545302C5 015301D0 08BCD762 FCA240D0 5008BCD0 01010100 003108BC D762D400 .rb. .1......: .P:@ |b. .:.S.{.ST 000120
 51FCA244 D050FCA2 43D00015 50555150 08BC4E00 1408BC54 D155504E 505401C1  .TPNPU-T ...N .PQUP..:C |P:D |Q 000140
 11C01C51 47484358 4506000C ABFA04AB 54D06B53 D0001507 CCC24107 CCC240D1 -@ }.A }...:Sk:T .| ...EXCHGQ. . 000160
 5554D001 01001100 1907CCC2 4107CCC2 40D151FC A245D050 FCA244D0 55554A00 .JUU:D |P:E |Q-@ }.A }.......:TU 000180
 0018ABFA 08AB55D0 6B53D000 1507CCC2 4107CCC2 44D151FC A245D054 FCA243D0 :C |T:E |Q-D }.A }...:Sk:U .| .. 0001A0
 00000A17 0301005E 040CBC04 BCC00101 FF763153 08ABD0F1 1C514748 43584506 .EXCHGQ.¶: .S1v...  . .. ....... 0001C0
 47484358 45060008 17010002 00020002 00020404 51474D45 5205483C 00000000 ....<H.REMGQ................EXCHG 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 23 (00000017), 512 (0200) bytes

02004154 41445024 06000000 0000A902 0045444F 43240500 0000D200 E9020051 Q..⊥.‡....$CODE.. ......$PDATA.. 000000
FF502400 0402003B 325A0200 000FA001 BD02004C 41434F4C 24060000 00240189 ..$.....$LOCAL.. .......Z2;....$P. 000020
4CFF507F 00045DFF 506E0004 26FF5059 00047BFF 50500004 009FFE50 2B00040B ....+P ....PP.{..YP.&..nP.]...P.L 000040
F7030200 B926D005 00320018 FF5000B3 000505FF 50009900 0504FF50 00970005 .....P.......P.... .P...2..▮& ... 000060
FBFEFDFC F1EBFB01 02FEE802 0200FEF1 EBF7FAF9 FCFC0102 FDF4FDFD FEFAF5F5 ├┤|     ..|| |  ¶ ...  .. ¶| 000080
32313002 51474843 58450604 00000000 00310003 00028D01 000000D2 00BF06FF ....‡..... ....1........EXCHGQ.012 0000A0
353A3131 20373839 312D6C75 4A2D3232 ?'353A31 31203738 39312D6C 754A2D32 2-Jul-1987 11:5722-Jul-1987 11:5 0000C0
BC0DF205 00103434 322D362E 3456204E 41525452 4F462058 41560100 00160037 7.....VAX FORTRAN V4.6-244.... . 0000E0
00514748 43584506 F91B0000 0400BE0D FD050011 51474843 58450600 00000100 .......EXCHGQ.... . ...... .EXCHGQ. 000100
1CFC0304 42D05204 BCD051F9 1CFC0304 40D05008 BCD04004 F8500000 04020032 2.....P .@▮ .P▮@..|. Q▮ .R▮B..|. 000120
00000000 00000A17 03010050 04FF1CFC 03044251 D05204BC D0F91CFC 030440FF .@..|. ▮ .R▮QB..|...P............ 000140
A9020045 444F4324 05000000 2C00E902 00000200 02020251 47484358 45064004 .@.EXCHGQ..........⊥.,.....$CODE.. 000160
A001BD02 004C4143 4F4C2406 00000000 01890200 41544144 50240600 00000000 .......$PDATA...........$LOCAL.. .. 000180
000200BD 01000000 2C00BF06 FFF4EFF4 FE030200 B909ED05 0015325A 0200000F .....Z2... . ....  .. ........... 0001A0
31312037 3839312D 6C754A2D 32323130 02514D44 44410504 00000000 00300003 ..O.........ADDMQ.0122-Jul-1987 11 0001C0
54524F46 20584156 01000016 37353A31 31203738 39312D6C 754A2D32 3237353A :5722-Jul-1987 11:57....VAX FORT 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 24 (00000018), 512 (0200) bytes

 00100051 4D444441 05000000 0100BC0C F305000F 3434322D 362E3456 204E4152 RAN V4.6-244... . ......ADDMQ... 000000
 1B000204 00000002 FC500802 040200B1 514D4444 4105FA1B 00000400 BE0CFD05 . . .....|.ADDMQ .....P|........ 000020
 BCD00015 04BCD552 891C0003 04DE5BFE 1C000204 DE481CFD 50000004 1B040204 ........P .H*.... [*.....RJ ....  000040
 BCD0FCA2 400CBCD0 5008BCD0 18BC08BC D0001518 BC08BCD1 08BCD601 00115304 .S...≥ .- : .... . .. .P .@ |   000060
 01015308 BCD00004 93DCE240 10BCD050 0CBCD000 0927BCE2 4008BC14 BCC1500C .P  . .@  '... .P  .@ *.... .S.. 000080
 0493DCE2 44000493 DCE241D1 54FCA240 D051FCA2 43D00013 0153D150 5302C701 .(.SP-S....C |Q.@ |T-A *...D *.. 0000A0
 01C71153 04ABD0F6 1C514D48 43584506 0008ABFA 04AB50D0 6B53D000 11001900 ......Sk.P .| ...EXCHMQ.-| .S.(. 0000C0
 00020002 00020606 514D4444 4105481C 00000000 00000A17 03010062 00040101 ....b............H.ADDMQ........ 0000E0
 0045444F 43240500 00009500 E9020051 4D484358 45060008 17010002 00020002 ............EXCHMQ..⊥......$CODE. 000100
 BD02004C 41434F4C 24060000 00140189 02004154 41445024 06000000 0000A902 . ......$PDATA..........$LOCAL..  000120
 60000405 FF502500 043AFF50 1A000407 FF501400 04020025 335A0200 0DBBA001 .. ...Z3%.....P.....P.:..%P....  000140
 F4FDFFFE FCF4F703 0200B91E D805002A 0018FF50 7B000402 FF507900 0433FF50 P.3..yP....{P...*..*. ...  | .  000160
 00030002 BD010000 009500BF 06FFFDFE FCF1FEE7 0102FBFC 0302F901 02F3F1F6 -¶ .. ..| ..— ¶||  .. ....... .... 000180
 353A3131 20373839 312D6C75 4A2D3232 31300251 4D4D4552 05040000 00000030 0.......REMMQ.0122-Jul-1987 11:5 0001A0
 41525452 4F462058 41560100 00163735 3A313120 37383931 2D6C754A 2D323237 722-Jul-1987 11:57....VAX FORTRA 0001C0
 FD050010 00514D4D 45520500 00000100 BC0CF305 000F3434 322D362E 3456204E N V4.6-244... . ......REMMQ....  0001E0
```

```
Dump of file DRB0:[KB78]PHASE31.OBJ;1 on 22-JUL-1987 11:58:22.61
File ID (7639,36,0)   End of file block 38 / Allocated 39

Virtual block number 25 (00000019), 512 (0200) bytes

02041B00 02040000 0002FC50 0C020402 013B514D 4D455205 FA1B0000 0400BE0C . .....|.REMMQ8.....P|.......... 000000
0304DE5B FE1C0002 04DE483C FD500000 041B0802 041B0002 04000000 02FC1B04 ..|..............P <H.....[... 000020
8C000493 DCE240D0 500CBCD0 0CBC62D0 01001153 04BCD000 1504BCD5 52801C00 ...RJ ....S....b .P.@ ..... 000040
04506200 01010000 3108BCD7 000927BC E240D450 0CBCD062 D4001201 08BCD110 .- ....b .P @ ... .1.....bP 000060
27BCE241 14BC01C1 51FCA240 D05000BC D062FCA2 40D05008 BCD00009 27BCE240 @ ....P.@ b .P.@ Q . .A 000080
D0001508 BC55D100 00310315 08BC54D1 555401C1 545302C5 5301D008 BCD70009 .....S .ST .TU-T ...1..-U .... 0000A0
04AB54D0 6B53D000 15000493 DCE24100 0493DCE2 40D161FC A244D050 E1FCA243 C |.P.D Q-@ ....A .......SkT . 0000C0
DCE240D1 51FCA245 D050FCA2 44D00101 010011B9 1CB14048 435B4506 000CABFA | ...EXCHMQ. ......D |P.E |Q-@ . 0000E0
93DCE244 D151FCA2 45D054FC A243D055 54D00100 11001900 0493DCE2 41000493 ...A ..........TU.C |T.E |Q-D . 000100
ABD0F61C 614D4B43 58450600 18ABFA08 AB55D06B 53D00015 000493DC E2410004 ..A .........SkU .| ...EXCHMQ.|. 000120
00020505 514D4D45 5205483C 00000000 00000A17 03010060 040101FF 6E315308 .S1n.... ...........<H.REMMQ.... 000140
444F4324 05000001 0900E902 00514D48 435B4506 00081701 00020002 00020002 ..............EXCHMQ.........$COD 000160
004C4143 4F4C2406 00000024 01890200 41544144 50240600 00000000 A9020045 E.. ......$PDATA....$....$LOCAL. 000180
0415FF50 32000459 FF501A00 0407FF50 14000402 004C335A 02000DB8 A001BD02 . .. ...Z3L.....P.....P.Y..2P... 0001A0
00840005 64FF5000 A3000520 FF50008A 00050083 FE500083 000500C2 FE504400 .DP  .....P .......P.-.. .P.d.. . 0001C0
0200B92C CA060038 18FF5000 EF000504 FF5000D2 000503FF 5000D000 0553FF50 P.S...P....‡.P.... .P..8..., .. 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 26 (0000001A), 512 (0200) bytes

FEE70202 FDFEF1E7 FAF7FCFC FD0102FD EDF7F4FD FDF5FEFA F3FCFFFE FCF4F703 .  | .| | |      .. || |-¶  ..-  000000
58450604 00000000 00310003 0002BD01 00000109 008F06FF FEFDFCF1 E7FC0102 ..|-¶|  .. .........1.......EX 000020
312D6C75 4A2D3232 37353A31 31203738 39312D6C 754A2D32 32313002 514D4843 CHMQ.0122-Jul-1987 11:5722-Jul-1 000040
322D362E 3456204E 41525452 4F462058 41560100 00160037 353A3131 20373839 987 11:57.....VAX FORTRAN V4.6-2 000060
F91B0000 0400BE0D FD050011 514D4843 58450600 00000100 BC0DF205 00103434 44... . ......EXCHMQ... . ......  000080
A041D051 08BCD050 A41C0003 04DE401C FD500000 0402006A 00514D48 43584506 .EXCHMQ.j.....P .@.....  P. .Q.A. 0000A0
44000927 BCE043D0 54FCA041 D053FCA0 43D05304 BCD05200 0927BCE0 42D052FC |R.B' '..R. .S.C.|S.A.|T.C' '..D 0000C0
D054FCA0 41D05108 BCD00009 27BCE044 52D054FC A041D051 04BCD000 0927BCE0 ' '... .Q.A.|T.RD' '... .Q.A.|T. 0000E0
00000000 00000A17 03010050 04FCA042 54D05204 BCD0FCA0 41FCA042 D05204BC  .R.B.|A.|. .R.TB.|.P.......... 000100
A9020045 444F4324 05000000 6400E902 00000200 02020251 4D484358 4506401C .@.EXCHMQ........d....$CODE..  000120
A001BD02 004C4143 4F4C2406 00000000 01890200 41544144 50240600 00000000 ......$PDATA.........$LOCAL.. .. 000140
00000064 008F06FF F7F5F7EF 0102E5E8 FE040200 B90EE805 001A335A 02000DBB  ...Z3... . ...     ... .d...  000160
312D6C75 4A2D3232 31300257 4F4C4658 414D0704 00000000 00320003 0002BD01 ......2.......MAXFLOW.0122-Jul-1 000180
41560100 00163735 3A313120 37383931 2D6C754A 2D323237 353A3131 20373839 987 11:5722-Jul-1987 11:57....VA 0001A0
414D0700 00000100 BC0EF105 00113434 322D362E 3456204E 41525452 4F462058 X FORTRAN V4.6-244...¶. ......MA 0001C0
1C020602 03FE574F 4C465841 4D07F81B 00000400 BE0EFD05 00120057 4F4C4658 XFLOW.... . ..... .MAXFLOW .....  0001E0
```

```
Dump of file DRB0:[KB78]PHASE31.OBJ;1 on 22-JUL-1987 11:58:22.61
File ID (7639,36,0)   End of file block 38 / Allocated 39

Virtual block number 27 (0000001B), 512 (0200) bytes

00000004 08000400 00000000 03151001 20000000 00000004 08000480 50000315 ...P............................ 000000
00000000 03151001 20000000 00000004 08000400 00000000 0493E001 20000000 ................................ 000020
20000000 00000004 08000400 00000000 03151001 20000000 00000004 08000400 ................................ 000040
08000400 00000000 0927C001 20000000 00000004 08000400 00000000 0927C001 ................................ 000060
15100120 00000000 00000408 00040000 00000003 15100120 0000AC00 00000004 ................................ 000080
00000408 00040000 00000003 15100120 00000000 00000408 00040000 00000003 ................................ 0000A0
00031514 02060000 00000000 00000000 00040000 00000003 15100120 00000000 ................................ 0000C0
04C310AB 0CACD05B 801C0003 15100206 DE4FFCFD 50000004 18000315 18020618 ...........P |O".........[. . . . 0000E0
C34CAB18 ACD044AB 14AC04C3 38AB14AC D030AB10 AC04C324 AB10ACD0 1CAB0CAC  . . . $. . O. . 8 . . D. . L 000100
CB24ACD0 0080CB20 AC04C374 AB20ACD0 6CAB1CAC 04C360A8 1CACD058 AB18AC04 . . X. .  . . 1.  t .  ..   $† 000120
34AC04C3 0080CB34 ACD000A8 CB2CAC04 C3009CCB 2CACD000 94CB24AC 04C300B8 .. . $†.. .†.. . .† .. 4† . . 4 000140
38BCD530 BCD465E0 28BC01C1 5204A5D0 00D0CB3C AC04C300 C4CB3CAC D000BCC8 † . . <†. . . <†. . .R . (.k. OJ 8 000160
51474D45 52050000 D4CBFA04 AB52D000 DCCB38BC DE0008CB 40BCDE00 00310312 ..1.. 8†. . 8†. .R . [†r...REMGQ 000180
00DB42D4 C5131CBB 42D5CB13 008CDB42 D5001328 BC0094D8 42D15204 ABD0801C .. .R-B".. (..JB" ..†JB ..[rB". 0001A0
D1560094 DBDE556C BB410000 13510501 01015158 BB42D000 94DB426B D06BD600 .≥k.kB"...B XQ...JQ...A 1U...V. 0001C0
45510066 456BD000 00310312 00BCD845 D5000031 03126B66 45D10015 28BC6645 Ef (..·Efk..1..JE" ...1...kEf.QE 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 28 (0000001C), 512 (0200) bytes

D0001564 45D56442 D4644564 42C030BB 466442C0 541CBBDE 565108BC C300D0DB ".  .QV .T BdF 0 BdEd Bd Ed.. 000000
6941D559 30BBDE00 00310312 51D50101 015144BB 42D00100 003101A5 11805255 UR.. .1...B DQ...Q..1.. 0YJA  000020
D5000031 03126B66 45D10015 28BC6645 D1560094 DBDE556C BB41D000 00310312 ..1...A 1U ..V-Ef (..-Efk..1.. 000040
15694156 D1566442 D0541CBB DE00D0DB 4551D066 456BD000 00310312 00BCDB45 E ...1...kEf QE . .T BdV-VA . 000060
BCC10101 FF2E3152 55D00015 6445D569 4156C264 4256C264 4556C056 6941D004 . AiV VEd VBd VA Ed.. UR1....  000080
51D1FEC5 31031251 00D0DB42 D0010100 1100151C BB42D552 6CBB45D0 80555108 .QU. E ]R B ........B .Q..1( -Q 0000A0
566B01C3 556CBB41 D00101CA 11010101 E311526C BB45D055 5108BCC3 001508BC  ...  .QU E ]R.¢....°.. A 1U .kV 0000C0
D0000031 03155758 D101FFFC EAF0EB55 D05701D0 5801D063 4556D053 0094DBDE  ..S VEc .X .W U §T|..-XW..1.. 0000E0
D1546A40 D0001350 D55A6CBB DE590080 DBDE5058 BB45D058 D655FFFC EAECEB48 H  T|.U≥X E XP ..Y  1ZJP.. @JT- 000100
506940D0 FFFCEAEC EB4754D0 57D66344 56D00012 5000D0DB 44D10080 126B6344 Dck...-D .P.. VDc≥W TG  T|. @ P 000120
00D0DB40 D100126B 6340D150 6CBB45D0 A81355D5 01010155 44BB45D0 0101D611 .≥.. E DU...JU.  E 1P-@ck..-@ . 000140
D0DB42D0 010101D3 11550080 DB45D0FF FCEAECEB 4750D057 D6634056 D0001255 U.. V@c≥W PG  T|. E ..U.L... B  000160
42C030BB 416742C0 571CBBDE 556CBB45 D0555108 BCC10014 08BC51D1 00135100 .Q..-Q ...  .QU E 1U  .W BgA 0 B 000180
DE576CBB 45D05551 08BCC301 01FE8231 510080DB 41D05255 D067AC42 D4674567 gEg B g UR A ..Q1. ..  .QU E 1W  0001A0
4759C068 4259C266 4559C259 6645D004 15664559 D1596842 D05630BB DE581CBB  .X  0V BhY-YEf.. EfY YEf YBh YG 0001C0
01C38002 00CFFFFC EAF0EB52 D05701D0 5101D0FD E8315100 80DB41D0 5257D068 h WR A ..Q1   .Q .W R §T|.±... . 0001E0
```

Dump of file DRB0:[KB78]PHASE31.OBJ;1 on 22-JUL-1987 11:58:22.61
File ID (7639,36,0)   End of file block 38 / Allocated 39

Virtual block number 29 (0000001D), 512 (0200) bytes

```
00A8DB4A 52D05A30 8CD030BC D66542D4 5500BCDB DE694258 D0590094 DBDE586B kX'..Y.XB'' .U.Be≥ O. DZ.RJ' . 000000
1354D501 54588B4A D051065A FFFCEAEC EB41D0FD 5C310315 57510150 0080DBDE "..P-QW..1\ .A  .Z≥Q.J XT..T. 000020
58D0FFFC EAECEB47 53D057D6 00125400 D0DB43D1 00126869 43D1536C BB44D000 ..D 1S-C1k..-C'..T..≥W.SG  ..X 000040
01B48A44 BB4AD001 C5115460 440000A8 08465300 5630BC00 30BCD665 43D46943 C1 Ce≥ O. OV.SF' ..D'T.(.J DZ . 000060
ECEB4754 D0570600 125A0000 DB440100 12686944 D1546C8B 4AD0A013 5AD50101 ..Z...J IT-D1k..-D'..Z..≥W.TG  000080
115A0080 DB4AD000 A8DB4654 D05630BC D030BC05 00BCD844 D4694458 D0FFFCEA .|..XD1 D' .≥ O. OV.TF' ..J'..Z. 0000A0
4C465841 4D074FFC 00000000 00000A17 0301006C 000404A8 52D028BC 6BD001C1  ..k (.R ...1...........|O.MAXFL 0000C0
00020002 00020002 00020002 00020002 00020002 00020002 00020002 1010574F OW............................. 0000E0
00A90200 45444F43 24050000 03CD00E9 02005147 4D455205 00081701 00020002 .........REMGQ..⊥.x....$CODE.. . 000100
92000502 00DC4C41 434F4C24 06000315 F8018902 00415441 44502406 00000000 ......$PDATA.... ....$LOCAL'..... 000120
FE5000F8 000513FF 5000F000 0554FF50 00DF0005 12FF5000 89000503 30FE5000 .P O... .P....'.P.T..§.P..... .P 000140
41FE5001 41000500 87FE5001 31000506 FF500129 000501E7 FE500102 000501F1 ¶.....P -...).P....1.P ....A.P A 000160
013EFE50 01710005 0148FE50 01670005 13FF5001 5F000501 62FE5001 4D000501 ...M.P b.....P....g.P H...q.P >. 000180
02060005 0FFF5001 CC000526 FF5001B9 000502FF 5001B700 0508FF50 019F0005 ....P..... .P.... .P.&..].P...... 0001A0
16FF5002 6200050E FF500235 000516FF 50022D00 0528FF50 02230005 00A9FE50 P  ...#.P.(..-.P....5.P....b.P.. 0001C0
034E0005 38FF5003 4300052A FF500291 000568FF 50028B00 050EFF50 026A0005 ..j.P......P.h....P.*..C.P.8..N. 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 30 (0000001E), 512 (0200) bytes

 0302B9BD 800500CA 20FF5003 9A000528 FF500392 00051EFF 50035600 0526FF50 P.&..V.P......P.(....P. *...  .. 000000
 F4FBFCFD 0102FB02 02FA0102 FEFB0102 F3F7E301 02F8FD01 02FB0084 01080200 ......  ..  ..¢  ..   ..|.. .. |  000020
 FEFDFDFB FCFCFCEE FAFCEDF4 FBF4F9FD 0102FAFD 0102FFFE FDFBFDFB F1FAFCED  ||¶     ...  |..      || |||      000040
 FEFCF2FC FCF2FEF8 F8F8FDFD F3FBF903 02FEF6FA FBF80000 4109080E F6000702 ...|...A..  ||  ..           ||  |  000060
 00002FB9 09030EFD FBF6F6FA FEF7FE01 02FAF801 02FEFCF2 FBFCF6FE FCF80102 .. |  |||  | .. |..    |||  ... /.. 000080
 FEF2FBFC FAFEF8F8 F1FDF8F3 F9FDFDF7 5A020000 1D09030E FCFCFCEA F4F74002 .@  T|||.......Z      ¶   ||        0000A0
 03CD00BF 06FBFBFE 0102FAF6 0102FDFB FCF8FEF2 FBFCF7FE FCF60102 FDFDFCF8  |   ..||  |    |   ..||..   .  .¤. 0000C0
 312D6C75 4A2D3232 31300248 43454843 05040000 00000030 00030002 BD010000 ...  ....0.......CHECK.0122-Jul-1 0000E0
 41560100 00163735 3A313120 37383931 2D6C754A 2D323237 353A3131 20373839 987 11:5722-Jul-1987 11:57....VA 000100
 48430500 00000100 BC0CF305 000F3434 322D362E 3456204E 41525452 4F462058 X FORTRAN V4.6-244... .......CH 000120
 4C203D4D 4D203D48 54474E45 4C203D45 4E494C20 80500001 040200AB 004B4345 ECK. .....P. LINE= LENGTH= MM= L 000140
 5553203D 584C5845 444E4920 3D44203D 53534543 4F525020 3D544320 3D49203D = I= CT= PROCESS= D= INDEXLX= SU 000160
 49544341 203D4920 464F2052 4F535345 43435553 20455649 5443414E 49203D50 P= INACTIVE SUCCESSOR OF I= ACTI 000180
 414E4920 3D294A28 5443203D 4A203D49 20464F20 524F5353 45434355 53204556 VE SUCCESSOR OF I= J= CT(J)= INA 0001A0
 20455649 54434120 3D4A2046 4F20524F 535345DC 43454445 52502045 56495443 CTIVE PREDEC*ESSOR OF J= ACTIVE  0001C0
 4305FA1B 00000400 BE0CFD05 0010003D 4A20464F 20524F53 53454345 44455250 PREDECESSOR OF J=.... . .....|.C 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 31 (0000001F), 512 (0200) bytes

00000000 00031510 01200000 00000000 04080004 80500002 040203EC 4B434548 HECK .....P........... ......... 000000
01200000 00000000 04080004 00000000 00031510 01200000 00000000 04080004 .......... ................... . 000020
04080004 00000000 00031510 01200000 00000000 04080004 00000000 00031510 ................. ............. 000040
000927C0 01200000 00000000 04080004 00000000 00031510 01200000 00000000 ..... ............. ....... . '.. 000060
00010401 0E000600 00000000 0927C001 200000F0 00000000 04080004 00000000 ...........§.. . '............... 000080
0E0003FC 1B120104 010E0003 FC1B0E01 04010E00 04FC1B06 0104010E 0008FC1B .|........|........|........|... 0000A0
1B250104 010E0003 FC1B1C01 04010E00 09FC1B18 0104010E 0004FC1B 15010401 .....|........|........|......%. 0000C0
010E0017 FC1B3601 04010E00 19FC1B31 0104010E 0005FC1B 28010401 0E0009FC |......(.|.......1.|.......6.|.... 0000E0
FC1B7001 04010E00 1BFC1B69 0104010E 0007FC1B 66010401 0E0003FC 1B4F0104 ..O.|.......f.|.......i.|......p.| 000100
14AC04C3 04AB14AC D05BAC1C 000204DE 4BFCFD50 0000041B 008B0105 010E0019 ...........P |K*.... [: . .. . 000120
AC04C340 AB20ACD0 38AB1CAC 04C32CAB 1CACD024 AB18AC04 C318AB18 ACD010AB .: . . . . .$! . . . 8:  @ . 000140
04C37CAB 44ACD074 AB40AC04 C368AB40 ACD060AB 24AC04C3 54AB24AC D04CAB20 L: $ T . $ ': @ h . @ t: D | . 000160
01FB008C CB9FFA1C 4C535F45 54495257 24524F46 0C0001FB 7E01CE00 88CB44AC Dt..}. ...FOR$WRITE_SL.|.t.. . 000180
565F4C5F 4F492452 4F460A00 01FB04BC DDFB1C53 445F545F 4F492452 4F460B00 ..FOR$IO_T_DS. * . ...FOR$IO_L_V 0001A0
4F460A00 01FB10BC DDFB1C53 445F545F 4F492452 4F460B00 01FB0094 CB9FFA1C .|.t.. ...FOR$IO_T_DS. * . ...FO 0001C0
DDFB1C53 445F545F 4F492452 4F460B00 01FB009C CB9FFA1C 565F4C5F 4F492452 R$IO_L_V.|.t.. ...FOR$IO_T_DS. * 0001E0
```

```
Dump of file DRBO:[KB78]PHASE3I.OBJ;1 on 22-JUL-1987 11:58:22.61
File ID (7639,36,0)   End of file block 38 / Allocated 39

Virtual block number 32 (00000020), 512 (0200) bytes

 4F492452 4F460B00 01FB00A4 CB9FFA1C 565F4C5F 4F492452 4F460A00 01FB08BC  . ...FOR$IO_L_V.|.† . ...FOR$IO 000000
 4F460A00 00FBFE1C 565F4C5F 4F492452 4F460A00 01FB0CBC DDFB1C53 445F545F  T_DS. • . ...FOR$IO_L_V.  ...FO 000020
 01CE5638 BBDE554C BBDE5460 BBDE5324 BBDE5210 BBDEE71C 444E455F 4F492452 R$IO_END.–• .R• $S• T• LU• 8V). 000040
 4924524F 460B0001 FB00ACCB 9FFA1C4C 535F4554 49525724 524F460C 0001FB7E  ...FOR$WRITE_SL.|.† . ...FOR$I 000060
 B4CB9FFA 1C565F4C 5F4F4924 524F460A 0001FB7E 095A8F3C F91C5344 5F545F4F O_T_DS. <.Z.  ...FOR$IO_L_V.|.†  000080
 4F460A00 01FB6240 DF50095A 8F3CF61C 53445F54 5F4F4924 524F460B 0001FB00 . ...FOR$IO_T_DS.┤<.Z.P⁷@b ...FO 0000A0
 3CF61C53 445F545F 4F492452 4F460B00 01FB00BC CB9FFA1C 525F4C5F 4F492452 R$IO_L_R.|.Ŧ . ...FOR$IO_T_DS.┤< 0000C0
 460B0001 FB00C4CB 9FFA1C52 5F4C5F4F 4924524F 460A0001 FB6340DF 50095A8F .Z.P⁷@c ...FOR$IO_L_R.|.Ŧ+. ...F 0000E0
 4C5F4F49 24524F46 0A0001FB 6440DF50 095A8F3C F61C5344 5F545F4F 4924524F OR$IO_T_DS.┤<.Z.P⁷@d ...FOR$IO_L 000100
 40DF5009 5A8F3CF6 1C53445F 545F4F49 24524F46 0B0001FB 00CCCB9F FA1C525F _R.|.Ŧ}. ...FOR$IO_T_DS.┤<.Z.P⁷@ 000120
 5F4F4924 524F460B 0001FB00 D4CB9FFA 1C525F4C 5F4F4924 524F460A 0001FB65 e ...FOR$IO_L_R.|.Ŧr. ...FOR$IO_ 000140
 00FBFE1C 525F4C5F 4F492452 4F460A00 01FB6640 DF50095A 8F3CF61C 53445F54 T_DS.┤<.Z.P⁷@f ...FOR$IO_L_R.  . 000160
 001357D5 015974BB DE580088 DBDE5728 BCD0E91C 444E455F 4F492452 4F460A00 ..FOR$IO_END.⊥ (W•• ..X• tY.┘W.. 000180
 524F460B 0001FB00 DCCB9FFA 1C4C535F 45544952 5724524F 460C0001 FB7E01CE ). ...FOR$WRITE_SL.|.†•. ...FOR 0001A0
 6B47DFFB 1C525F4C 5F4F4924 524F460A 0001FB69 47DFFB1C 53445F54 5F4F4924 $IO_T_DS. 'Gi ...FOR$IO_L_R. 'Gh 0001C0
 4E455F4F 4924524F 460A0002 029B00FB FE1C525F 4C5F4F49 24524F46 0A0001FB  ...FOR$IO_L_R.  ......FOR$IO_EN 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 33 (00000021), 512 (0200) bytes

52572452 4F460C00 01FB7E01 CE001357 D5572CBC D00101C6 11576847 D0EB1C44 D. ¡GhW.≤..¡ ,W┘W..).˜ ...FOR$WR 000000
6947DFFB 1C53445F 545F4F49 24524F46 0B0001FB 00E4CB9F FA1C4C53 5F455449 ITE_SL.|.†┐. ...FOR$IO_T_DS. 'G1 000020
5F4C5F4F 4924524F 460A0001 FB6847DF FB1C525F 4C5F4F49 24524F46 0A0001FB  ...FOR$IO_L_R. 'Gh ...FOR$IO_L_ 000040
01FB7E01 CE0101C6 11576847 D0F31C44 4E455F4F 4924524F 460A0000 FBFE1C52 R.  ...FOR$IO_END. ¡GhW.≤..). . 000060
545F4F49 24524F46 0B0001FB 00ECCB9F FA1C4C53 5F455449 52572452 4F460C00 ..FOR$WRITE_SL.|.† . ...FOR$IO_T 000080
01FB00F4 CB9FFA1C 565F4C5F 4F492452 4F460A00 01FB7E0B 068F3CF9 1C53445F _DS. <...  ...FOR$IO_L_V.|.† . . 0000A0
4924524F 460A0001 FB6240DF 500B068F 3CF61C53 445F545F 4F492452 4F460B00 ..FOR$IO_T_DS.┤<...P⊤@b ...FOR$I 0000C0
0B068F3C F61C5344 5F545F4F 4924524F 460B0001 FB00BCCB 9FFA1C52 5F4C5F4F O_L_R.|.Ŧ . ...FOR$IO_T_DS.┤<... 0000E0
24524F46 0B0001FB 00C4CB9F FA1C525F 4C5F4F49 24524F46 0A0001FB 6340DF50 P⊤@c ...FOR$IO_L_R.|.Ŧ+. ...FOR$ 000100
1C525F4C 5F4F4924 524F460A 0001FB64 40DF500B 068F3CF6 1C53445F 545F4F49 IO_T_DS.┤<...P⊤@d ...FOR$IO_L_R. 000120
01FB6540 DF500B06 8F3CF61C 53445F54 5F4F4924 524F460B 0001FB00 CCCB9FFA |.Ŧ}. ...FOR$IO_T_DS.┤<...P⊤@e . 000140
445F545F 4F492452 4F460B00 01FB00D4 CB9FFA1C 525F4C5F 4F492452 4F460A00 ..FOR$IO_L_R.|.Ŧ┌. ...FOR$IO_T_D 000160
460A0000 FBFE1C52 5F4C5F4F 4924524F 460A0001 FB6640DF 500B068F 3CF61C53 S.┤<...P⊤@f ...FOR$IO_L_R.  ...F 000180
24524F46 0C0001FB 7E01CE00 1356D501 015630BC D0F11C44 4E455F4F 4924524F OR$IO_END.¶¡ 0V..┘V..⊤.˜ ...FOR$ 0001A0
DFFB1C53 445F545F 4F492452 4F460B00 01FB00FC CB9FFA1C 4C535F45 54495257 WRITE_SL.|.†|. ...FOR$IO_T_DS. ' 0001C0
5F4F4924 524F460A 0001FB68 46DFFB1C 525F4C5F 4F492452 4F460A00 01FB6946 F1 ...FOR$IO_L_R. 'Fh ...FOR$IO_ 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 34 (00000022), 512 (0200) bytes

34BCD001 01C61156 6846D0E7 1C444E45 5F4F4924 524F460A 0000FBFE 1C525F4C L_R.  ...FOR$IO_END.—▮FhV.≤..▮ 4 000000
CB9FFA1C 4C535F45 54495257 24524F46 0C0001FB 7E01CE01 01010400 1256D556 VJV......).¯ ...FOR$WRITE_SL.|.† 000020
4F492452 4F460A00 01FB6946 DFFB1C53 445F545F 4F492452 4F460B00 01FB0104 .. ...FOR$IO_T_DS. ’Fi ...FOR$IO 000040
524F460A 0000FBFE 1C525F4C 5F4F4924 524F460A 0001FB68 46DFFB1C 525F4C5F  L_R. ’Fh ...FOR$IO_L_R.  ...FOR 000060
43054BFC 00000000 00000A17 030100B0 00C21156 6846D0FA 1C444E45 5F4F4924 $IO_END.|▮FhV. . ...........|K.C 000080
00020002 00020002 00020002 00020002 00020002 00020002 00021111 4B434548 HECK........................... 0000A0
24060000 00A400A9 02004544 4F432405 00000332 00E90200 00020002 00020002 ..........⊥.2....$CODE.. . ....$ 0000C0
5F4F4924 524F460A 00081701 4C41434F 4C240600 00010C01 89020041 54414450 PDATA.........$LOCAL.....FOR$IO_ 0000E0
5F4C5F4F 4924524F 460A0008 1701525F 4C5F4F49 24524F46 0A000817 01444E45 END.....FOR$IO_L_R.....FOR$IO_L_ 000100
5F455449 52572452 4F460C00 08170153 445F545F 4F492452 4F460B00 08170156 V.....FOR$IO_T_DS.....FOR$WRITE_ 000120
FF5002F7 000538FF 5002B700 0538FF50 01CB0005 38FF5001 8B000502 001D4C53 SL.......P.8..T.P.8.. .P.8.. .P. 000140
02FEFEFC D0FCFAFE FCD0FCF2 00BE0101 029B0202 A9050200 B927CF05 0033FC04 .|3..±' ... ...... . |▮| ||▮|  . 000160
00000031 00030002 40BD0100 00033200 BF06FEFC D0F8FAFE FCD0FCFA 00AA0101 .. .||▮| | ▮| . .2.... @....1... 000180
32323735 3A313120 37383931 2D6C754A 2D323231 3002514D 54494445 06040000 ....EDITMQ.0122-Jul-1987 11:5722 0001A0
204E4152 54524F46 20584156 01000016 1B37353A 31312037 3839312D 6C754A2D -Jul-1987 11:57.....VAX FORTRAN  0001C0
00010402 000A514D 54494445 06000000 0100BC0D F2050010 3434322D 362E3456 V4.6-244... . ......EDITMQ...... 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 35 (00000023), 512 (0200) bytes

 18020402 00EEDE51 4D544944 4506F91B 00000400 BE0DFD05 00110000 0000FC50 P|....... . ...... .EDITMQ' ..... 000000
 FC1B0802 041B0402 04000000 00000000 00000000 00F41B00 01040000 0006FC50 P|........ ....................| 000020
 02040000 0006FC1B 0402041B 1002041B 0C020400 000000FC 1B000204 00000005 ........|................|...... 000040
 04DE4800 FD500000 041B0802 041B0402 041B1002 041B1402 04000000 00FC1B00 ..|.......................P .H'. 000060
 AB08BCDE 20AB04BC DE001404 ABEA1C00 0927BC03 0640D150 08BCD05B F91C0002 ... [; .P-@.. '...T...' .  ' . 000080
 0927BC03 064004AB C35008BC D004F71C 514D4444 41050018 ABFA28AB 0CBCDE24 $' . (| ...ADDMQ. .; .P  .@.. '. 0000A0
 130CBC51 D1F01C00 0493DC03 06400CBC D051FB1C 000493DC 030640D0 6BFD1C00 .. k;@..'.... Q; .@..'....§-Q .. 0000C0
 4CABFA54 AB04BCDE 01010011 F41C514D 4D455205 0034ABFA 3CAB04BC DE001400 ...' . <| 4..REMMQ. ....' . T| L 0000E0
 03514D54 49444506 48000000 00000000 0A170301 006604FF 1C514D44 44410500 ..ADDMQ...f............H.EDITMQ. 000100
 7600E902 00514D4D 45520500 08170151 4D444441 05000817 01000200 02000203 ............ADDMQ.....REMMQ..⊥.v 000120
 00000068 01890200 41544144 50240600 00000400 A9020045 444F4324 05000000 ....$CODE.. ......$PDATA....h... 000140
 FF505400 0418FF50 17000402 0019335A 02000DBB A001BD02 004C4143 4F4C2406 .$LOCAL.. .. ...Z3......P....TP. 000160
 F70202F8 F2FFE9F1 F7020200 B914E205 0020FB0F FF506500 0411FF50 56000420  ..VP....eP..  .. . ... ¶⊥.  .. 000180
 4E495250 05040000 00000030 00030002 BD010000 007600BF 06FFF101 02FEF3F8    ..¶.. .v.... ....0.......PRIN 0001A0
 37383931 2D6C754A 2D323237 353A3131 20373839 312D6C75 4A2D3232 31300254 T.0122-Jul-1987 11:5722-Jul-1987 0001C0
 000F3434 322D362E 3456204E 41525452 4F462058 41560100 00163735 3A313120  11:57....VAX FORTRAN V4.6-244.. 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 36 (00000024), 512 (0200) bytes

45434F52 502C4920 9E500001 04020068 49544E49 52500500 00000100 BC0CF305 . . ......PRINTIh.....P. I,PROCE 000000
4E492052 4F535345 43435553 203D2949 28505553 2C294928 54432C29 49285353 SS(I),CT(I),SUP(I)= SUCCESSOR IN 000020
53534543 45444552 50203D4C 204E4920 524F5353 45434355 53203D4D 203D5820  X= M= SUCCESSOR IN L= PREDECESS 000040
BE0CFD05 00103D4C 204E4920 524F5353 45434544 45525020 3D58204E 4920524F OR IN X= PREDECESSOR IN L=... .  000060
01200000 00000000 04080004 80500002 040203E1 544E4952 5005FA1B 00000400 .....|.PRINT'.....P........... . 000080
04080004 00000000 00031510 01200000 00000000 04080004 00000000 00031510 ................................ 0000A0
00031510 01200000 00000000 04080004 00000000 00031510 01200000 00000000 ................................ 0000C0
00000000 04080004 00000000 00031510 01200000 00000000 04080004 00000000 ................................ 0000E0
00000000 03151001 200000C8 00000000 04080004 00000000 00031510 01200000 .. ...............'.. ........ 000100
20000000 00000004 08000400 00000000 0927C001 20000000 00000004 08000400 ..'........ . '.....:.........  000120
04010E00 03FC1B1B 0104010E 0010FC1B 00010401 0E001B00 00000000 0927C001 . '..............|.........|..... 000140
00041B50 C104010E 0012FC1B 3E010401 0E0012FC 1B2E0104 010E0010 FC1B2B01 .+.|........|......>.|......P... 000160
10AC04C3 18AB10AC D010AB0C AC04C304 AB0CACD0 5B801C00 0204DE4F FCFD5000 .P |O'.....[. . . . . .. . . . . 000180
AC04C354 AB1CACD0 4CAB18AC 04C340AB 18ACD038 AB14AC04 C32CAB14 ACD024AB  $. . , . . 8. . @ . . L. . T .  0001A0
0090CB28 ACD00088 CB24AC04 C37CAB24 ACD074AB 20AC04C3 68AB20AC D060AB1C . '.  'h .  t. $ | . $t.. (t.. 0001C0
31031508 BC04BCD1 5304BCD0 00B0CB2C AC04C300 A4CB2CAC D0009CCB 28AC04C3  . (t.. ,t . . ,t .. .S` . ...1 0001E0
```

```
Dump of file DRB0:[KB78]PHASE3I.OBJ;1 on 22-JUL-1987 11:58:22.61
File ID (7639,36,0)   End of file block 38 / Allocated 39

Virtual block number 37 (00000025), 512 (0200) bytes

 4CBB43DE 5A38BB43 DE5924BB 43DE5810 BB43DE56 DF009CDB DE5500B0 DBDE0000 ..•• .U••..'V•C .X•C $Y•C 8Z•C L 000000
 B4CB9FFA 1C4C535F 45544952 5724524F 460C0001 FB7E01CE 01015460 BB43DE57 W•C `T..).  ...FOR$WRITE_SL.|.†  000020
 4C5F4F49 24524F46 0A0001FB 53DDFC1C 53445F54 5F4F4924 524F460B 0001FB00 . ...FOR$IO_T_DS.|•S ...FOR$IO_L 000040
 24524F46 0A0001FB 89DFFC1C 525F4C5F 4F492452 4F460A00 01FB88DF FC1C565F  V.|'. ...FOR$IO_L_R.|'. ...FOR$ 000060
 4F460A00 00FBFE1C 525F4C5F 4F492452 4F460A00 01FB8ADF FC1C525F 4C5F4F49 IO_L_R.|'. ...FOR$IO_L_R.  ...FO 000080
 49525724 524F460C 0001FB7E 01CE0013 52D50152 87D0F31C 444E455F 4F492452 R$IO_END. ▪.R.┘R..).  ...FOR$WRI 0000A0
 FB6542DF FB1C5344 5F545F4F 4924524F 460B0001 FB00BCCB 9FFA1C4C 535F4554 TE_SL.|.† . ...FOR$IO_T_DS. 'Be  0000C0
 5F545F4F 4924524F 460B0001 FB00C4CB 9FFA1C52 5F4C5F4F 4924524F 460A0001 ...FOR$IO_L_R.|.†♦. ...FOR$IO_T  0000E0
 4F492452 4F460A00 00FBFE1C 565F4C5F 4F492452 4F460A00 01FB52DD FC1C5344 DS.|•R ...FOR$IO_L_V. ...FOR$IO 000100
 5724524F 460C0001 FB7E01CE 001352D5 015284D0 BC115266 42D0ED1C 444E455F  END. ▪BfR. ▪.R.┘R..).  ...FOR$W 000120
 42DFFB1C 53445F54 5F4F4924 524F460B 0001FB00 CCCB9FFA 1C4C535F 45544952 RITE_SL.|.†}. ...FOR$IO_T_DS. 'B 000140
 5F4F4924 524F460B 0001FB00 C4CB9FFA 1C525F4C 5F4F4924 524F460A 0001FB65 e ...FOR$IO_L_R.|.†♦. ...FOR$IO  000160
 24524F46 0A0000FB FE1C565F 4C5F4F49 24524F46 0A0001FB 52DDFC1C 53445F54 T_DS.|•R ...FOR$IO_L_V. ...FOR$ 000180
 0001FB7E 01CE0013 52D50101 015274BB 43D0BC11 526642D0 E91C444E 455F4F49 IO_END.┴▪BfR. ▪C tR...┘R..).  .. 0001A0
 5F545F4F 4924524F 460B0001 FB00D4CB 9FFA1C4C 535F4554 49525724 524F460C .FOR$WRITE_SL.|.†┌. ...FOR$IO_T_ 0001C0
 460B0001 FB00C4CB 9FFA1C52 5F4C5F4F 4924524F 460A0001 FB6542DF FB1C5344 DS. 'Be ...FOR$IO_L_R.|.†♦. ...F 0001E0
```

We claim:

1. An apparatus for scheduling a combination of workers, tasks, and work centers, comprising:

means for storing schedule and task information, delayed delivery costs, and inventory carrying costs;

means for generating an initial schedule based on the schedule and task information whereby workers are assigned to perform tasks at work centers; and means for modifying the initial schedule based on the delayed delivery costs and inventory carrying costs whereby the start of at least two tasks are delayed when the delayed delivery cost of at least one end-product task is offset by the inventory carrying cost savings due to delaying the start of other tasks.

2. A method for reallocating a combination of workers, tasks, and work centers based on an initial allocation schedule, each task having an associated start time and an associated inventory carrying cost, each end-product task having an associated delayed delivery cost whereby the start of at least two tasks are delayed when the delayed delivery cost of at least one end-product task is offset by the inventory carrying cost savings due to delaying the start of other tasks, the method comprising the steps of:

developing a Technological Precedence Graph based on product design, whereby the Technological Precedence Graph includes a plurality of nodes representing tasks and directed arcs connecting the nodes and defining technological precedence;

developing a Schedule Precedence Graph based on the initial allocation schedule and Technological Precedence Graph additionally including arcs defining non-redundant schedule precedence;

assigning each node in the Schedule Precedence Graph a supply value representing the cost of carrying inventory and delaying delivery;

adding a fictitious node to the Schedule Precedence Graph for each end-product task scheduled for early delivery;

assigning to each arc an initial capacity of zero in the arc direction and an infinite capacity in the direction opposite the arc;

initializing a Facility Queue to contain nodes based on the Schedule Precedence Graph;

selecting and removing the top node from the Facility Queue;

determining whether the selected node has been on a Candidate List;

generating the Candidate List of nodes based on the Schedule Precedence Graph and the selected node;

generating a Move List and a Stay List of nodes based upon the Candidate List;

revising the cumulative delay of the nodes in the Move List;

recording the start times of the nodes in the Stay List; and reallocating the combination of workers, tasks, and work centers in accordance with the start time of the tasks and performing the tasks in accordance with the reallocation.

3. The method of claim 2 wherein the step of generating a Move List of nodes comprises the Maximum Flow Procedure.

4. The method of claim 2 wherein the step of generating the Move List and the Stay List of nodes, each node has an associated MFP backtrack label, and additionally includes the steps of:

initializing a Go Queue to contain all the facility nodes that are in the Candidate List;

selecting a node from the Go Queue;

labeling the selected node;

when possible, selecting a second node adjacent to the selected node to receive flow;

sending flow to the second selected node from the selected node;

when the supply of the second selected node is greater than zero, making such node the new selected node;

when the supply of the selected node is not greater than zero, backtracking to the closest node having supply greater than zero or the original selected node, whichever is encountered first, and selecting such node as the new selected node;

removing the label from all backtracked nodes;

when no second selected node exists, sending flow back from the selected node to the node pointed to by the MFP backtrack label and selecting the node pointed to by the MFP backtrack label as the new selected node;

when no second selected node exists and the selected node is the original selected node, placing all nodes with a label from this iteration on the Stay List; and when the Go Queue is empty, placing all nodes that are on the Candidate List and that are not on the Stay List onto a Move List.

5. A method according to claim 4 wherein the step of initializing the Go Queue includes the step of organizing the nodes into a heap data structure.

6. A method according to claim 2 wherein the schedule to be modified is an Early Finish Schedule.

7. A method according to claim 2 wherein the schedule to be modified is a Late Finish Schedule.

8. A method according to claim 2 wherein the step of initializing of the Facility Queue additionally includes the step of adding all the facility nodes in the Schedule Precedence Graph into the Facility Queue.

9. A method according to claim 2 wherein the step of initializing the Facility Queue additionally includes the step of adding each node that is an activity node in the Schedule Precedence Graph into the Facility Queue.

10. A method according to claim 2 wherein the steps of initializing the Facility Queue additionally includes the steps of organizing the Facility Queue as a heap data structure.

11. The method of claim 2 wherein the step of revising the cumulative delay of the nodes in the Move List, each node having an associated MFP backtrack label, additionally includes the steps of:

initializing a Move Queue to contain no arcs;

adding to the Move Queue those arcs not already in the Move Queue whose tail node is in the Move List and whose head node is not in the Move List;

removing from the Move Queue those arcs whose tail nodes are in the Stay List;

selecting and removing the top arc from the move Queue;

setting the cumulative delay of the Move List equal to the length of the selected arc;

determining whether the node to which the selected arc points is labeled;

backtracking from the labeled node to a node with an MFP backtrack label of nil;

while backtracking, placing nodes pointed to by the MFP backtrack labels into the Candidate List; and determining whether the tail node of the selected arc is in the Stay List.

12. The method of claim 11 wherein the step of adding the arcs to the Move Queue additionally includes the step of setting the length of the arc equal to the sum of the cumulative delay of the Move List, and the length of time between the start of the head node and the completion of the tail node.

13. The method according to claim 11 wherein step of initializing the Move Queue additionally includes the step of organizing the Move Queue as a heap data structure.

14. A resource allocation system for controlling the allocation of workers, work centers, and tasks in a manufactory, the system comprising:

a memory;

a plurality of input-output devices connected to the memory wherein data is transferred from the memory to the devices and from the devices to the memory;

input means for controlling the retrieving of schedule data including worker, work center, and task data from an input-output device and the storing of the schedule data in the memory;

first processing means for generating initial schedule data based on the schedule data stored in the memory wherein workers are assigned to work centers and tasks and for storing the initial schedule data in the memory;

second processing means for generating modified schedule data based on the initial schedule data stored in the memory wherein the start of at least two tasks are delayed when the delayed delivery cost of at least one end-product task is offset by the inventory carrying cost savings due to the delaying of the start of other tasks and for storing the modified schedule data in the memory; and output means for transferring the modified schedule data from the memory to an input-output device to effect the allocation of the resources.

15. An apparatus for controlling the performing of tasks by workers at work centers in a manufactory, comprising;

a central processing unit;

a memory unit for storing data sent from the central processing unit and sending stored data to the central processing unit;

data input means for receiving data relating to each task including delayed delivery costs and inventory carrying costs, data relating to each work center, and data relating to each worker;

data storage means for storing the task, work center, and worker data received from the data input means in the memory unit;

first data processing means, working cooperatively with the central processing unit and the memory unit, for generating initial schedule data based on the task, work center, and worker data stored in the memory unit and for storing the initial schedule data in the memory unit;

second data processing means, working cooperatively with the central processing unit and the memory unit, for generating final schedule data based on the initial schedule data stored in the memory unit and for storing the final schedule data in the memory unit; and data output means for retrieving the final schedule data from the memory unit and for outputting the final schedule data to effect the controlling of the performing of the tasks by the workers at the work centers.

16. A computer system for controlling the allocation of workers, tasks, and work centers in a manufactory, the system comprising:

a computer having a central processing unit, a memory, and input-output devices;

inputting means for inputting schedule and task data, including delayed delivery costs and inventory carrying costs, from an input-output device and for storing the schedule and task data in the memory;

generating means for generating initial schedule data, the generating means having means for retrieving the schedule and task data from the memory, means for processing the retrieved data in the central processing unit to generate initial schedule data wherein the workers are scheduled to perform tasks at work centers, and means for storing the initial schedule data in the memory;

enhancing means for enhancing the initial schedule data, the enhancing means having means for retrieving the initial schedule data from the memory, means for processing the retrieved data in the central processing unit to generate enhanced schedule data wherein the start of at least two tasks are delayed when the delayed delivery cost of at least one end-product task is offset by the inventory carrying cost savings due to delaying the start of the other tasks, and means for storing the enhanced schedule data in the memory; and outputting means for outputting the enhanced schedule to an input-output device to effect the controlling of the allocation of the workers, work centers, and tasks.

17. A method for reallocating resources in a manufactory, the manufactory having a current allocation of resources, the resources including tasks, work centers, and workers, each task having an inventory carrying cost, the tasks including end-product tasks, each end-product task having a delayed delivery cost, the method comprising the steps of:

determining the current allocation of the resources in the manufactory;

monitoring the factory resources to determine when a resource becomes available;

when a resource becomes available, generating a new allocation of resources based on the delayed delivery costs and inventory carrying costs whereby the start of at least two tasks are delayed when the delayed delivery cost of at least one end-product task is offset by the inventory carrying cost savings due to delaying the start of other tasks; and reallocating the resources based on the new allocation.

18. The method of claim 17 wherein the step of reallocating the resources includes the step of specifying the reallocated work center at which each worker is to work and the reallocated task that each worker is to perform.

19. A task and work center allocating apparatus for allocating tasks, and work centers among workers, the system comprising:

means for storing schedule and task information, delayed delivery costs, and inventory carrying costs;

means for generating an initial schedule based on the schedule and task information whereby workers are assigned to perform tasks at work centers;

means for modifying the initial schedule based on the delayed delivery costs and inventory carrying costs whereby the start of at least two tasks are delayed when the delayed delivery cost of at least one end-product task is offset by the inventory carrying cost savings due to delaying the start of other tasks; and means for assigning a worker to perform a task at a work center in accordance with the modified initial schedule.

* * * * *

UNITED STATES PATENT AND TRADEMARK OFFICE

CERTIFICATE OF CORRECTION

PATENT NO. : 5,524,077

DATED : June 4, 1996

INVENTOR(S) : Bruce H. Faaland et al.

It is certified that error appears in the above-indentified patent and that said Letters Patent is hereby corrected as shown below:

In column 187, line 1 of claim 2, following "method", please insert --performed by a computer system--.

In column 189, line 22 of claim 15, following "data", please insert --and on the delayed delivery costs and inventory carrying costs--.

In column 190, line 1 of claim 17, following "method", please insert --performed by a computer system--.

In column 190, below the last line of claim 19, please insert

--20. A method for controlling a computer system to generate a schedule for workers, work centers, and tasks, the method comprising the steps of:

inputting into the computer system work center compatibility data for each worker, technological precedence data of the tasks, task process time for each task, work center compatibility data for each task, inventory carrying cost data for each task, and delayed deliver cost data for each end-product task;

generating in the computer system an initial assignment wherein workers are assigned to perform tasks at work centers at start times based on the input work center compatibility data for each worker, the technological precedence data of the tasks, the task process time for each task, and the work center compatibility data for each task;

modifying in the computer system the initial assignment of workers to perform tasks at work centers at start times wherein the start time of a task is delayed when the delayed delivery cost of an end-product task is offset by the inventory carrying cost savings due to the delaying of the start time of the other task; and outputting from the computer system the modified assignment of workers to perform tasks at work centers.

UNITED STATES PATENT AND TRADEMARK OFFICE
CERTIFICATE OF CORRECTION

PATENT NO. : 5,524,077
DATED : June 4, 1996
INVENTOR(S) : Bruce H. Faaland et al.

It is certified that error appears in the above-indentified patent and that said Letters Patent is hereby corrected as shown below:

21. The method of claim 20 wherein the step of modifying the initial assignment of workers includes the steps of:

selecting a plurality of tasks;

invoking a maximum flow procedure to determine which selected tasks can be profitably postponed and which selected tasks cannot be profitably postponed based on the inventory carrying costs and delayed delivery costs; and delaying the start time of the determined selected tasks that can be profitably postponed.

22. The method of claim 20 wherein the step of generating an initial assignment includes the steps of:

storing in a task data structure in sorted order an indication of each not started task whose task available time is determinable;

storing in a labor data structure in sorted order an indication of the worker available time of each assigned worker;

determining whether a soonest worker available time is less than a soonest task available time;

when the soonest worker available time is less than the soonest task available time, selecting the worker, selecting an available work center with which the selected worker is compatible and for which a task is available, and assigning the selected worker to perform the available task at the selected work center; and when the soonest worker available time is not less than the soonest task available time, selecting the task, selecting a work center with which the task is compatible and for which a worker is available, and assigning the available worker to perform the selected task at the selected work center.

UNITED STATES PATENT AND TRADEMARK OFFICE

CERTIFICATE OF CORRECTION

PATENT NO. : 5,524,077

DATED : June 4, 1996

INVENTOR(S) : Bruce H. Faaland et al.

It is certified that error appears in the above-indentified patent and that said Letters Patent is hereby corrected as shown below:

23. The method of claim 22 wherein the step of storing in the task data structure includes the step of storing the task data structure as a heap.

24. The method of claim 22 wherein the step of storing in the labor data structure including the step of storing the labor data structure as a heap.

25. A method in a computer system for generating a schedule representing an assignment of workers to perform tasks at work centers, the method comprising the steps of:

inputting into the computer system work center compatibility data for each worker, technological precedence data of the tasks, task process time for each task, work center compatibility data for each task, inventory carrying cost data for each task, and delayed deliver cost data for each end-product task;

generating in the computer system an initial assignment wherein workers are assigned to perform tasks at work centers at start times based on the input work center compatibility data for each worker, the technological precedence data of the tasks, the task process time for each task, and the work center compatibility data for each task;

modifying in the computer system the initial assignment of workers to perform tasks at work centers at start times wherein the start time of a task is delayed when the delayed delivery cost of at least one end-product task is offset by the inventory carrying cost savings due to the delaying of the start time of the other task; and outputting from the computer system the modified assignment of workers to perform tasks at work centers.

UNITED STATES PATENT AND TRADEMARK OFFICE

CERTIFICATE OF CORRECTION

PATENT NO. : 5,524,077
DATED : June 4, 1996
INVENTOR(S) : Bruce H. Faaland et al.

It is certified that error appears in the above-indentified patent and that said Letters Patent is hereby corrected as shown below:

26. A method for controlling a computer system to generate a schedule for workers, work centers, and tasks, the method comprising the steps of:

inputting into the computer system inventory carrying cost data for each task, and delayed deliver cost data for each end-product task;

generating in the computer system an initial assignment wherein workers are assigned to perform tasks at work centers at start times;

modifying in the computer system the initial assignment of workers to perform tasks at work centers at start times wherein the start time of a task is delayed when the delayed delivery cost of an end-product task is offset by the inventory carrying cost savings due to the delaying of the start time of the other task; and outputting from the computer system the modified assignment of workers to perform tasks at work centers.--

Signed and Sealed this

Nineteenth Day of November, 1996

Attest:

BRUCE LEHMAN

*Attesting Officer* *Commissioner of Patents and Trademarks*